United States Patent [19]

Schwarz et al.

[11] Patent Number: 5,413,630
[45] Date of Patent: May 9, 1995

[54] COLORANT AND INK COMPOSITIONS

[75] Inventors: William M. Schwarz, Webster; Timothy J. Fuller, West Henrietta, both of N.Y.

[73] Assignee: Xerox Corporation, Stamford, Conn.

[21] Appl. No.: 166,373

[22] Filed: Dec. 13, 1993

[51] Int. Cl.$^6$ .............................................. C09D 11/02
[52] U.S. Cl. ................................. 106/22 K; 106/20 D
[58] Field of Search ........................... 106/22 K, 20 D; 534/753, 755, 757, 766, 767, 772

[56] References Cited

U.S. PATENT DOCUMENTS

| | | | |
|---|---|---|---|
| 3,909,259 | 9/1975 | Mammino et al. | 430/107 |
| 3,998,803 | 12/1976 | Burkhard et al. | 534/755 |
| 4,073,965 | 2/1978 | Mammino et al. | 430/106 |
| 4,087,244 | 5/1978 | Greve et al. | 534/755 |
| 4,140,684 | 2/1979 | Burkhard et al. | 534/766 |
| 4,176,509 | 9/1979 | Parton | 534/772 |
| 4,284,782 | 8/1981 | Schmidt | 546/288 |
| 4,566,908 | 1/1986 | Nakatani et al. | 106/287.11 |
| 4,734,349 | 3/1988 | Chapman et al. | 430/106 |
| 4,739,042 | 4/1988 | Lorenz et al. | 106/22 K |
| 4,742,161 | 5/1988 | Dore | 534/755 |
| 4,784,668 | 11/1988 | Breitschaft et al. | 106/22 K |
| 4,988,594 | 1/1991 | Hattori et al. | 534/753 |
| 5,023,324 | 6/1991 | Moser | 534/772 |

FOREIGN PATENT DOCUMENTS

| | | | |
|---|---|---|---|
| 071966 | 4/1987 | Japan | 430/106 |
| 108863 | 6/1987 | Japan | 430/106 |
| 147465 | 7/1987 | Japan | 430/106 |
| 1231062 | 9/1988 | Japan | 430/106 |
| 2051166 | 2/1990 | Japan | 430/106 |
| 04180968 | 6/1992 | Japan . | |

OTHER PUBLICATIONS

Xerox Disclosure Journal, vol. 3, No. 1, Jan. 1978.
Chemical Abstract, CI 12700, C.I. Solvent Yellow 16 No Date Available.

Primary Examiner—Helene Klemanski
Attorney, Agent, or Firm—Judith L. Byorick

[57] ABSTRACT

Disclosed are aqueous ink compositions for ink jet printing which comprises water, a humectant, and a colorant selected from the group consisting of: (a) those of Formula I

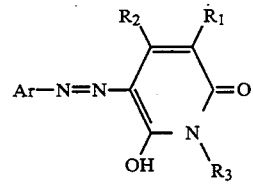

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

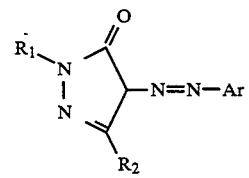

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three (Abstract continued on next page.)

moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof. Also disclosed are printing processes employing the inks.

18 Claims, No Drawings

COLORANT AND INK COMPOSITIONS

BACKGROUND OF THE INVENTION

The present invention is directed to colorant compositions. More specifically, the present invention is directed to colorants particularly useful for imaging applications, such as ink jet inks and the like. One embodiment of the present invention is directed to an aqueous ink composition for ink jet printing which comprises water, a humectant, and a colorant selected from the group consisting of: (a) those of Formula I

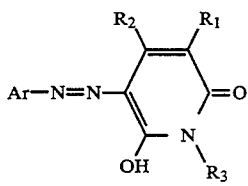

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

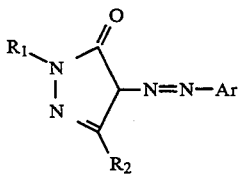

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof.

Another embodiment of the present invention is directed to colorant compositions selected from the group consisting of: (a) dimeric compounds containing two moieties of Formula I

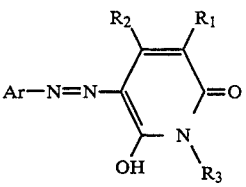

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) dimeric compounds containing two moieties of Formula II

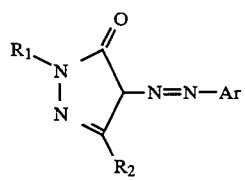

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing one moiety of Formula I and one moiety of Formula II; (d) trimeric compounds containing three moieties of Formula I; (e) trimeric compounds containing three moieties of Formula II; (f) trimeric compounds containing two moieties of Formula I and one moiety of Formula II; (g) trimeric compounds containing one moiety of Formula I and two moieties of Formula II; and (h) polymeric compounds containing at least four moieties selected from the group consisting of Formula I, Formula II, and mixtures thereof.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

U.S. Pat. No. 4,284,782 (Schmidt), the disclosure of which is totally incorporated herein by reference, discloses a process for the manufacture of 6-hydroxypyrid-2-ones by reacting a cyanoacetamide with an acetoacetic acid ester at temperatures of 50° C. to 200° C. and a pressure of 0.5 to 50 bars in an aqueous solution or suspension in the presence of an amine in a molar amount at least equal to that of the cyanoacetamide reactant. The 6-hydroxypyrid-2-ones are of the general formula

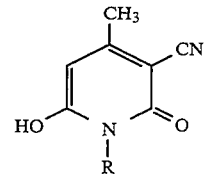

wherein R represents hydrogen or an optionally branched alkyl radical having 1 to 4 carbon atoms.

Japanese Patent Publication 04-180968-A discloses a dye represented by the general formula

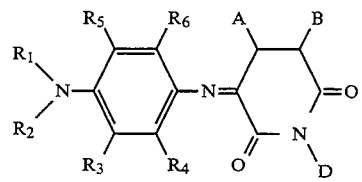

wherein $R_1$ and $R_2$ are hydrogen or optionally substituted alkyl and wherein $R_1$ and $R_2$ can be formed into a ring of 5 or 6 atoms by bonding with each other, $R_3$, $R_4$, $R_5$, and $R_6$ are halogen, optionally substituted alkyl, optionally substituted alkoxy, optionally substituted amido, or optionally substituted sulphonamide, A, B, and D are either the same or different and are carbon, nitrogen, oxygen, on an organic group or a hydrogen-atom bonding with the pyridone-ring through the sulphur atom. The dye is used for forming color images, such as a cyan colored filter dye used as an image forming medium for a photograph, heat-sensitive transfer printing, ink jet printing, or the like.

While known compositions and processes are useful for their intended purposes, a need remains for improved colorant compositions particularly suitable for use in ink jet printing inks. In addition, there is a need for ink jet inks with improved waterfastness. There is also a need for ink jet inks with improved lightfastness. Further, there is a need for ink jet inks in which lower concentrations of colorant are needed to obtain images of the desired color and intensity. Additionally, there is a need for ink jet inks which generate images of high color quality. There is also a need for ink jet inks with improved latency. A need also remains for for ink jet inks containing dye colorants in which the dye exhibits little or no precipitation from the ink. A need also exists for dyes suitable for use in dye diffusion transfer systems.

SUMMARY OF THE INVENTION

It is an object of the present invention to provide colorant compositions with the above noted advantages.

It is another object of the present invention to provide ink compositions with the above noted advantages.

It is yet another object of the present invention to provide improved colorant compositions particularly suitable for use in ink jet printing inks.

It is still another object of the present invention to provide ink jet inks with improved waterfastness.

Another object of the present invention is to provide ink jet inks with improved lightfastness.

Yet another object of the present invention is to provide ink jet inks in which lower concentrations of colorant are needed to obtain images of the desired color and intensity.

Still another object of the present invention is to provide ink jet inks which generate images of high color quality.

It is another object of the present invention to provide ink jet inks with improved latency.

It is yet another object of the present invention to provide ink jet inks containing dye colorants in which the dye exhibits little or no precipitation from the ink.

It is still another object of the present invention to provide dyes suitable for use in dye diffusion transfer systems.

These and other objects of the present invention (or specific embodiments thereof) can be achieved by providing marking materials containing the specific colorant materials disclosed herein. One embodiment of the present invention is directed to an aqueous ink composition for ink jet printing which comprises water, a humectant, and a colorant selected from the group consisting of: (a) those of Formula wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and

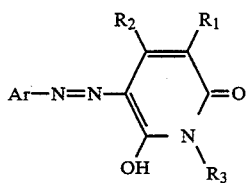

substituted arylalkyl, and Ar is selected from the group consisting of aryl, substituted aryl, arylalkyl, and substituted arylalkyl; (b) those of Formula II

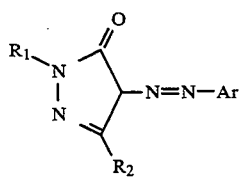

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof.

Another embodiment of the present invention is directed to colorant compositions selected from the group consisting of: (a) dimeric compounds containing two moieties of Formula I

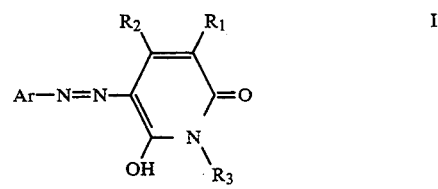

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) dimeric compounds containing two moieties of Formula II

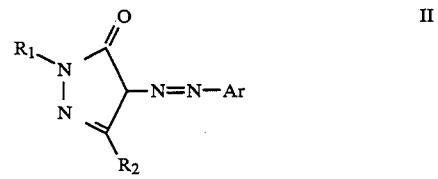

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing one moiety of Formula I and one moiety of Formula II; (d) trimeric compounds containing three moieties of Formula I; (e) trimeric compounds containing three moieties of Formula II; (f) trimeric compounds containing two moieties of Formula I and one moiety of Formula II; (g) trimeric compounds containing one moiety of Formula I and two moieties of Formula II; and (h) polymeric compounds containing at least four moieties selected from the group consisting of Formula I, Formula II, and mixtures thereof.

DETAILED DESCRIPTION OF THE INVENTION

Marking materials of the present invention contain colorant of the structures indicated hereinabove. The colorant compositions can be prepared by any suitable process. For example, the colorants of the formula

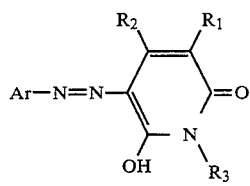

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, Ar is selected from the group consisting of aryl, substituted aryl, arylalkyl, and substituted arylalkyl, can be prepared by the diazo coupling of aromatic amines with pyridones. More specifically, these compounds can be prepared by first reacting a compound containing, in the following order, an ester group, a methylene group, and a carbonyl group (hereinafter referred to as an $\alpha,\beta$-diketoester, either alkyl substituted, aryl substituted, or unsubstituted) and a compound containing, in the following order, an amide group and a methylene group (hereinafter referred to as an acetamide, either alkyl substituted, aryl substituted, or unsubstituted), typically in a 1:1 stoichiometric ratio, in the presence of a solvent, such as an alcohol, a glycol, a mixed solvent, or the like (methanol is one preferred solvent because of its ease of removal after completion of the reaction) and a base (such as potassium hydroxide, sodium hydroxide, lithium hydroxide, sodium hydride, potassium hydride, tertiary amines, hindered secondary amines (which can extract H+ but will not react with the reactants), or the like) heated to the reflux temperature of the mixture (typically from about 70° to about 120° C.) and typically for from about 1 to about 4 hours to form a chromophore moiety. Thereafter, the resulting chromophore moiety can be reacted with an aromatic diazonium salt. Typically, the diazonium salt is prepared from the aromatic amine under acid conditions (preferably of pH <2) at chilled temperatures of from about 0° to about 5° C. for about 0.5 hour. The aromatic diazonium salt is then coupled with the chromophore moiety by heating a solution of the chromophore to dissolve it in the selected solvent (typically to about 70° C.), subsequently cooling the chromophore solution to a temperature just above where the chromophore would begin to precipitate (typically about 25° to 30° C.), followed by adding a cold solution of the aromatic diazonium salt, typically in about a 1:1 stoichiometric ratio with the chromophore. The general reaction scheme is as follows:

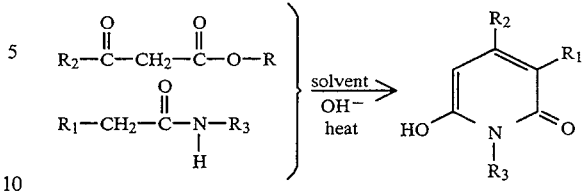

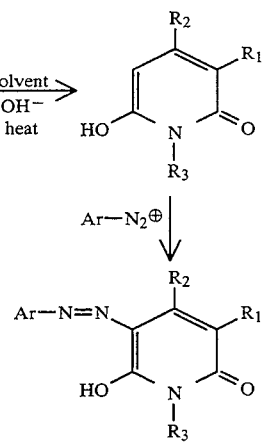

Specific colorants that can be made by this process include the following: wherein R can be either H or methyl;

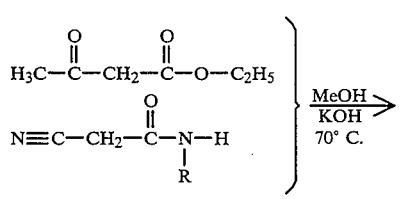

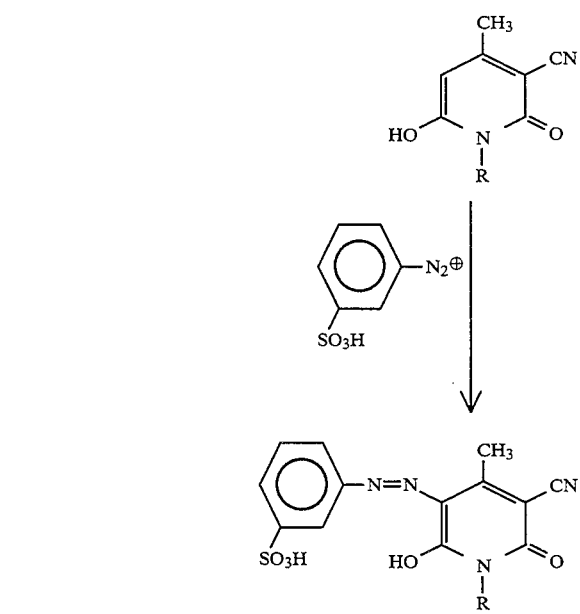

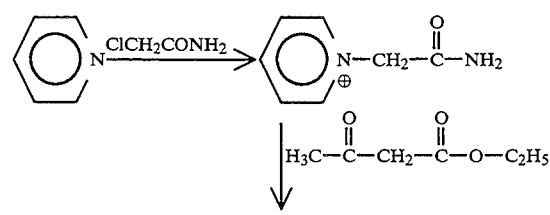

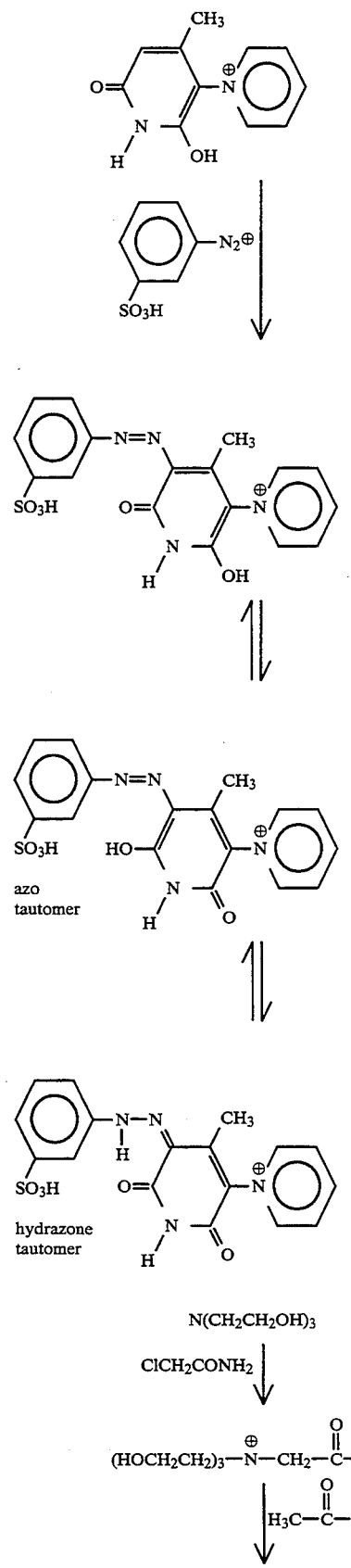

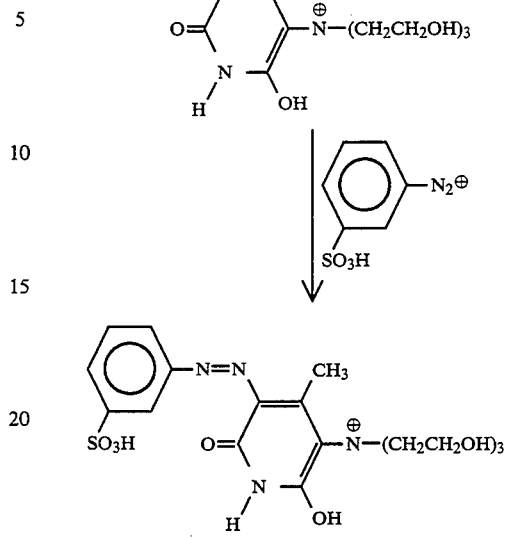

and the like.

These compounds can also be prepared as disclosed in U.S. Pat. No. 4,284,782, the disclosure of which is totally incorporated herein by reference.

Examples of aromatic amines suited to diazotization to generate aromatic diazonium salts for the above reactions include aniline, metanilic acid, sulfanilic acid (p-aminobenzenesulfonic acid), 2-methyl-5-aminobenzenesulfonic acid, 2,5-diaminobenzenesulfonic acid, 5,5'-diamino-biphenyl-2,2'-disulfonic acid, bis(p-4,4'-diamino-phenoxy)propylene glycol, 4,4'-diaminodibenzyl-2,2'-disulfonic acid, 4,4'-diaminostilbene-2,2'-disulfonic acid, 5,5'-dimethyl-4,4'-diaminobiphenyl-2,2'-disulfonic acid, 4,4'-diaminobiphenyl-2,2'-disulfonic acid, 4,4'-diaminobiphenyl, and the like.

Colorants of the formula

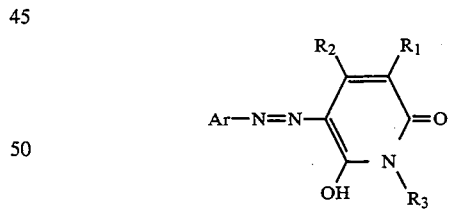

typically exist in tautomeric forms, as follows:

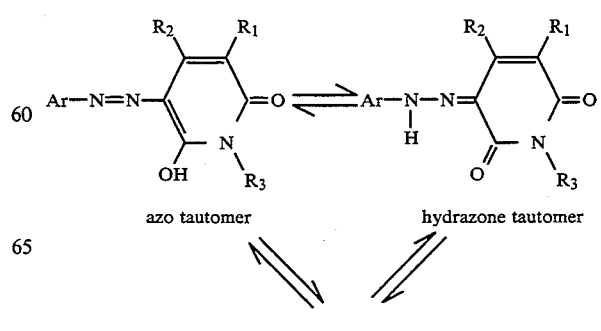

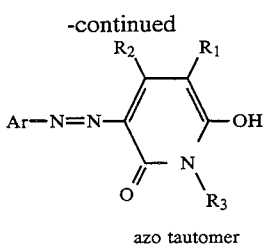

azo tautomer

These structures generally exist in equilibrium. While, for the purposes of the present invention, generally only one tautomer will be drawn, it is to be understood that all three of these forms may be present in compositions of the present invention.

For colorants of the formula

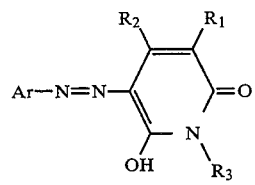

$R_1$ generally is an electron withdrawing group. Specific examples of suitable $R_1$ groups include a cationic pyridinium moiety, a cyano group, a nitro-aromatic group, an acid group, an amide group, an aldehyde or ketone group, or the like. $R_2$ generally is a relatively inactive moiety, such as hydrogen, alkyl, either saturated or unsaturated, preferably with from 1 to about 30 carbon atoms (with larger hydrocarbon chains imparting a surfactant or surface active character to the molecule), more preferably with from 1 to about 2 carbon atoms, substituted alkyl, either saturated or unsaturated, preferably with from 1 to about 30 carbon atoms, more preferably with from 1 to about 2 carbon atoms, aryl, preferably with from 6 to about 32 carbon atoms, substituted aryl, preferably with from 6 to about 32 carbon atoms, arylalkyl, preferably with from 7 to about 30 carbon atoms, substituted arylalkyl, preferably with from about 7 to about 30 carbon atoms, or a halogen atom, such as fluorine, chlorine, bromine, iodine, and astatine. $R_3$ is generally hydrogen, an alkyl group, either saturated or unsaturated, preferably with from 1 to about 30 carbon atoms, more preferably with from 1 to about 2 carbon atoms, substituted alkyl, either saturated or unsaturated, preferably with from 1 to about 30 carbon atoms, more preferably with from 1 to about 2 carbon atoms, aryl, preferably with from 6 to about 32 carbon atoms, substituted aryl, preferably with from 6 to about 32 carbon atoms, arylalkyl, preferably with from 7 to about 30 carbon atoms, substituted arylalkyl, preferably with from about 7 to about 30 carbon atoms, or a halogen atom, such as fluorine, chlorine, bromine, iodine, and astatine. Ar is an aryl, substituted aryl, arylalkyl, or substituted arylalkyl group, preferably with from 6 to about 32 carbon atoms, more preferably with from 6 to about 20 carbon atoms. Preferably, Ar is of a nature such that formation of the hydrazone tautomer is not hindered. Examples of suitable substituents include silyl groups, halide atoms, such as fluoride, chloride, bromide, iodide, and astatide, nitro groups, amine groups, including primary, secondary, and tertiary amines, hydroxy groups, alkoxy or ether groups, aldehyde groups, ketone groups, ester groups, amide groups, carboxylic acid groups, and the like.

Specific examples of colorants of this general formula include the following:

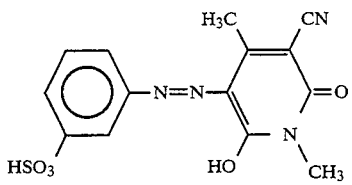

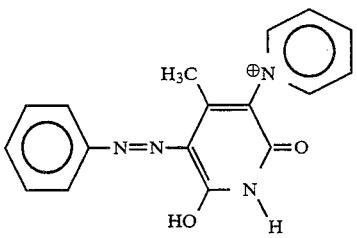

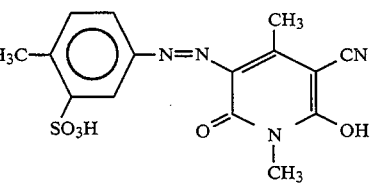

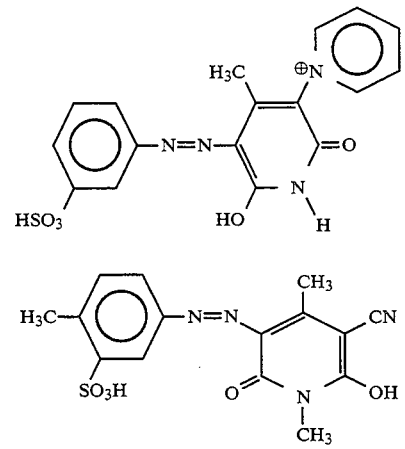

Colorants of the general formula

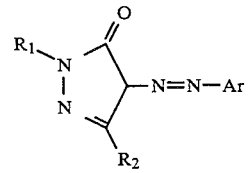

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl, can be prepared by the diazo coupling of aromatic amines with pyrazolones. More specifically, these compounds can be prepared by first converting a primary amine to the corresponding diazonium salt, followed by reacting the diazonium salt with bisulfite to obtain the corresponding hydrazine, followed by reacting the hydrazine with an $\alpha,\beta$-diketoester to obtain a chromophore moiety. Typically, the hydrazine and the diketoester are reacted in a 1:1 stoichiometric ratio at the reflux temperature of the selected solvent (water and methanol are among the suitable solvents), typically from about 80° to about 100° C., and typically for from about 3 to about 5 hours. Thereafter, the resulting chromophore moiety can be reacted with an aromatic diazonium salt under the reaction conditions set forth previously herein. The general reaction scheme is as follows:

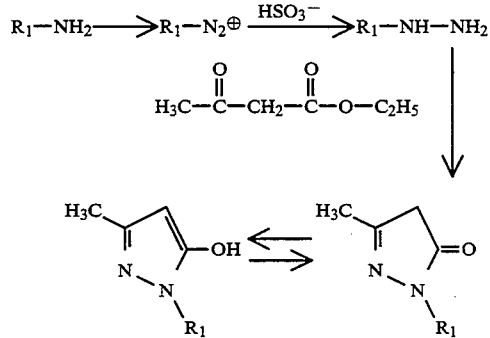

Specific examples of colorants that can be made by this process are as follows:

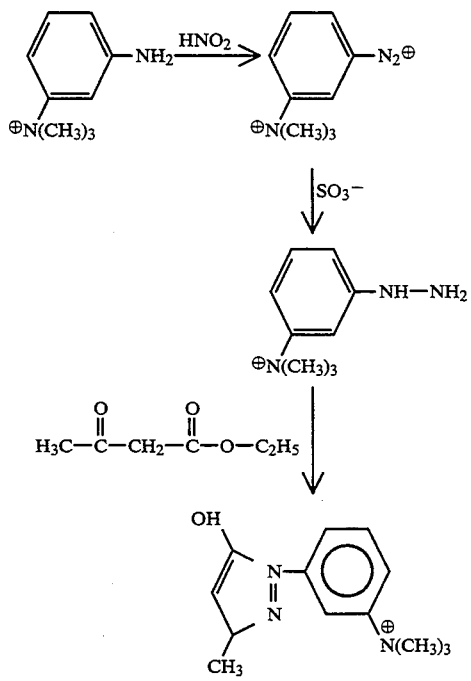

and the like.

These dyes colorants also be prepared as described by K. Venkataraman in *The Chemistry of Synthetic Dyes*, vol. 1, pages 607 and 628, Academic Press (New York 1952), the disclosure of which is totally incorporated herein by reference.

Colorants of the formula

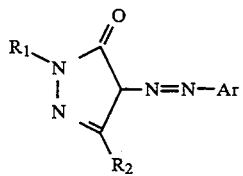

typically exist in tautomeric forms, as follows:

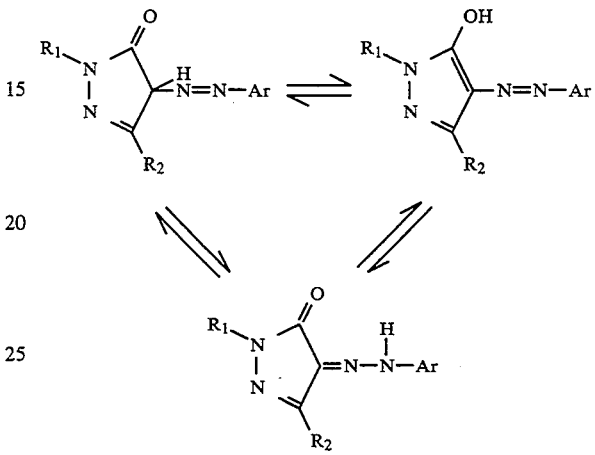

These structures generally exist in equilibrium. While, for the purposes of the present invention, generally only one tautomer will be drawn, it is to be understood that all three of these forms may be present in compositions of the present invention.

For colorants of the formula

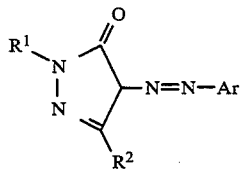

$R_1$ generally is selected from the group consisting of hydrogen, alkyl, substituted alkyl, aryl, substituted aryl, arylalkyl, and substituted arylalkyl. Specific examples of suitable $R_1$ groups include benzenesulfonic acid, benzenesulfonate salts, sulfonated stilbene derivatives, sulfonated bibenzyl derivatives, and the like. $R_2$ generally is selected from the group consisting of hydrogen, alkyl, substituted alkyl, aryl, substituted aryl, arylalkyl, and substituted arylalkyl. Specific examples of suitable $R_2$ groups include methyl, ethyl, carboxy-substituted alkyl, and the like. Ar is an aryl, substituted aryl, arylalkyl, or substituted arylalkyl group, preferably with from 6 to about 32 carbon atoms, more preferably with from 6 to about 20 carbon atoms. Preferably, Ar is of a nature such that formation of the hydrazone tautomer is not hindered. Specific examples of suitable Ar groups include toluenesulfonic acid, toluene sulfonate salts, sulfonated bibenzyl derivatives, and the like. Examples of suitable substituents on $R_1$, $R_2$, and Ar include silyl groups, halide atoms, such as fluoride, chloride, bromide, iodide, and astatide, nitro groups, amine groups, including primary, secondary, and tertiary amines, hydroxy groups, alkoxy or ether groups, aldehyde groups, ketone groups, ester groups, amide groups, carboxylic acid groups, and the like.

Specific examples of colorants of this formula include:

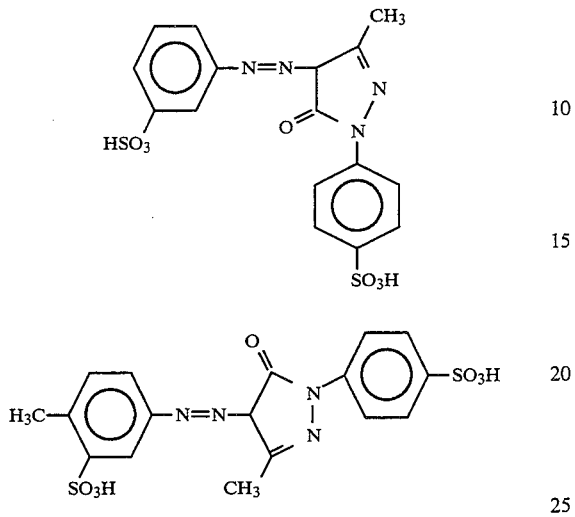

Structures of the above formulae can be included in dimeric, trimeric, and polymeric compounds. (For the purposes of the present invention, polymeric compounds are defined as those containing at least four dye moieties of Formula I and/or Formula II.) For dimeric, trimeric, and polymeric compounds containing moieties of Formula I, the attachment points can be through $R_1$, $R_2$, $R_3$, and/or Ar, provided that $R_1$ remains electron withdrawing. It is also preferred that if Ar is used as an attachment point, its nature remains such that formation of the hydrazone tautomer is not hindered. Similarly, for dimeric, trimeric, and polymeric compounds containing moieties of Formula II, the attachment points can be through $R_1$, $R_2$, and/or Ar. Both symmetric and unsymmetric dimers, trimers, and polymers can be formed. For example, in the case of unsymmetric dimers, two different moieties, both according to Formula I, can be linked together through $R_1$; or, two identical moieties of Formula II can be linked together, with the connection points being $R_2$ for one moiety and Ar for the other moiety; or two different moieties, one of Formula I and one of Formula II, can be linked together.

Some examples of dimeric colorants containing moieties of Formula I include the following:

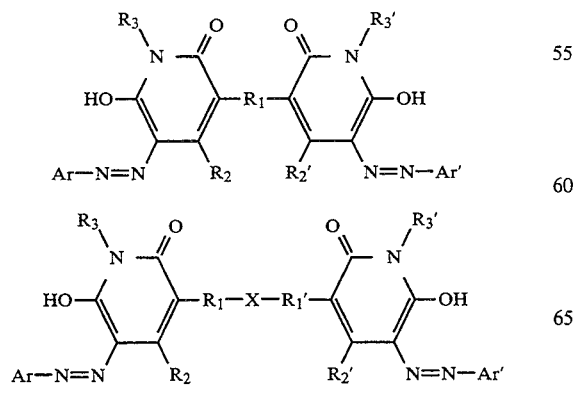

-continued

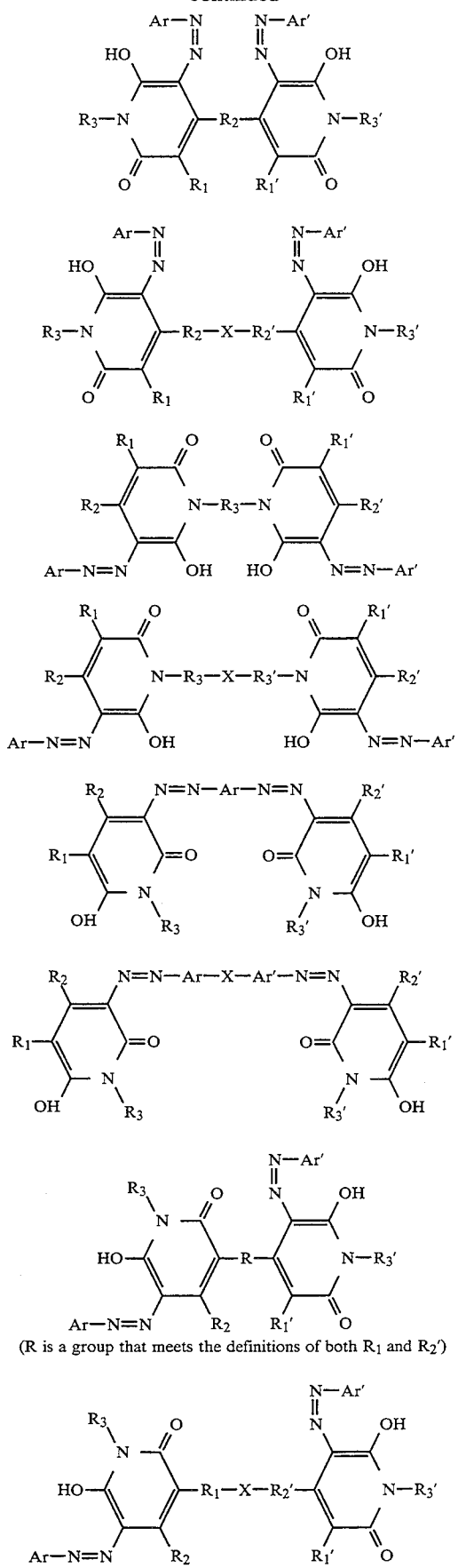

(R is a group that meets the definitions of both $R_1$ and $R_2'$)

-continued

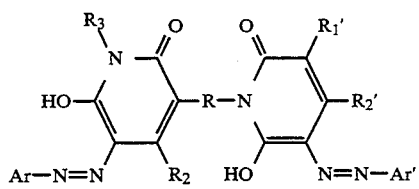

(R is a group that meets the definitions of both $R_1$ and $R_3'$)

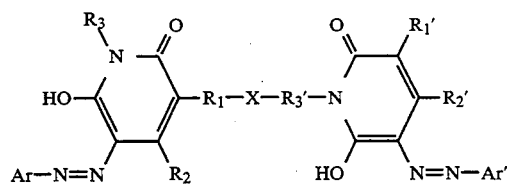

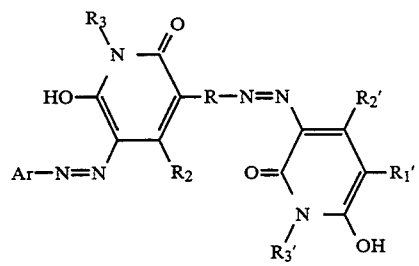

(R is a group that meets the definitions of both $R_1$ and $Ar'$)

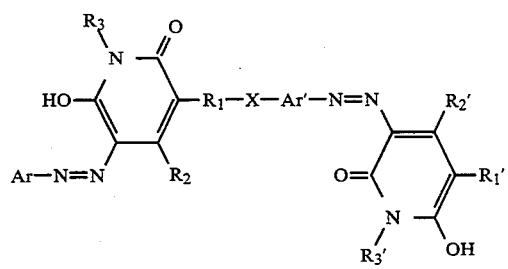

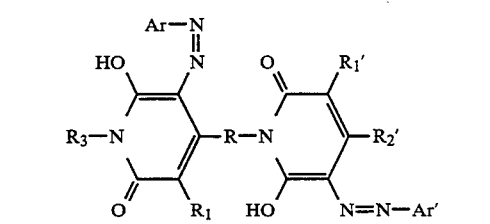

(R is a group that meets the definitions of both $R_2$ and $R_3'$)

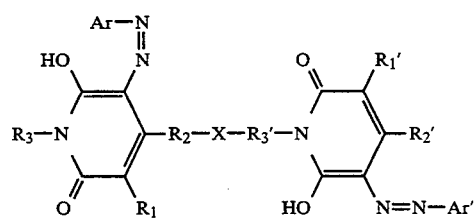

-continued

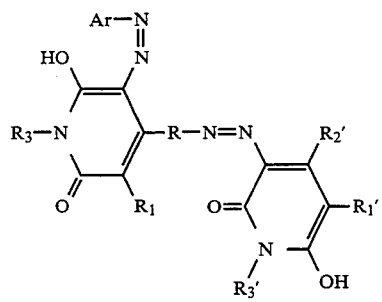

(R is a group that meets the definitions of both $R_2$ and $Ar'$)

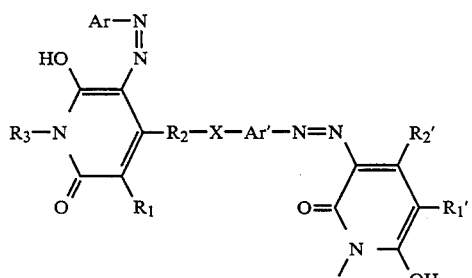

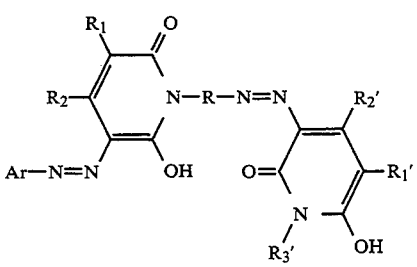

(R is a group that meets the definitions of both $R_3$ and $Ar'$)

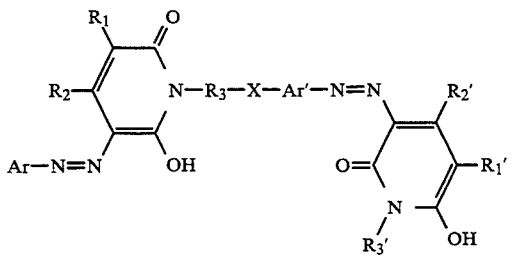

wherein $R_1$ and $R'1$ are each electron withdrawing groups, $R_2$ and $R'_2$ are each independently selected from the group consisting of hydrogen, alkyl, substituted alkyl, aryl, substituted aryl, arylalkyl, and substituted arylalkyl, $R_3$ and $R'3$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl. These dyes and the corresponding trimeric compounds and polymeric compounds can be prepared by reacting a chromophore moiety and a bridging group, and, if desired, a terminal group, in any desired order to obtain the desired product. The synthetic processes are similar to those employed for preparing the monomeric colorants except that the reaction stoichiometry may vary. For example, an aryl or alkylaryl diamine can be selected as the bridging group, wherein the two amine groups are converted to diazonium groups, followed by reaction of the bridging group with the chromophore in a 1:2 stoichiometric ratio to couple two chromophore moieties to the bridging group.

Specific examples of dimeric colorants containing moieties of Formula I include the following:

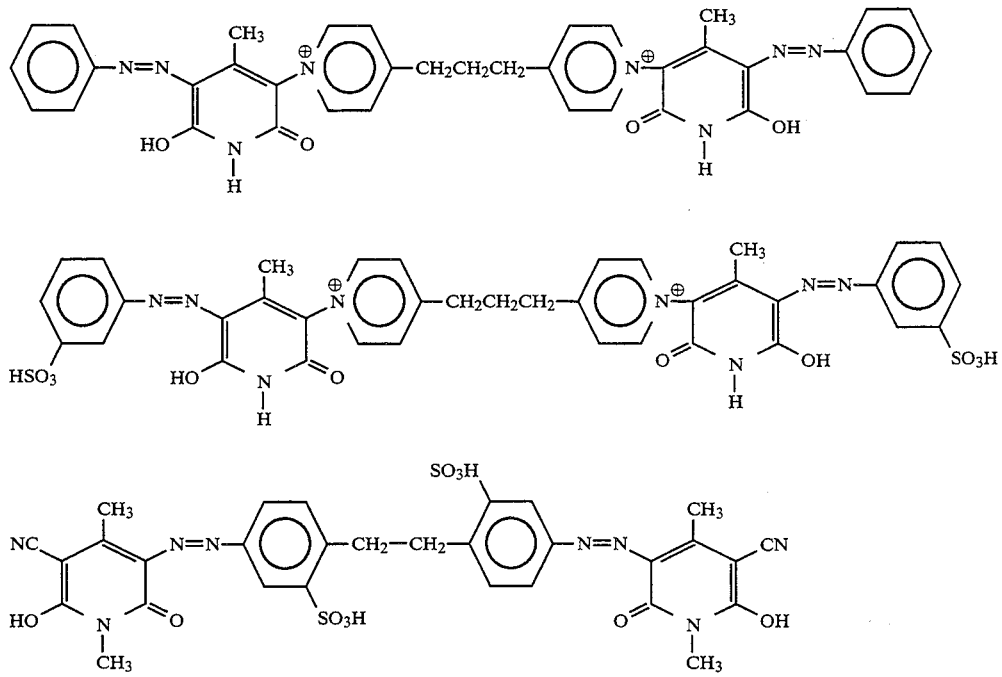

Specific examples of suitable bridging groups include alkyl groups, such as methyl, ethyl, propyl, and the like, substituted alkyl groups, such as alkyldiamines of the formula $H_2N—R—NH_2$, wherein R is an alkyl group, oxyalkyl groups, such as ethylene oxide and polyethylene oxide, aryl groups, such as biphenyl, 1,4-dipyridine, and polyvinyl pyridine, substituted aryl groups, such as sulfonated biphenyl, benzenesulfonic acid, and 4,4'-methylene-dianiline, arylalkyl groups, such as stilbene, hydrogenated stilbene, methylene his dimethylanlline, methylene dicyclohexylamine, and poly-p-amino styrene, substituted arylalkyl groups, such as sulfonated stilbenes and sulfonated hydrogenated stilbenes, and the like. When the bridging group is coupled to the chromophore by the reaction between a diazonium group and the chromophore, the bridging group generally is formed by selecting a bridging moiety having at least two amine groups and converting the amine groups to the corresponding diazonium salts, followed by reaction of the azotized material with the chromophore. In a preferred embodiment, the bridging group is relatively insulating in that electron flow through the bridging group between the two chromophores is inhibited so that the color of the chromophore is not affected. For example, in this embodiment, a hydrogenated stilbene moiety of the formula

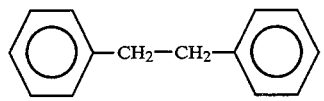

would be preferred over a stilbene moiety of the formula

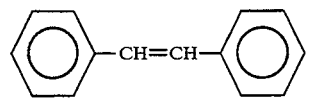

since the double bond linking the two aromatic rings in the stilbene moiety allows electron flow through the entire stilbene moiety.

Examples of dimeric colorants containing moieties of Formula II include the following:

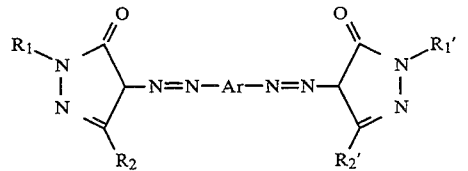

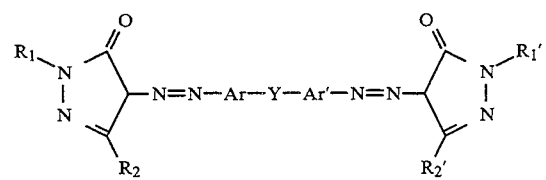

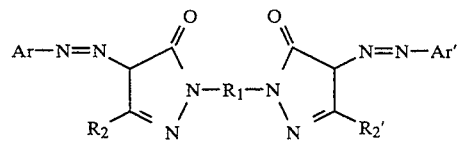

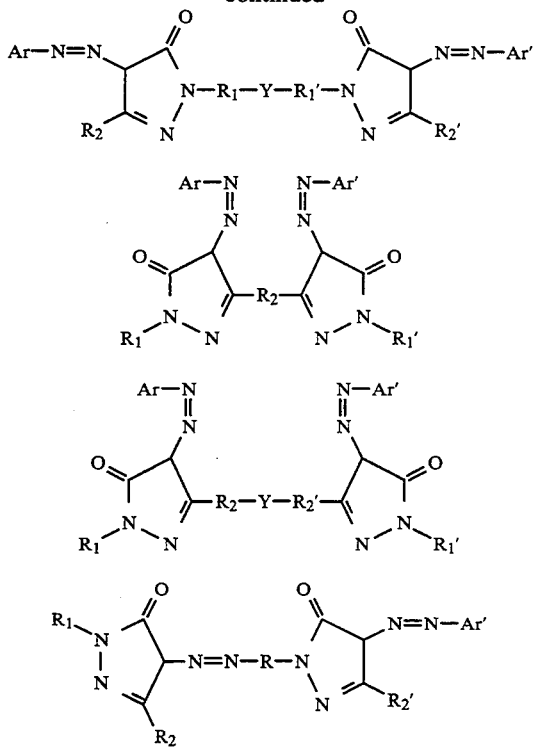

(R is a group that meets the definitions of both Ar and $R_1'$)

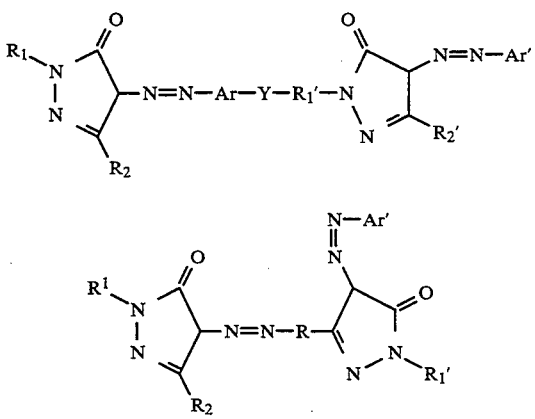

(R is a group that meets the definitions of both Ar and $R_2'$)

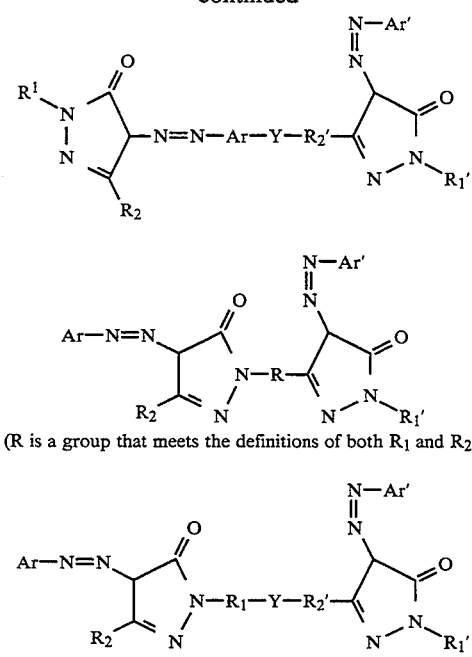

(R is a group that meets the definitions of both $R_1$ and $R_2'$)

wherein $R_1$ and $R'_1$ are each independently selected from the group consisting of hydrogen, alkyl, substituted alkyl, aryl, substituted aryl, arylalkyl, and substituted arylalkyl, $R_2$ and $R'_2$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and Y is selected from the group consisting of alkyl, substituted alkyl, aryl, substituted aryl, arylalkyl, and substituted arylalkyl. These colorants and the corresponding trimers and polymers can be prepared by reacting a chromophore moiety with a bridging group, and, if desired, with a terminal group in any desired order to obtain the desired product. The synthetic processes are similar to those employed for preparing the monomeric colorants except that the reaction stoichiometry may vary. For example, an aryl or alkylaryl diamine can be selected as the bridging group, wherein the two amine groups are converted to diazonium groups, followed by reaction of the bridging group with the chromophore in a 1:2 stoichiometric ratio to couple two chromophore moieties to the bridging group.

Specific examples of colorants of this general formula include the following:

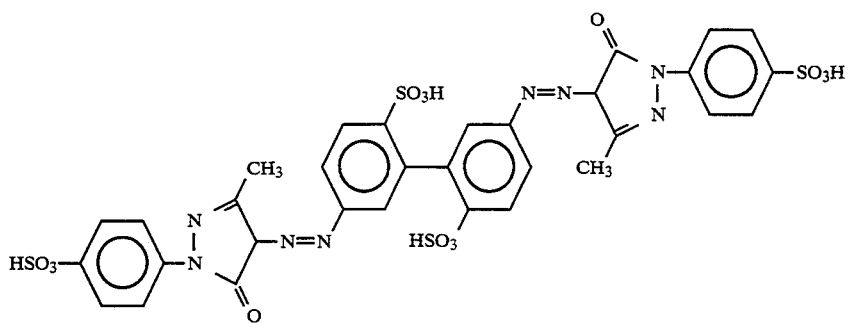

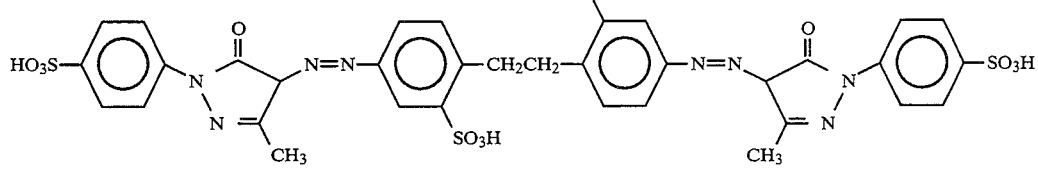

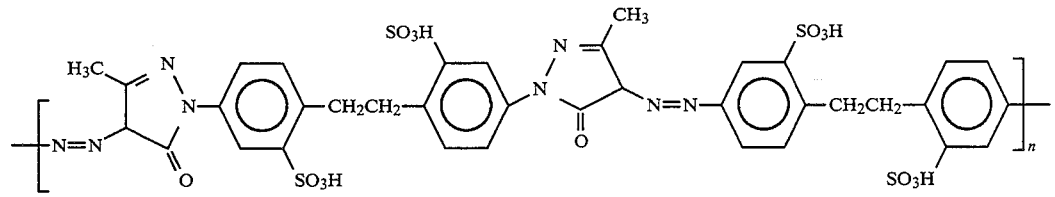

wherein n represents the number of repeating monomer units.

Examples of dimeric colorants containing moieties of Formula I and Formula II include the following:

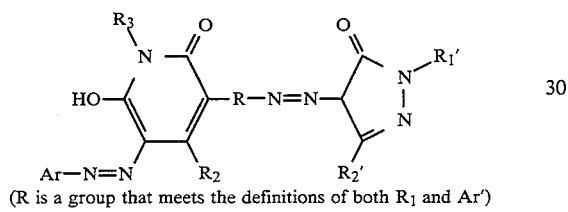

(R is a group that meets the definitions of both $R_1$ and $Ar'$)

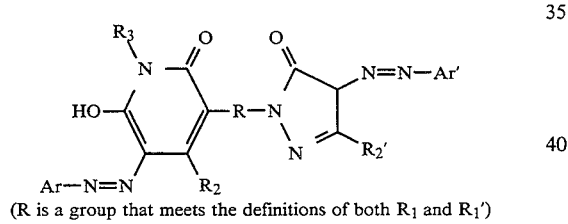

(R is a group that meets the definitions of both $R_1$ and $R_1'$)

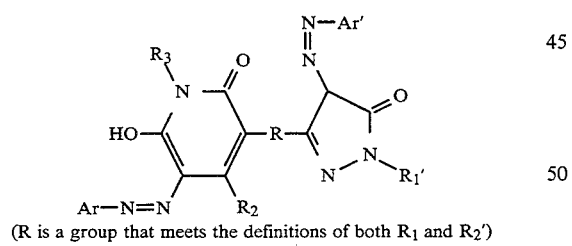

(R is a group that meets the definitions of both $R_1$ and $R_2'$)

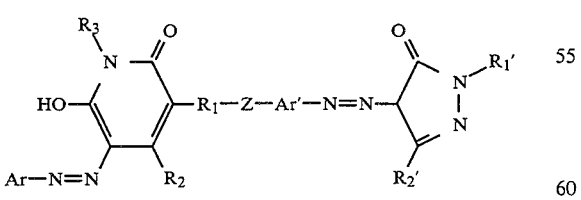

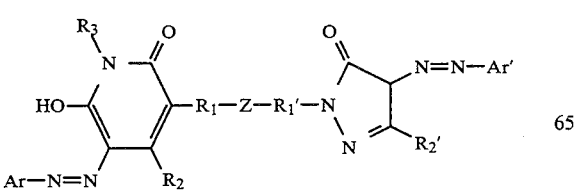

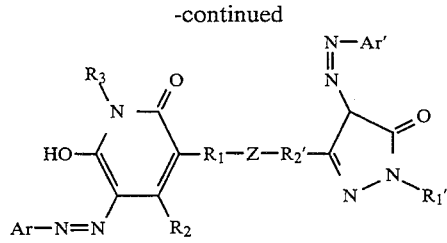

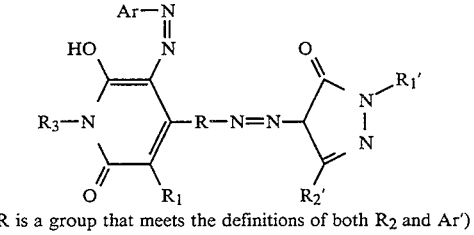

(R is a group that meets the definitions of both $R_2$ and $Ar'$)

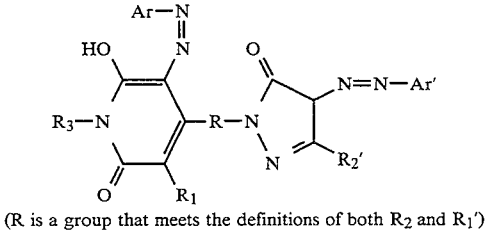

(R is a group that meets the definitions of both $R_2$ and $R_1'$)

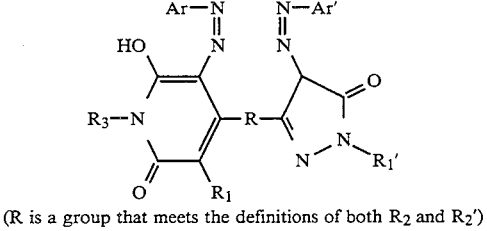

(R is a group that meets the definitions of both $R_2$ and $R_2'$)

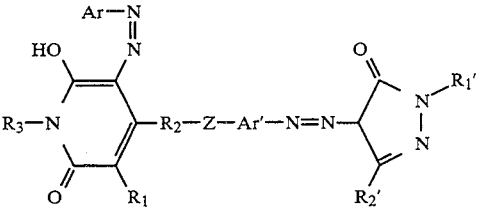

-continued
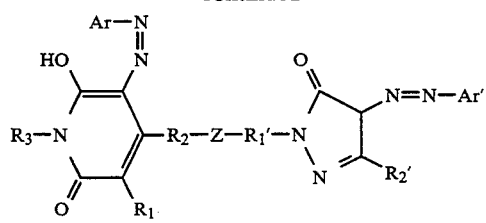
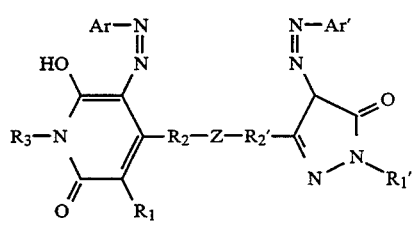
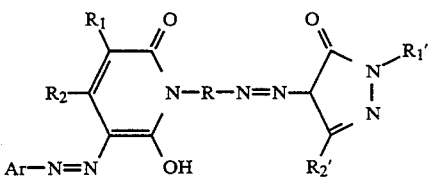
(R is a group that meets the definitions of both R3 and Ar')
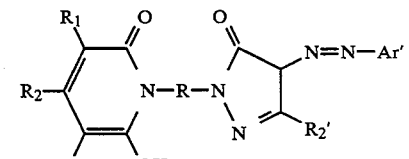
(R is a group that meets the definitions of both R3 and R1')
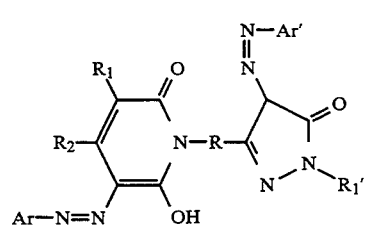
(R is a group that meets the definitions of both R3 and R2')
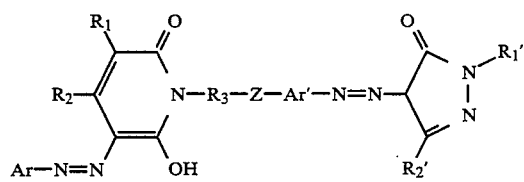
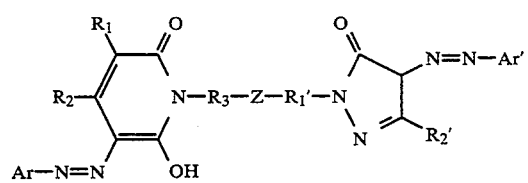
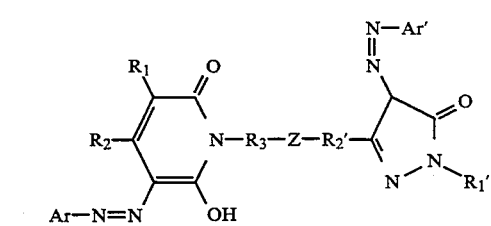
-continued
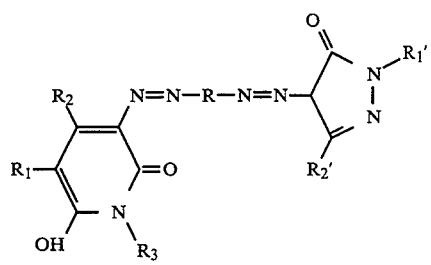
(R is a group that meets the definitions of both Ar and Ar')
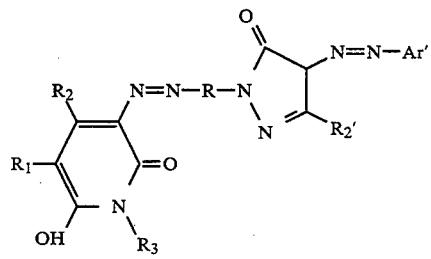
(R is a group that meets the definitions of both Ar and R1')
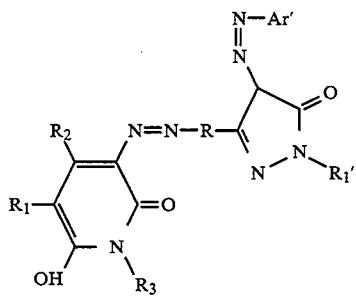
(R is a group that meets the definitions of both Ar and R2')
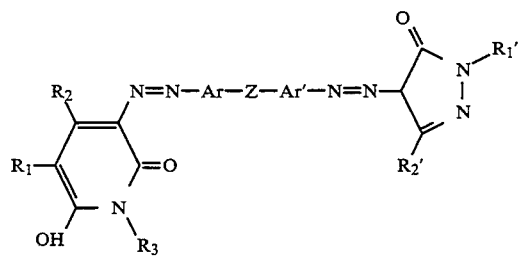
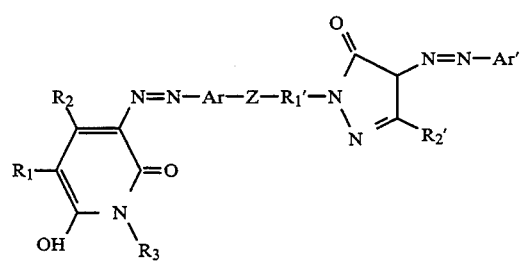

-continued

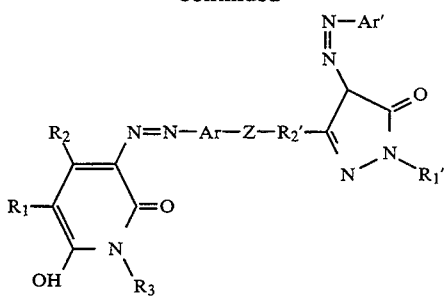

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, Ar is selected from the group consisting of aryl, substituted aryl, arylalkyl, and substituted arylalkyl, $R'_1$ is selected from the group consisting of hydrogen, alkyl, substituted alkyl, aryl, substituted aryl, arylalkyl, and substituted arylalkyl, $R'_2$ is selected from the group consisting of hydrogen, alkyl, substituted alkyl, aryl, substituted aryl, arylalkyl, and substituted arylalkyl, Ar' is selected from the group consisting of aryl, substituted aryl, arylalkyl, and substituted arylalkyl, and Z is selected from the group consisting of alkyl, substituted alkyl, aryl, substituted aryl, arylalkyl, and substituted arylalkyl. These colorants and the corresponding trimers and polymers can be prepared by reacting the chromophore moieties with a bridging group, and, if desired, with a terminal group in any desired order to obtain the desired product. The synthetic processes are similar to those employed for preparing the monomeric colorants except that the reaction stoichiometry may vary.

Further information regarding processes useful for the synthesis of colorants is disclosed in, for example, K. Venkataraman, "The Chemistry of Synthetic Dyes", Vol. 1, Academic Press (New York 1952); *Organic and Biological Chemistry, A Series of Monographs*, Academic Press, New York (1952); H. A. Lubs (editor), *The Chemistry of Synthetic Dyes and Pigments*, Robert E. Krieger Publishing Co., Inc., Malabar, Fla. (1982); H. R. Schwander, "Heterocyclic Azo Coupling Components," *Dyes and Pigments*, 3, 133–160 (1982); A. Ya. Zheltov, E. N. Avramenko, and B. I. Stepanov, "Investigations in the Regions of Aromatic Disulfides. X. Synthesis and Properties of Stilbene-2,2'-Disulfide and Its Derivatives," translated from *Zhurnal Organicheskoi Khimii*, 16, (2) 384–390, February, 1980; U.S. Pat. No. 4,284,782; N. R. Ayyangar, R. J. Lahoti, K. V. Srinivasan, Thomas Daniel and H. K. Venkataramaih, "Phenyl 3-aminobenzenesulphonates: New Intermediates for Arylazopyridone Disperse Dyes," *Dyes and Pigments*, 17, 279–286 (1991); Qinji Peng, Mujie, Li, Kunyu Gao and Lubai Cheng, "Hydrazone-Azo Tautomerism of Pyridone Azo Dyes. Part II: Relationship between Structure and pH Values," *Dyes and Pigments*, 15, 263–274 (1991); A. Cee, B. Horáková, and A. Ly cka, "Structural Analysis of Substituted 3-Arylazo-2-hydroxy-6-pyridones," *Dyes and Pigments*, 9, 357–369 (1988); Ing Jing Wang, Yu Jen Hsu, and Jyn Hen Tian, "Synthesis and Properties of Some Pyridone Chromium Complex Azo Dyes," *Dyes and Pigments*, 16, 8391 (1991); P. Gregory, *Dyes for Polyacrylonitrile*, pp. 192–193, in *Chemistry and Application of Dyes*, D. R. Waring & G. Hallon, eds., Plenum Press (New York 1990); J. T. Guthrie, "Polymeric Colorants," *Rev. Prog. Color,* 20, 40 (1990); and Cheng Lubai, et al., "Colour and Constitution of Azo Dyes Derived from 2-Thioalkyl-4,6odiaminopyridines and 3-Cyano-1,4-dimethyl-6-hydroxy-2-pyridone as Coupling Components," *Dyes and Pigments,* 7, 373–388 (1986), the disclosures of each of which are totally incorporated herein by reference.

In aqueous ink compositions, such as those suitable for use in ink jet printing, particularly thermal ink jet printing, the colorant is present in the ink in any amount effective to obtain the desired color and intensity. Typically, the colorant is present in the ink in an amount of from about 0.1 to about 15 percent by weight, preferably from about 0.5 to about 10 percent by weight, and more preferably from about 1 to about 5 percent by weight, although the amount can be outside these ranges.

Aqueous ink compositions, such as those suitable for use in ink jet printing, particularly thermal ink jet printing, generally also contain a humectant. The humectant typically is an organic material miscible with water. Examples of suitable humectants include ethylene glycol, propylene glycol, diethylene glycols, glycerine, dipropylene glycols, polyethylene glycols, polypropylene glycols, amides, urea, substituted ureas, ethers, carboxylic acids, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. The humectant can be present in the ink composition in any effective amount. Typically, the humectant is present in an amount of from about 3 to about 70 percent by weight, preferably from about 5 to about 50 percent by weight, and more preferably from about 10 to about 30 percent by weight, although the amount can be outside these ranges.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

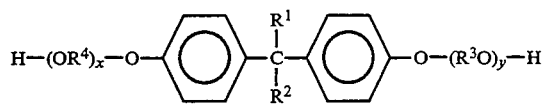

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. Typically, the ink viscosity is no more than about 5 centipoise, and preferably is from about 1 to about 2.5 centipoise, although the viscosity can be outside this range.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

In another embodiment of the present invention, the colorant compositions disclosed herein are employed in dye diffusion transfer imaging processes. Specifically, this embodiment of the present invention is directed to a process which comprises (a) providing a donor element comprising a substrate and a dye selected from the group consisting of: (a) those of Formula I

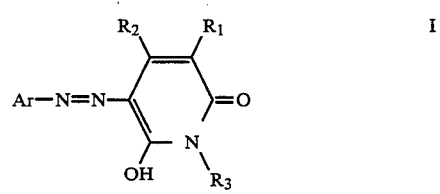

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

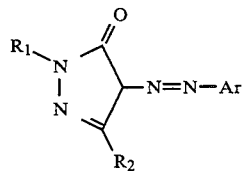

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof; and (b) applying heat imagewise to the donor element, thereby causing dye to transfer in imagewise fashion from the donor element to a substrate.

Thermal printing processes entail transfer of a dye from a donor element to a substrate in imagewise fashion by the application of heat. According to one method of obtaining such prints, an electronic picture is first subjected to color separation by color filters. The respective color-separated images are then converted into electrical signals. These signals are then operated on to produce cyan, magenta, and yellow electrical signals. These signals are then transmitted to a thermal printer. To obtain the print, a cyan, magenta, or yellow dye-donor element is placed face to face with a dye-receiving element. The two are then inserted between a thermal printing head and a platen roller. A line-type thermal printing head is used to apply heat from the back of the dye-donor sheet. The thermal printing head has many heating elements and is heated sequentially in response to the cyan, magenta, and yellow signals. The process is then repeated for the other two colors. A color hard copy is thus obtained which corresponds to the original picture viewed on a screen. Further details of this process and an apparatus for carrying it out are disclosed in, for example, U.S. Pat. No. 4,621,271, the disclosure of which is totally incorporated herein by reference.

Another method of thermal printing using electronic signals is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. A laser imaging system typically involves a donor element comprising a dye layer containing an infrared-absorbing material, such as an infrared-absorbing dye, and one or more image dyes in a binder. Further details of this process are disclosed in, for example, British Patent Publication 2,083,726A, the disclosure of which is totally incorporated herein by reference.

Further details regarding dye diffusion transfer imaging processes are disclosed in, for example, U.S. Pat. Nos. 5,250,496, 5,248,992, 5,244,861, 5,244,770, 5,242,889, 5,241,328, 5,240,900, 5,240,899, 5,234,891, 5,234,890, 5,234,889, 5,164,742, 3,900,318, 4,251,611, 4,262,078, 4,238,562, 4,230,784, 4,124,384, 4,456,669, 4,973,572, PCT publication WO 88/07450, copending application U.S. Ser. No. 07/802,981, entitled "Sublimable Dye Toner, Method of Manufacture and Method of Use," filed Dec. 6, 1991, with the named inventor Christopher Snelling, and "Fabrication of Color Filter Arrays for Solid-State Imagers by Laser Induced Dye Diffusion into Polymers," *Journal of Imaging Science*, 29(5), pages 161–163, R. O. Loutfy et al. (September/October 1985), the disclosures of each of which are totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Pyridinium acetamide chloride, of the formula

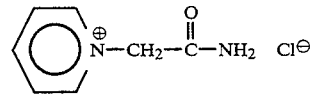

was prepared as described at page 192 in P. Gregory, *Dyes for Polyacrylonitrile*, Plenum Press (New York 1990), the disclosure of which is totally incorporated herein by reference. More specifically, chloroacetamide (93.5 g, obtained from Aldrich Chemical Co., Milwaukee, Wisc.) and dimethyl formamide (200 mL, obtained from Aldrich Chemical Co., Milwaukee, Wisc.) were heated to form a solution in a 1 liter, 3-neck flask equipped with a mechanical stirrer and reflux condenser. Pyridine (85 mL, obtained from Aldrich Chemical Co., Milwaukee, Wisc.) was then added and the reaction was heated to 110° C. with continued stirring for 1 hour. The solid product was filtered, slurried in acetone (500 mL), and then refiltered. After vacuum drying at 40° C., pyridinium acetamide chloride (157.4 grams) was obtained.

EXAMPLE II

1-Hydrido-6-hydroxy-3-pyridinium-4-methyl-2-pyridone chloride, of the formula

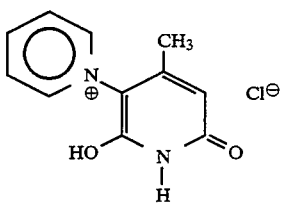

was prepared as described at page 192 in P. Gregory, *Dyes for Polyacrylonitrile*, Plenum Press (new York 1990), the disclosure of which is totally incorporated herein by reference. More specifically, ethyl acetoacetate (118 g, obtained from Aldrich Chemical Co., Milwaukee, Wisc.), pyridium acetamide (157.4 g, obtained from Aldrich Chemical Co., Milwaukee, Wisc.) and methanol (454 mL) were combined in a 1 liter, 3-neck flask equipped with a mechanical stirrer, an addition funnel, and a reflux condenser. Sodium hydroxide (36.3 g) in water (91 mL) was added. The reaction mixture was then boiled for 3 hours at reflux. After cooling to 25° C., the product was isolated by filtration and vacuum dried to yield 156.1 grams.

EXAMPLE III 1,4-Dimethyl-6-hydroxy-3-cyano-2-pyridone, of the formula

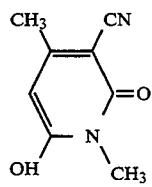

was prepared as described in U.S. Pat. No. 4,284,782, the disclosure of which is totally incorporated herein by reference. More specifically, methyl cyanoacetate (99 g, obtained from Aldrich Chemical Co., Milwaukee, Wisc.) in a 1 liter, 3-neck flask equipped with an addition funnel and mechanical stirrer was cooled to between 5° and 10° C. using an ice bath. With stirring, an aqueous solution containing 40 percent by weight methylamine (178.6 grams, obtained from Aldrich Chemical Co., Milwaukee, Wisc.) was added. After 1 hour, acetoacetic acid ethyl ester (149.6 grams, obtained from Aldrich Chemical Co., Milwaukee, Wisc.) was added. The mixture was then heated in a pressure reaction vessel 4 hours at 85° C. An aqueous solution containing 27 percent by weight sodium hydroxide (296 g) was added, and then 33 grams of distillate were removed at 85° C. by simple distillation. The mixture was added to ice (100 g) and an aqueous solution containing 61 percent by weight sulfuric acid (21.7 g). Vigorous frothing took place. The prouct was isolated by filtration, washed with water, and then vacuum dried to yield 147.1 g. After recrystallization from ethanol, the product decomposed between 272° and 285° C.

EXAMPLE IV 4,4'-Trimethylene-bis(pyridium acetamide chloride), of the formula

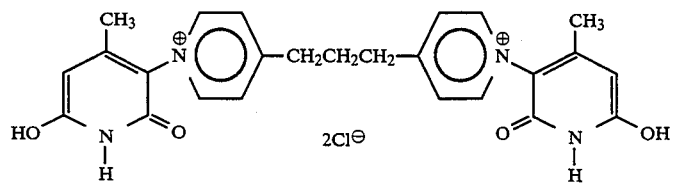

was prepared as follows. To a 1 liter, 3-neck flask equipped with a mechanical stirrer, reflux condenser, and addition funnel was added chloroacetamide (93.5 g, 1 mol, obtained from Aldrich Chemical Co., Milwaukee, Wisc.) and dimethyl formamide (200 mL, obtained from Aldrich Chemical Co., Milwaukee, Wisc.). The mixture was warmed to 45° C. to form a solution, and then 4,4'-trimethylenedipyridine (100 g, 0.504 mol, obtained from Aldrich Chemical Co., Milwaukee, Wisc.) was added with stirring. The reaction was heated for 1 hour between 100° and 110° C. After the mixture was allowed to cool to 25° C., the product was isolated by filtration, slurried in acetone (500 mL), refiltered, and then vacuum dried at 40° C. to obtain 181.4 g of the product.

EXAMPLE V 4,4'-Trimethylene-bis(pyridium acetamide chloride), of the formula

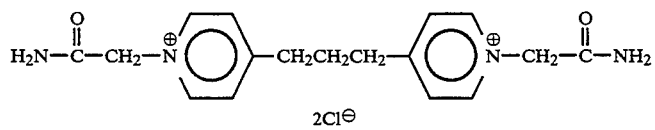

was prepared as follows. A 1 liter, 3-neck flask was equipped with a mechanical stirrer, reflux condenser, and addition funnel. To a rapidly stirring mixture of ethyl acetoacetate (130 g, 1 mol, obtained from Aldrich Chemical Co., Milwaukee, Wisc.) and trimethylene-bis(pyridinium acetamide chloride) (166.5 g, prepared as described in Example IV)in methanol (500 mL) was added 80 g of an aqueous solution containing 50 percent by weight sodium hydroxide (1 mol) diluted with water to 100 mL. After boiling at reflux for 3 hours, the mixture was cooled to 25° C. and the product was isolated by filtration and vacuum dried to obtain 59 grams.

EXAMPLE VI

A yellow colorant of the formula

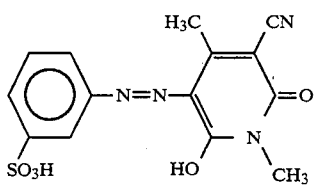

was prepared as follows. Metanilic acid (3.06 g, obtained from Fisher Scientific, Pittsburgh, Pa.) in water (50 mL) and concentrated hydrochloric acid (5 mL) at between 0° and 5° C. were combined with an aqueous solution containing sodium nitrite (97 percent by weight pure, 1.17 g) in water (15 mL) at between 0° and 5° C. with ice bath cooling for 30 minutes. This solution was added to the cyano-pyridone (2.8 g) prepared as described in Example III in water (200 mL) containing sodium acetate ( 1.8 g) and sodium hydroxide (0.89 g) with magnetic stirring and ice bath cooling for 4 hours at 5° C. Ethanol (200 mL) was added and the resultant crystals that formed were isolated by filtration and vacuum dried to yield the yellow colorant.

EXAMPLE VII

A yellow colorant of the formula

The crystals that formed were isolated by filtration and vacuum dried to yield the yellow colorant.

EXAMPLE VIII

A yellow colorant of the formula

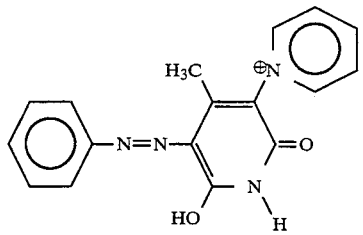

was prepared as follows. Aniline (1.58 g, obtained from Fisher Scientific, Pittsburgh, Pa.) in water (50 mL) and concentrated hydrochloric acid (5 mL) at between 0° and 5° C. were combined with an aqueous solution containing sodium nitrite (97 percent by weight pure, 1.17 g) in water (15 mL) at between 0° and 5° C. with ice bath cooling for 30 minutes. This solution was added to the pyridiniumopyridone (4 g) prepared as described in Example II in water (200 mL) with magnetic stirring and ice bath cooling for 1 hour at 5° C. The yellow colorant crystallized and was isolated by filtration and vacuum dried.

EXAMPLE IX

A colorant of the formula

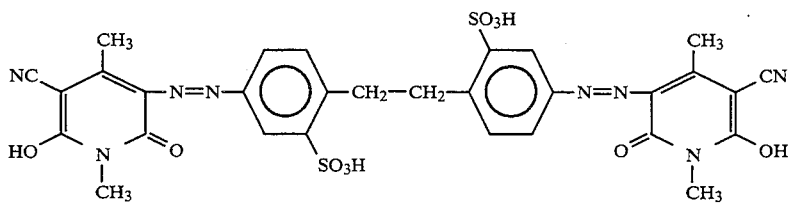

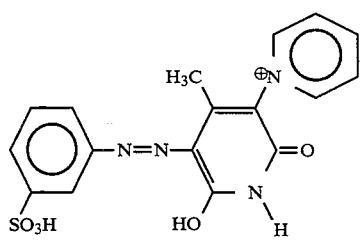

was prepared as follows. Metanilic acid (3.06 g, obtained from Fisher Scientific, Pittsburgh, Pa.) in water (50 mL) and concentrated hydrochloric acid (5 mL) at between 0° and 5° C. were combined with an aqueous solution containing sodium nitrite (97 percent by weight pure, 1.17 g) in water (15 mL) at between 0° and 5° C. with ice bath cooling for 30 minutes. This solution was added to the pyridinium-pyridone (4 g) prepared as described in Example II in water (200 mL) with magnetic stirring and ice bath cooling for 1 hour at 5° C.

was prepared as follows. A solution of 4,4'-diaminostilbene-2,2'-disulfonic acid (3.2 g, obtained from Eastman Kodak Co., Rochester, N.Y.) in water (50 mL) and chopped ice (20 g) at 5° C. admixed with 2 mL of water containing 0.69 g of sodium hydroxide was combined with sodium nitrite (97 percent by weight pure, 1.44 g) in water (10 mL) at 5° C. Concentrated (10 molar) hydrochloric acid ( 5 mL) was added and the resultant mixture was stirred for 30 minutes. The above mixture was added to the cyano-pyridone (3.28 g) prepared as described in Example III in 100 mL water with sodium hydroxide (1.82 g) and sodium acetate (3.6 g) at 5° C. with ice bath cooling. After 1 hour the colorant product was salted out of solution with saturated aqueous potassium chloride and isolated by filtration.

EXAMPLE X

A greenish purple colorant of the formula

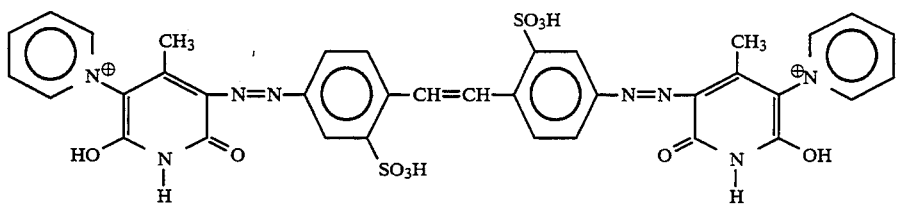

was prepared as follows. A solution of 4,4'-diaminostilbene-2,2'-disulfonic acid (3.2 g, obtained from Eastman Kodak Co., Rochester, N.Y.) in water (50 mL) and chopped ice (20 g) at 5° C. admixed with 2 mL of water containing 0.69 g sodium hydroxide was combined with sodium nitrite (97 percent by weight pure, 1.44 g) in water (10 mL) at 5° C. Concentrated (10 molar) hydrochloric acid ( 5 mL) was added and the resultant mixture was stirred for 30 minutes. The above mixture was added to the pyridinium pyridone (4.77 g) prepared as described in Example II in 100 mL water with sodium hydroxide (1.82 g) and sodium acetate (3.6 g) at 5° C. with ice bath cooling. After 1 hour the colorant product was salted out of solution with saturated aqueous potassium chloride and isolated by filtration.

EXAMPLE XI

A yellow colorant of the formula

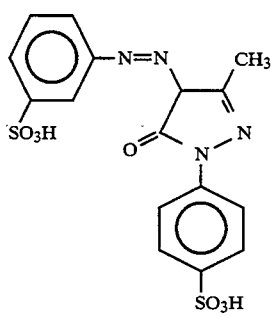

was prepared as follows. Metanilic acid (3.06 g, obtained from Eastman Kodak Co., Rochester, N.Y.) in water (50 mL) and concentrated hydrochloric acid (5 mL) at between 0° and 5° C. were combined with an aqueous solution containing sodium nitrite (97 percent by weight pure, 1.22 g) in water (15 mL) at between 0° and 5° C. with ice bath cooling for 30 minutes. This solution was added to 3-methyl-1-(p-sulfophenyl)-2-pyrazolin-5-one (4.49 g, obtained from Eastman Kodak Co., Rochester, N.Y.) in water (200 mL) containing sodium hydroxide (0.8 g) and sodium acetate (1.8 g) with magnetic stirring and ice bath cooling for 1 hour at 5° C. Ethanol was added until the solution became cloudy, and the resultant yellow colorant was isolated by filtration and vacuum dried.

EXAMPLE XII

A yellow colorant of the formula

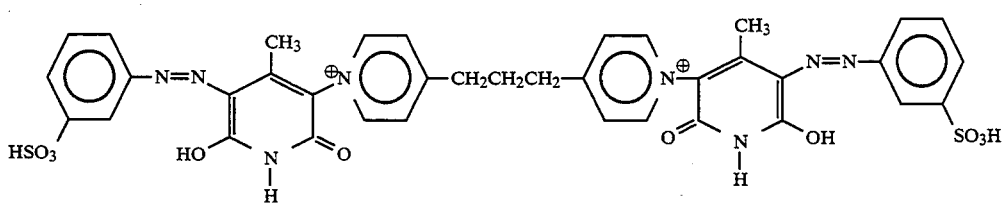

was prepared as follows. Metanilic acid (2.68 g, obtained from Eastman Kodak Co., Rochester, N.Y.) in water (50 mL) and concentrated hydrochloric acid (5 mL) at between 0° and 5° C. were combined with an aqueous solution containing sodium nitrite (97 percent by weight pure, 1.07 g) in water (15 mL) at between 0° and 5° C. with ice bath cooling for 30 minutes. This diazonium salt solution was rapidly added to an aqueous solution of a bis(pyridinium-pyridone) of the formula

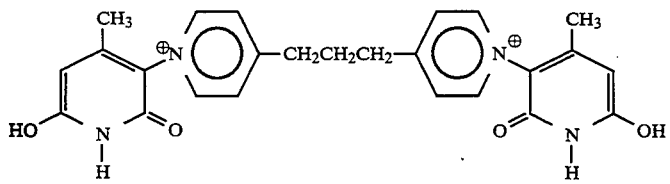

prepared as follows: a bis(pyridinium-pyridone) (4 g, 0.0155 mol) as prepared in Example V in water (350 mL) was heated to between 60° and 70° C. The resultant solution was then cooled using an ice bath until just before the first appearance of crystals (which would have formed somewhere between 25° and 30° C.). The combined diazonium salt and bis(pyridinium-pyridone) solutions were allowed to react with magnetic stirring for 1 hour at 5° C. The crystals that formed were isolated by filtration and vacuum dried to yield the yellow colorant.

EXAMPLE XIII

A yellow colorant of the formula

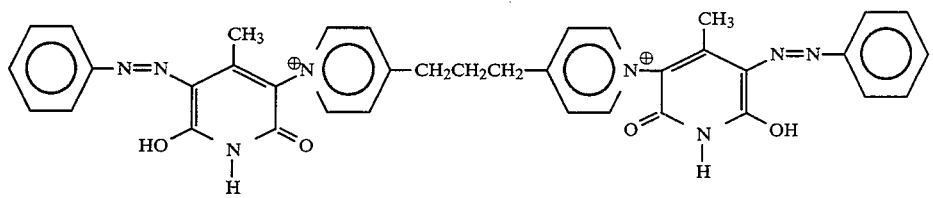

was prepared as follows. Aniline (1.44 g, obtained from Fisher Scientific, Pittsburgh, Pa.) in water (50 mL) and concentrated hydrochloric acid (5 mL) at between 0° and 5° C. were combined with an aqueous solution containing sodium nitrite (97 percent by weight pure, 1.07 g) in water (15 mL) at between 0° and 5° C. with ice bath cooling for 30 minutes. This diazonium salt solution was rapidly added to an aqueous solution of a bis(pyridiniumpyridone) of the formula

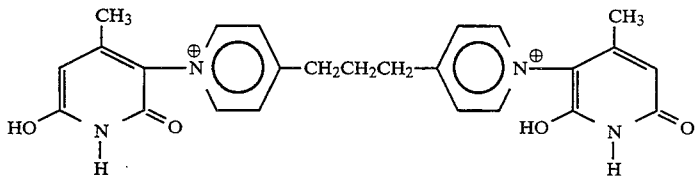

prepared as follows: a bis(pyridinium-pyridone) (4 g, 0.0155 moll as prepared in Example V and water (350 mL) were heated between 60° and 70° C. and the resultant solution was then cooled using an ice bath until just before the first appearance of crystals (which would have formed somewhere between 25° and 30° C.). The combined diazonium salt and bis(pyridinium-pyridone) solutions were allowed to react with magnetic stirring for 1 hour at 5° C. The crystals that formed were isolated by filtration and vacuum dried to yield the yellow colorant.

EXAMPLE XIV

A yellow colorant of the formula

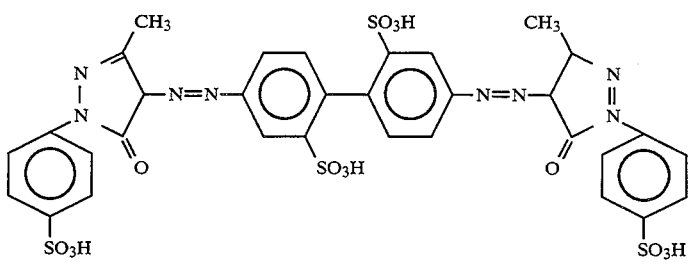

was prepared as follows. 4,4'-Diamino-2,2'biphenyldisulfonic acid (3 g, 0.0087 mol, obtained from Pfaltz & Bauer, Waterbury, Conn.) in water (75 mL) and concentrated hydrochloric acid (5 mL) at between 0° and 5° C. were combined with an aqueous solution containing sodium nitrite (97 percent by weight pure, 1.20 g) in water (15 mL) at between 0° and 5° C. with ice bath cooling for 30 minutes. This solution was added to 3-methyl-1-(p-sulfophenyl)-2-pyrazolin-5-one (4.43 g, obtained from Eastman Kodak Co., Rochester, N.Y.) in water (300 mL) containing sodium hydroxide (0.8 g) and sodium acetate (1.8 g) with magnetic stirring and ice bath cooling for 1 hour at 5° C. Ethanol was added until the solution became cloudy and the resultant yellow colorant was isolated by filtration and vacuum dried.

EXAMPLE XV

An orange colorant of the formula

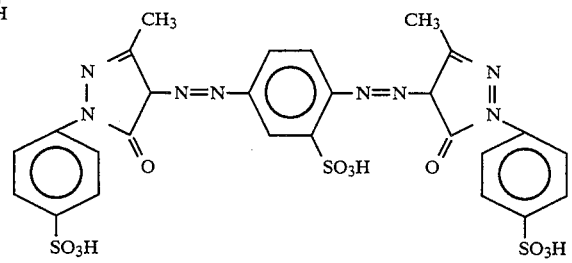

was prepared as follows. 2,5-Diamino-benzenesulfonic acid (1.5 g, 0.00795 mol, obtained from Pfaltz & Bauer, Waterbury, Conn.) in water (75 mL) and concentrated hydrochloric acid (5 mL) at between 0° and 5° C. were combined with an aqueous solution containing 97 percent by weight sodium nitrite (1.1 g) in water (15 mL) at between 0° and 5° C. with ice bath cooling for 30 minutes. This solution was added to 3-methyl-1-(p-sulfophenyl)-2-pyrazolin-5-one (4.05 g, 0.0160 mol, obtained from Eastman Kodak Co., Rochester, N.Y.) in water (200 mL) containing sodium hydroxide (0.8 g) and sodium acetate (1.8 g) with magnetic stirring and ice bath cooling for 1 hour at 5° C. Ethanol was added until the solution became cloudy, and the resultant orange colorant was isolated by filtration and vacuum dried.

EXAMPLE XVI

A green-yellow colorant of the formula

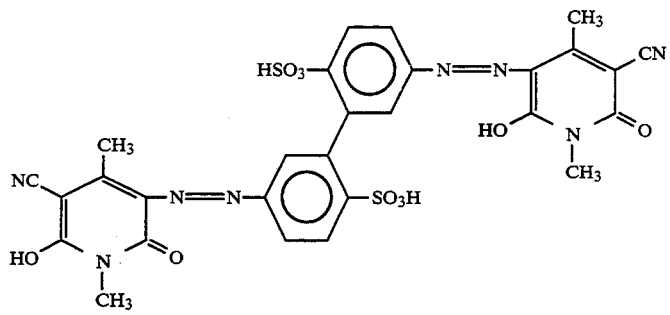

was prepared as follows. 4,4'-Diamino-2,2'biphenyldisulfonic acid (3 g, 0.0087 mol, obtained from Pfaltz & Bauer, Waterbury, Conn.) in water (75 mL) and concentrated hydrochloric acid (5 mL) at between 0° and 5° C. were combined with an aqueous solution containing 97 percent by weight sodium nitrite (1.23 g, 0.0174 mol) in water (15 mL) at between 0° and 5° C. with ice bath cooling for 20 minutes. This solution was added to a cyanopyridone (2.86 g) prepared as described in Example III in water (300 mL) containing sodium hydroxide (0.8 g) and sodium acetate (1.8 g) with magnetic stirring and ice bath cooling for 1 hour at 5° C. Ethanol was added until the solution became cloudy, and the resultant yellow colorant was isolated by filtration and vacuum dried.

EXAMPLE XVII

A yellow colorant of the formula

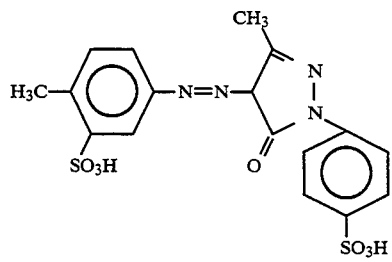

was prepared as follows. 5-Amino-2-methylbenzene sulfonic acid (3 g, 0.0160 mol, obtained from Pfaltz & Bauer, Waterbury, Conn.) in water (50 mL) and concentrated hydrochloric acid (5 mL) at between 0° and 5° C. were combined with an aqueous solution containing 97 percent by weight sodium nitrite (1.14 g, 0.0160 mol) in water (15 mL) at between 0° and 5° C. with ice bath cooling for 30 minutes. This solution was added to 3-methyl-1-(p-sulfophenyl)-2-pyrazolin-5-one (4.07 g, 0.0160 mol, obtained from Eastman Kodak Co., Rochester, N.Y.) in water (200 mL) containing sodium hydroxide (0.8 g) and sodium acetate (1.8 g) with magnetic stirring and ice bath cooling for 1 hour at 5° C. Ethanol was added until the solution became cloudy, and the resultant yellow colorant was isolated by filtration and vacuum dried. An alcohol-soluble yellow colorant portion was also obtained by evaporation of the reaction mixture using a rotary evaporator.

EXAMPLE XVIII

A yellow colorant of the formula

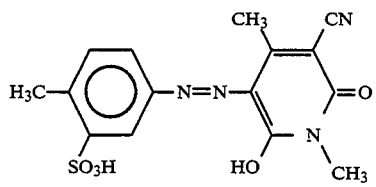

was prepared as follows. 5-Amino-2-methylbenzene sulfonic acid (3 g, 0.0160 mol, obtained from Pfaltz & Bauer, Waterbury, Conn.) in water (50 mL) and concentrated hydrochloric acid (5 mL) at between 0° and 5° C. were combined with an aqueous solution containing 97 percent by weight sodium nitrite (1.14 g, 0.0160 mol) in water (15 mL) at between 0° and 5° C. with ice bath cooling for 30 minutes. This solution was added to a cyanopyridone (2.63 g, 0.0160 mol) prepared as described in Example III in water (200 mL) containing sodium hydroxide (0.8 g) and sodium acetate (1.8 g) with magnetic stirring and ice bath cooling for 1 hour at 5° C. The mixture turned into an orange-red jelly. Ethanol was added until the solution became cloudy, and the resultant yellow colorant was isolated by filtration and vacuum dried.

EXAMPLE XIX

A yellow colorant of the formula

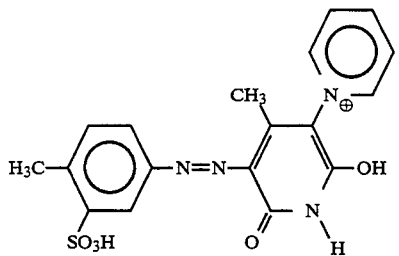

was prepared as follows. 5-Amino-2-methylbenzene sulfonic acid (3 g, 0.0160 mol, obtained from Pfaltz & Bauer, Waterbury, Conn.) in water (50 mL) and concentrated hydrochloric acid (5 mL) at between 0° and 5° C. were combined with an aqueous solution containing 97 percent by weight sodium nitrite (1.14 g, 0.0160 mol) in water (15 mL) at between 0° and 5° C. with ice bath cooling for 30 minutes. This solution was added to a pyridinium pyridone (3.82 g, 0.0160 mol) prepared as described in Example II in water (200 mL) containing sodium hydroxide (0.8 g) and sodium acetate (1.8 g) with magnetic stirring and ice bath cooling for 1 hour at 5° C. The mixture turned into an orange-red jelly. Ethanol was added until the solution became cloudy, and the resultant yellow colorant was isolated by filtration and vacuum dried.

EXAMPLE XXII 4,4'-bibenzyl-2,2'-disulfonic acid-bis(4-methyl-6-hydroxy-3-cyano-2-pyridone), of the formula

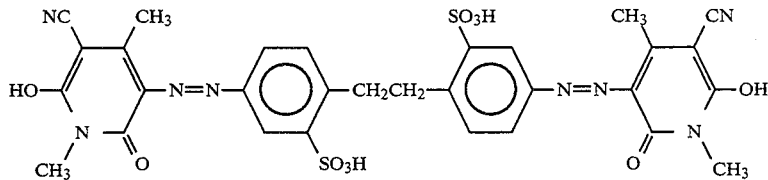

EXAMPLE XX 4,4'-Dinitrobibenzyl-2,2'-disulfonate was prepared as described in A. Ya. Zheltov, E. N. Avramenko, and B. I. Stepanov, *Zhurnel Organicheskoi Khimii,* 16, (2) 384–390 (1980), the disclosure of which is totally incorporated herein by reference. More specifically, 4,4'-dinitrobibenzyl-2,2'-disulfonate was prepared as follows. A solution (220 mL) of NaOCl (17.8 g) was prepared by passing chlorine through sodium hydroxide (20 g) in water (100 mL) with crushed ice (120 g) at 1° to 3° C. until the weight of the solution increased by 17 grams. To a stirred solution of 4-nitrotoluene-2-sulfonic acid (90.4 g, obtained from Pfaltz & Bauer, Waterbury, Conn.) in water (1 L) at 60° C. was added sodium hydroxide (16.8 g), NaOCl solution (50 mL), and gradually a solution of sodium hydroxide (200 g) in water (470 mL). To the resulting suspension was added NaOCl solution (120 mL). The reaction mixture was stirred 25 minutes at 65° C. More NaOCl solution (50 mL) was added and the mixture was transferred to a container containing 2 kg of ice. A 20 gram portion of finely ground sodium chloride was added, and the mixture was stirred for 20 minutes. The resulting white precipitate of disulfonic acid was filtered off, washed with saturated sodium chloride solution, and then dissolved in water (2 L). An aqueous solution containing 6 percent by weight potassium permanganate was added to the solution at 20° C. until a permanent light pink color was achieved. The mixture was filtered, and sodium chloride (80 g) was added to the filtrate at 50° C. in portions. The mixture was then stirred at 10° C. for 2 hours. The resulting precipitate was filtered off, washed with acetone, and then dried. The yield of disodium 4.4'-dinitrobibenzyl-2,2'-disulfonate was 64 grams.

EXAMPLE XXI 4,4'-Diamino-bibenzyl-2,2'-disulfonic acid was prepared as described in A. Ya. Zheltov, E. N. Avramenko, and B. I. Stepanov, *Zhurnel Organicheskoi Khimii,* 16, (2) 384–390 (1980), the disclosure of which is totally incorporated herein by reference. More specifically, 4,4'-diaminobibenzyl-2,2'-disulfonic acid was prepared as follows. To a solution of disodium 4,4'-bibenzyl-2,2'disulfonate (95.2 g, obtained as described in Example XX) in water (2 L), was added 96% aqueous hydrazine hydrate (60 mL) and Raney nickel suspension (3 mL, obtained from Aldrich Chemical Co., Milwaukee, Wisc.). The mixture was stirred at 35° to 40° C. for 40 minutes, and then more hydrazine hydrate (20 mL) and catalyst were added. The mixture was stirred until the release of nitrogen was completed. The mixture was filtered, washed with ice water and with acetone, then dried to obtain 4,4'-diaminobibenzyl-2,2'disulfonic acid (62 g).

is prepared as follows. An aqueous solution containing 50 percent by weight sodium hydroxide (18.1 g) is added to 4,4'diamino-bibenzyl-2,2'-disulfonic acid (37 g, 0.1 mol, prepared as described in Example XXI) in water (200 mL) to form a brown solution. To this is added methyl cyanoacetate (20 g, available from Aldrich Chemical Co., Milwaukee, Wisc.) with stirring at 25° C. After 16 hours continued stirring at 25° C., some sediment is evident. More 50 wt. % sodium hydroxide solution (18 g) is added. Ethyl acetoacetate (26 g, available from Aldrich Chemical Co., Milwaukee, Wisc.) is then added and the mixture is heated at 90° C. for 3.5 to 4 hours. The solution is added to 200 g ice and 27 g concentrated (61%) sulfuric acid. The product is isolated by filtration and then vacuum dried.

EXAMPLE XXIII 4,4'-Dihydrazinyl-bibenzyl-2,2'-disulfonic acid, of the formula

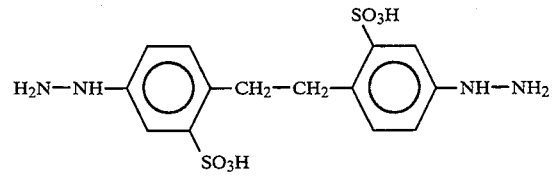

is prepared by a process similar to that used to prepare phenyl hydrazine according to G. H. Coleman, *Organic Syntheses Coll.,* vol. 1, page 442, John Wiley & Sons (New York 1941) the disclosure of which is totally incorporated herein by reference. More specifically, 4,4'-dihydrazinylbibenzyl-2,2'-disulfonic acid is prepared as follows. To a 1 liter beaker are added 4,4'-diamino-bibenzyl-2,2'-disulfonic acid (74 g, 0.2 mol, prepared as described in Example XXI), ice (50 g), and concentrated hydrochloric acid (100 mL) with ice bath cooling. Sodium nitrite (27.6 g, 0.4 mol) in water (60 mL) is added with cracked ice (100 g) to maintain the reaction temperature near 0° C., and the solution is stirred 1 hour. Meanwhile, sulfur dioxide (available from Aldrich Chemical Co., Milwaukee, Wisc.) is added to an aqueous solution containing 50 percent by weight sodium hydroxide (200 g, 0.24 mol) in an ice bath until the pH of the mixture is less than or equal to 7. The cold tetrazonium salt solution is added to the freshly prepared NaHSO3 solution and the mixture is heated at 80° C. for 30 to 60 minutes. The orange red solution progressively becomes lighter in color. Three hours later, concentrated hydrochloric acid (30 to 40 mL) is added to acidify the mixture to litmus paper. Vigorous gasing is evident and the color becomes lighter with each passsing half hour. The mixture is heated to between 60° and 70° C. overnight (16 hours). Concentrated hydrochloric acid (400 mL) is then added with ice bath cooling. The mixture is then filtered to obtain the product.

EXAMPLE XXIV

To 36.4 grams of the bis(phenyhydrazine) product obtained in Example XXIII in methanol (600 mL) is added an aqueous solution containing 50 percent by weight sodium hydroxide (80.5 g) in a 1 liter, 3-neck flask equipped with a water cooled condenser and a mechanical stirrer. Ethyl acetoacetate (23.66 g, available from Aldrich Chemical Co., Milwaukee, Wisc.) is added and the reaction is boiled between 3 and 5 hours. The product is precipitated by the addition of sulfuric acid, filtered, washed with water and then methanol, and then vacuum dried. Methyl and methylene protons characteristic of pyrazolone structures are expected to be observed in the complicated $^1$H NMR spectra of the product, which is believed to be of the formula (50 g), and concentrated hydrochloric acid (100 mL) with ice bath cooling. Sodium nitrite (27.6 g, 0.4 mol) in water (60 mL) were added with cracked ice (100 g) to maintain the reaction temperature near 0° C., and the solution was stirred 1 hour. Meanwhile, sulfur dioxide (obtained from Aldrich Chemical Co., Milwaukee, Wisc.) was added to an aqueous solution containing 50 percent by weight sodium hydroxide (200 g, 0.24 mol) in an ice bath until the pH of the mixture was less than or equal to 7. The cold tetrazonium salt solution was added to the freshly prepared NaHSO3 solution and the mixture was heated at 80° C. for 30 to 60 minutes. The orange red solution progressively became lighter in color. Three hours later, concentrated hydrochloric acid (30 to 40 mL) was added to acidify the mixture to litmus paper. Vigorous gasing was evident and the color became lighter with each passsing half hour. The mixture was heated to between 60° and 70° C. overnight (16 hours). Concentrated hydrochloric acid (400 mL) was then added with ice bath cooling. The mixture was

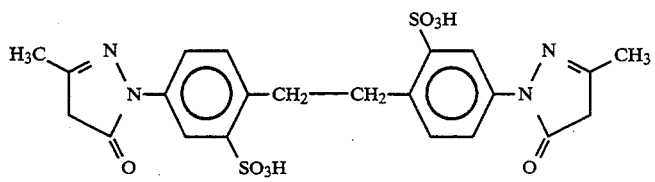

EXAMPLE XXV 4,4'-Dihydrazinyl-stilbene-2,2'-disulfonic acid, of the formula

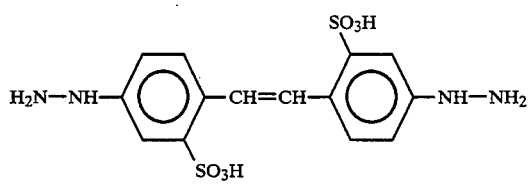

was prepared by a process similar to that used to prepare phenyl hydrazine according to G. H. Coleman, *Organic Syntheses Coll.*, vol. 1, page 442, John Wiley & Sons (New York 1941) the disclosure of which is totally incorporated herein by reference. More specifically, 4,4'-dihydrazinylstilbene-2,2'-disulfonic acid was prepared as follows. To a 1 liter beaker were added 4,4'-diaminostilbene-2,2'-disulfonic acid (74 g, 0.2 mol, obtained from Eastman Kodak Co., Rochester, N.Y.), ice then filtered to obtain the product.

EXAMPLE XXVI

To 36.4 grams of the bis(phenyhydrazine) product obtained in Example XXV in methanol (600 mL) was added an aqueous solution containing 50 percent by weight sodium hydroxide (80.5 g) in a 1 liter, 3-neck flask equipped with a water cooled condenser and a mechanical stirrer. Ethyl acetoacetate (23.66 g, obtained from Aldrich Chemical Co., Milwaukee, Wisc.) was added and the reaction was boiled between 3 and 5 hours. The product was precipitated by the addition of sulfuric acid, filtered, washed with water and then methanol, and then vacuum dried. Methyl and methylene protons characteristic of pyrazolone structures were observed in the complicated $^1$H NMR spectra of the product, which was believed to be of the formula

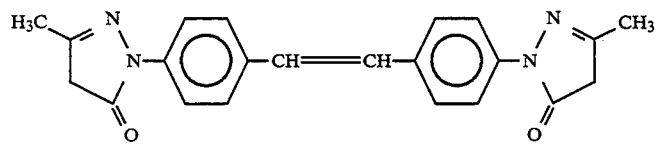

EXAMPLE XXVII

A brown colorant of the formula

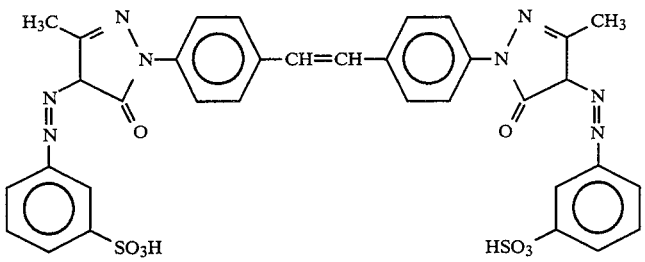

was prepared as follows. Metanilic acid (2.68 g, obtained from Fisher Scientific, Pittsburgh, Pa.) in water (50 mL) and concentrated hydrochloric acid (5 mL) at between 0° and 5° C. were combined with an aqueous solution containing 97 percent by weight sodium nitrite (1.07 g) in water (15 mL) at between 0° and 5° C. with ice bath cooling for 30 minutes. This solution was added to the bis(pyrazolone) prepared as described in Example XXVI (4.11 g) in water (300 mL) containing sufficient sodium hydroxide added to form a solution with magnetic stirring and ice bath cooling for 1 hour at 5° C. Ethanol was added until the solution became cloudy, and the resultant brown colorant was isolated by filtration and then vacuum dried.

EXAMPLE XXVIII

Aqueous ink compositions suitable for thermal ink jet printing were prepared by simple mixing of the following ingredients:

Ink A: 79 percent by weight water, 20 percent by weight ethylene glycol, 1 percent by weight colorant as prepared in Example VIII.

Ink B: 78 percent by weight water, 20 percent by weight formyl morpholine, 2 percent by weight colorant as prepared in Example XIII.

Both inks were bright lemon yellow in color. The inks were incorporated into a thermal ink jet printing test fixture and used to generate images. Ink A exhibited latency in excess of 1000 seconds and Ink B exhibited latency in excess of 500 seconds. Both inks had a flat frequency response up to 4 kHz, and operation to 7 kHz. In addition, the inks exhibited high waterfastness and good color quality.

For comparison purposes, an ink was prepared containing 79 percent by weight water, 20 percent by weight ethylene glycol, and 1 percent by weight Tartrazine Yellow dye (FD&C Yellow #5). Images were generated on paper with all three inks by ink draw down techniques with a #7 Meyer Rod onto Xerox® 10 Series paper, felt side. The waterfastness and blue reflection density (Yellow $D_{max}$) were measured for each image with the following results:

| Ink | Blue Reflection Density | Waterfastness |
| --- | --- | --- |
| Control | 0.82 | 32% |
| A | 0.92 | 84% |
| B | 0.72 | 100% |

EXAMPLE XXIX

Aqueous ink compositions are prepared as described in Example XXVIII except that the colorants prepared in Examples XI and XIV are used instead of the colorants in Examples VIII and XIII. It is believed that similar results will be observed.

Other embodiments and modifications of the present invention may occur to those skilled in the art subsequent to a review of the information presented herein, these embodiments and modifications, as well as equivalents thereof, are also included within the scope of this invention.

What is claimed is:

1. An aqueous ink composition which comprises water, a humectant, and a colorant selected from the group consisting of: (a) those of Formula I

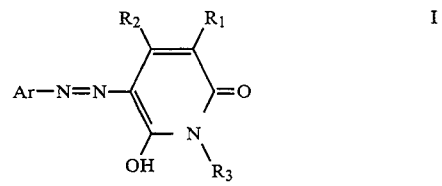

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

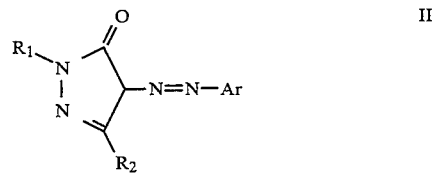

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof, said ink composition being suitable for use in an ink jet printing process.

2. Colorant compositions selected from the group consisting of: (a) dimeric compounds containing one moiety of Formula I and one moiety of Formula II, wherein Formula I is as follows:

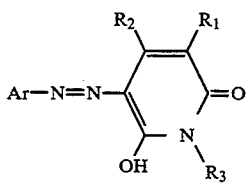

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; and Formula II is as follows:

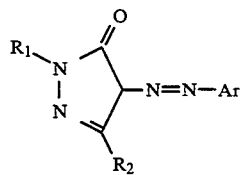

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) trimeric compounds containing three moieties of Formula II; (c) trimeric compounds containing two moieties of Formula I and one moiety of Formula II; (d) trimeric compounds containing one moiety of Formula I and two moieties of Formula II; (e) polymeric compounds containing at least four moieties selected from the group consisting of Formula I, Formula II, and mixtures thereof; (f) dimeric compounds containing two moieties of Formula III

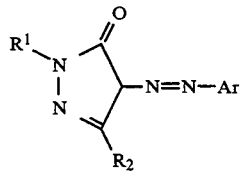

wherein $R_1$ is selected from the group consisting of hydrogen, alkyl, and substituted alkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; and (g) dimeric compounds containing two moieties of Formula IV

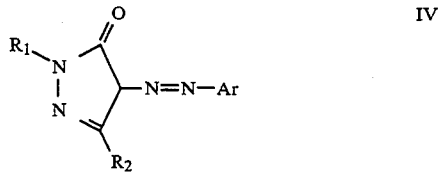

wherein $R_1$ is selected from the group consisting of hydrogen, alkyl, substituted alkyl, aryl, substituted aryl, arylalkyl, and substituted arylalkyl, $R_2$ is selected from the group consisting of aryl, substituted aryl, arylalkyl, and substituted arylalkyl, and Ar is selected from the group consisting of aryl, substituted aryl, arylalkyl, and substituted arylalkyl.

3. A process which entails (a) incorporating into an ink jet printing apparatus an ink composition which comprises water, a humectant, and a colorant selected from the group consisting of: (a) those of Formula I

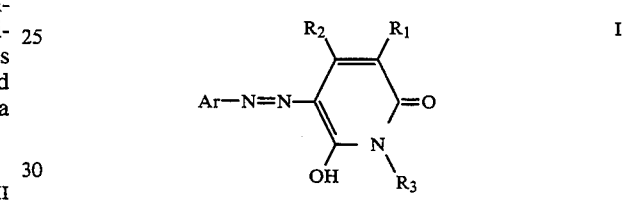

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

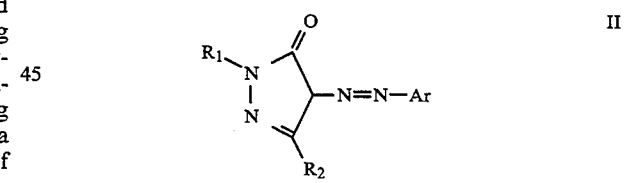

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof; and (b) causing droplets of the ink composition to be ejected in an imagewise pattern onto a substrate.
4. An aqueous ink composition for ink jet printing which comprises water, a humectant, and a colorant selected from the group consisting of
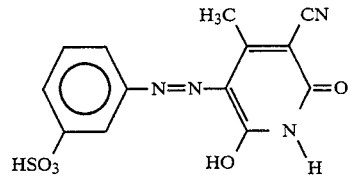
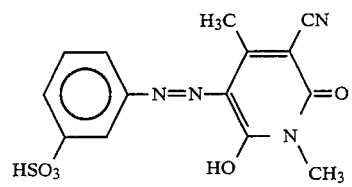
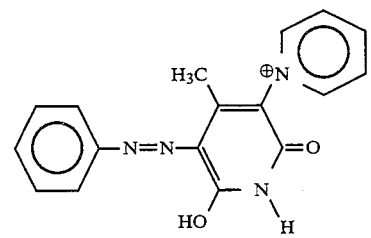
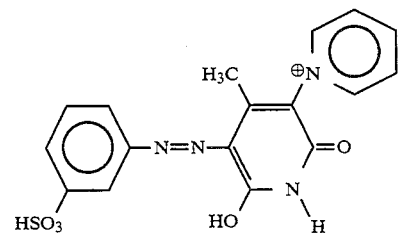
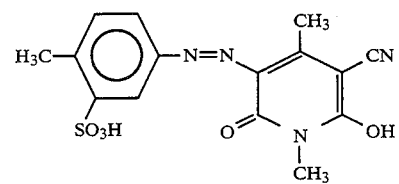
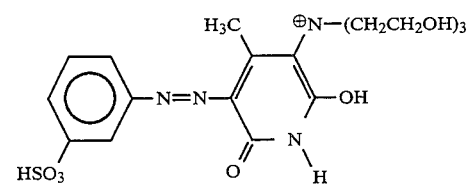
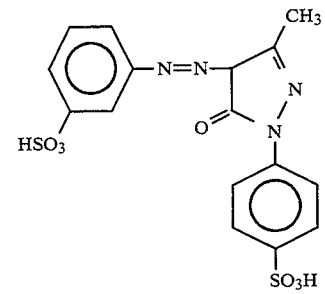

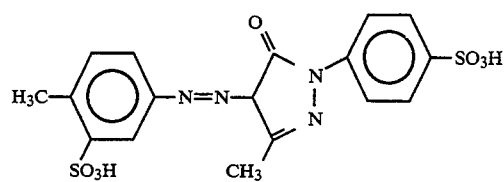
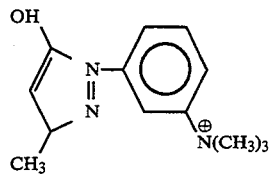
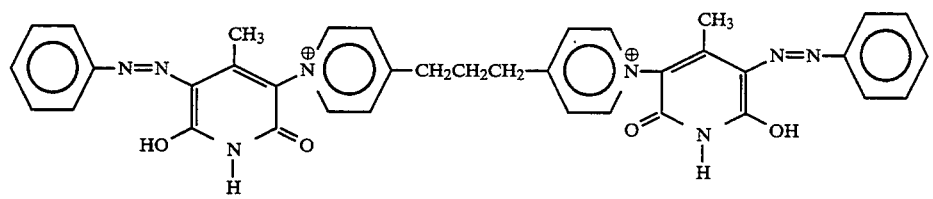
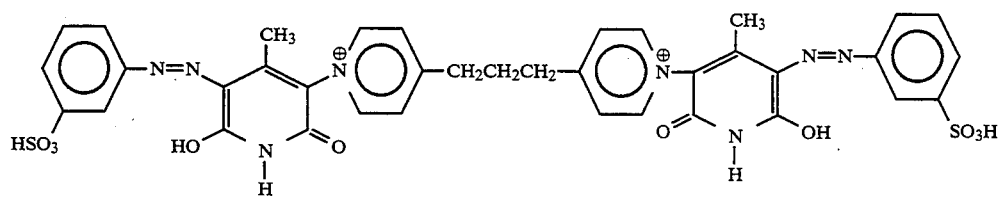
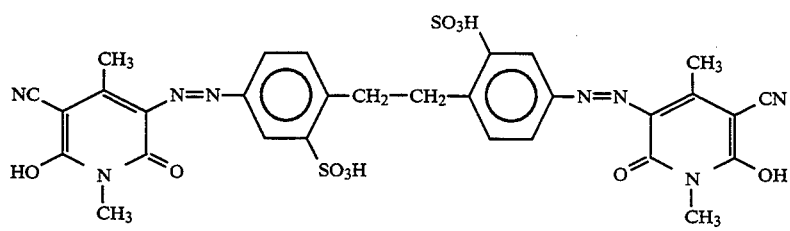
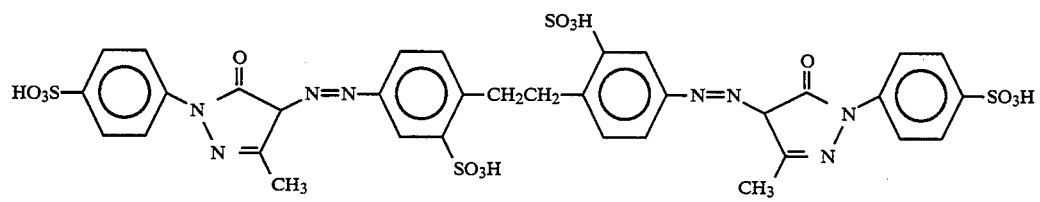
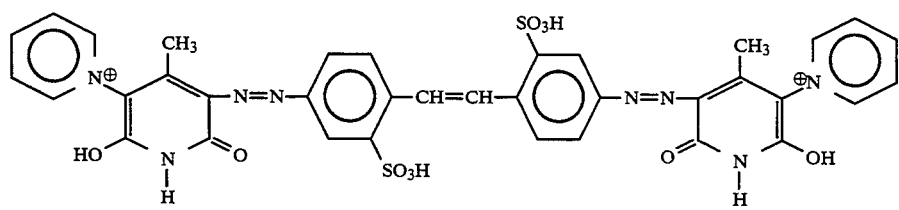

-continued
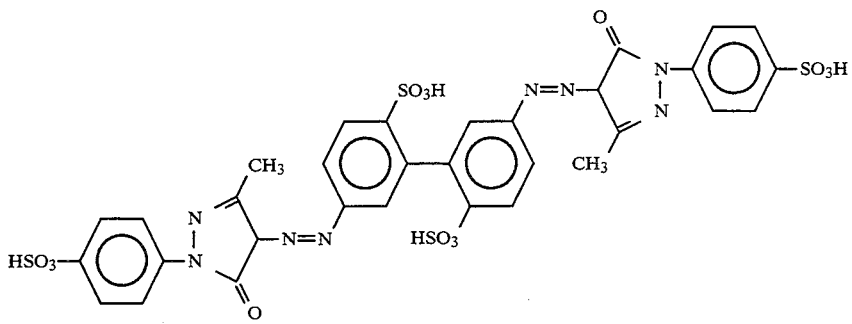
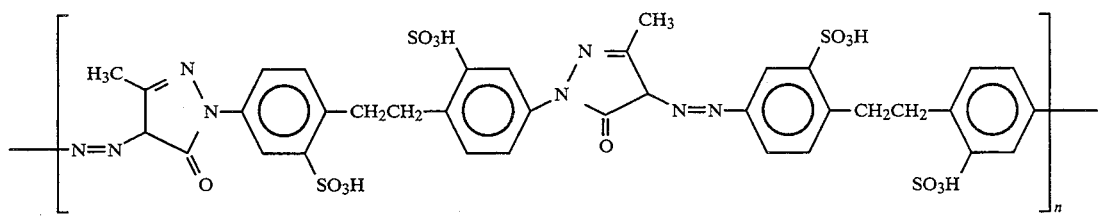
wherein n represents the number of repeating monomer units
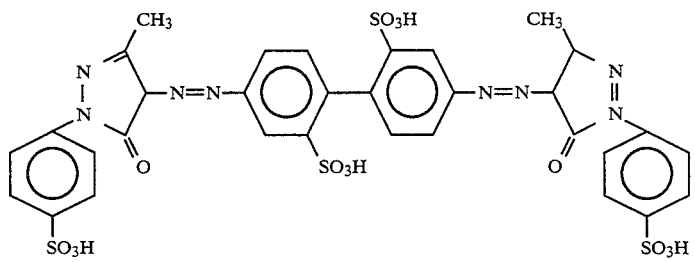
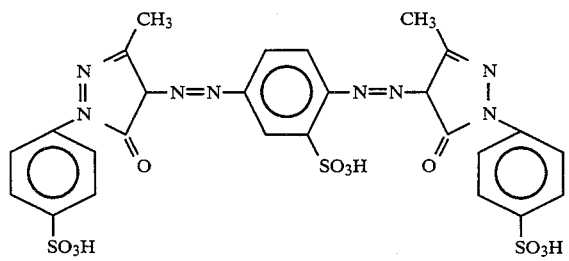
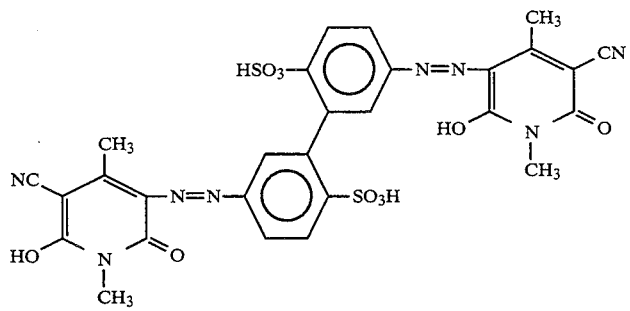
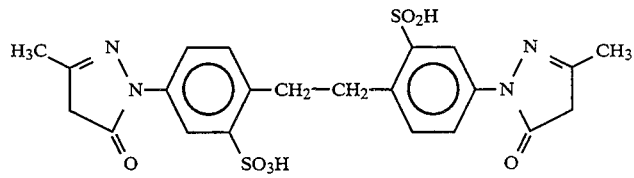

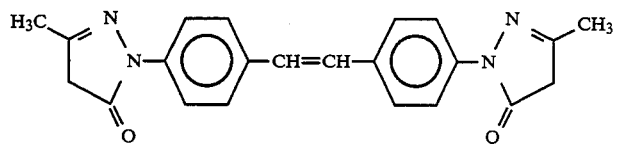
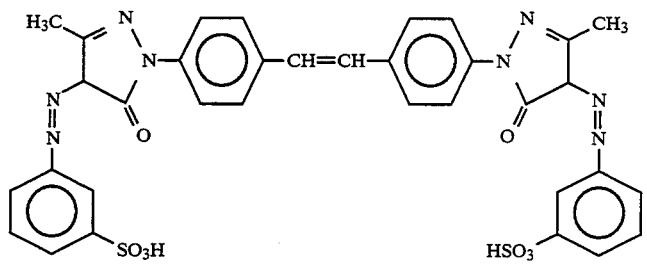
and mixtures thereof.
5. Colorant compositions selected from the group consisting of
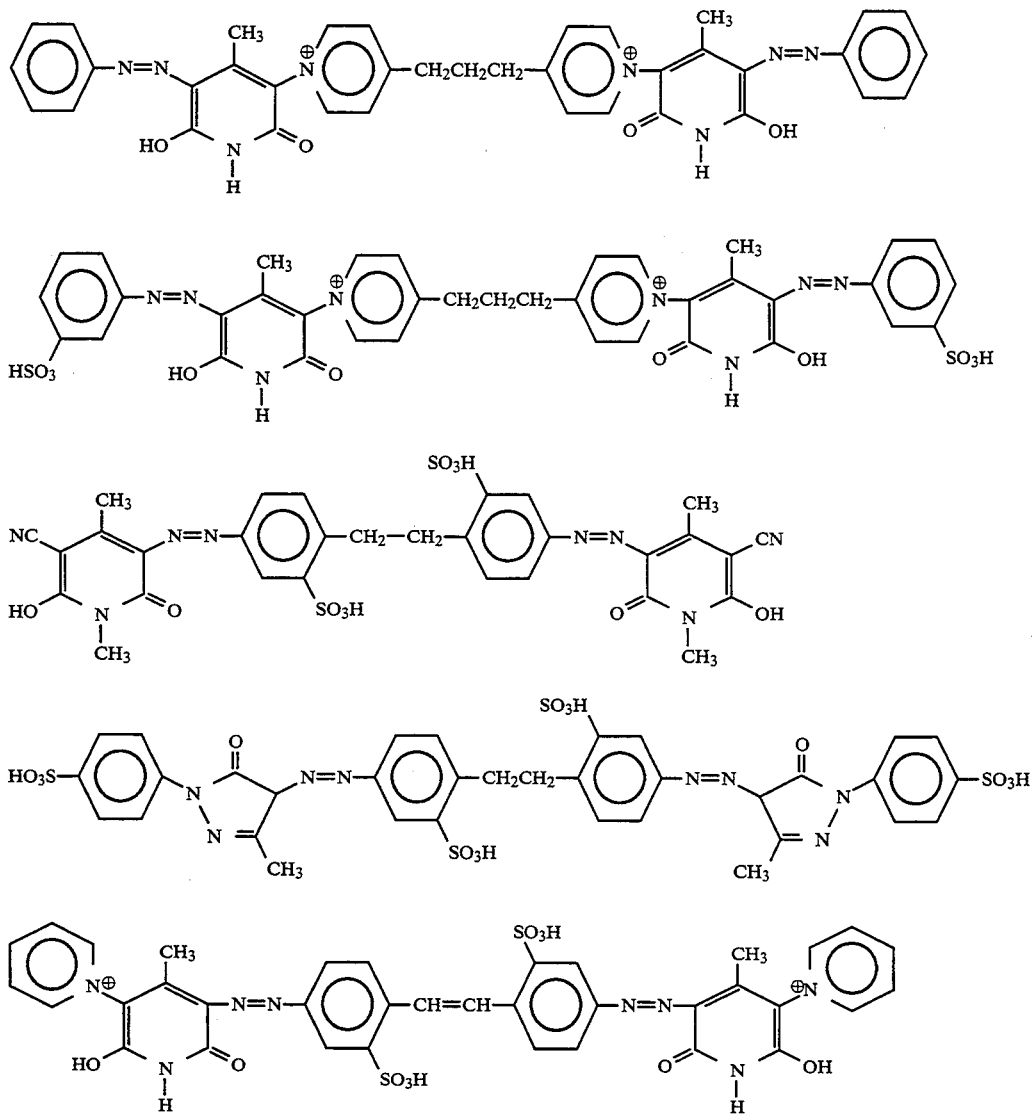

-continued
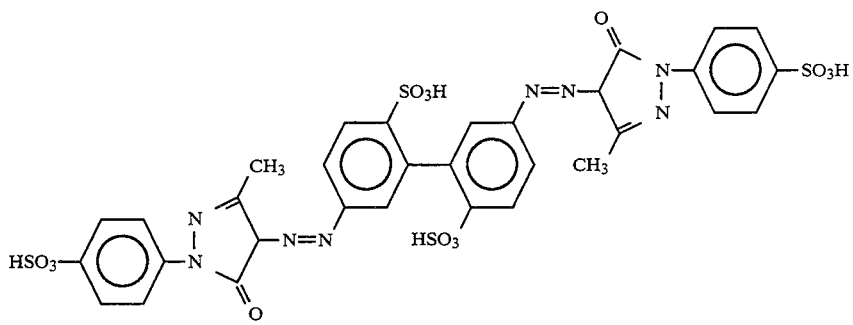
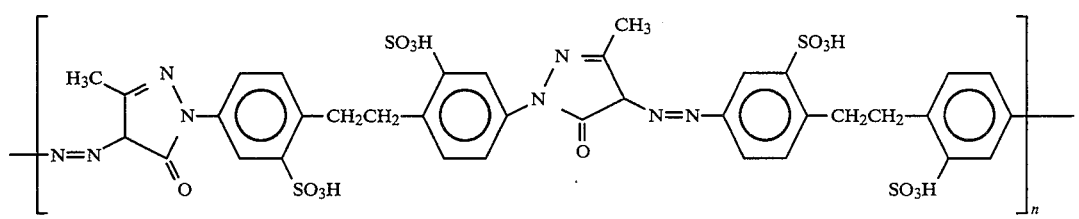
wherein n represents the number of repeating monomer units
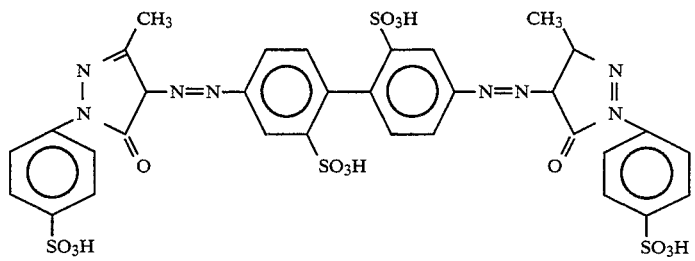
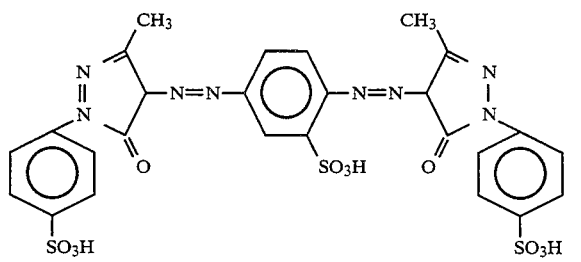
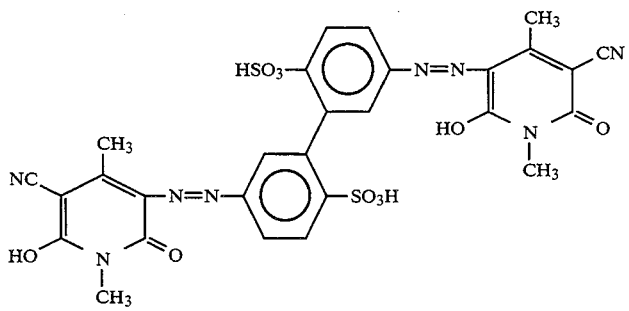
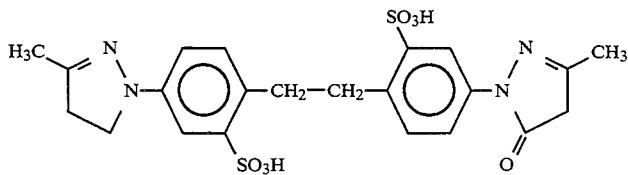

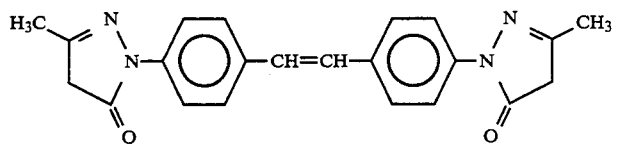
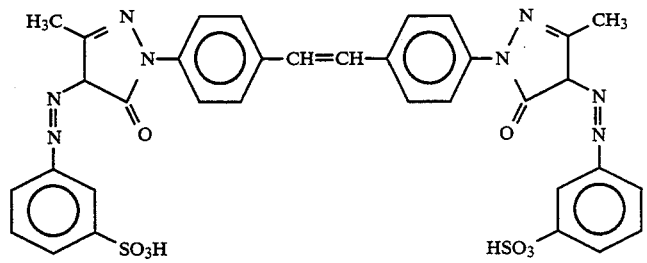
and mixtures thereof.
6. A process which entails (a) incorporating into an ink jet printing apparatus an ink composition which comprises water, a humectant, and a colorant selected from the group consisting of
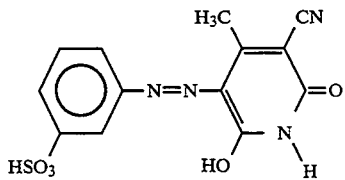
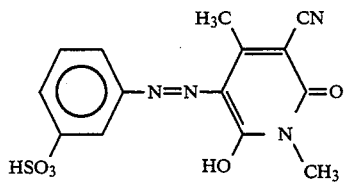
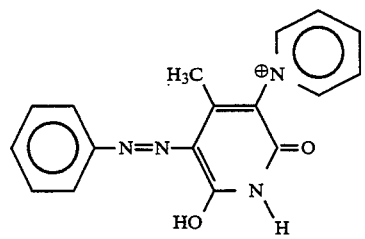
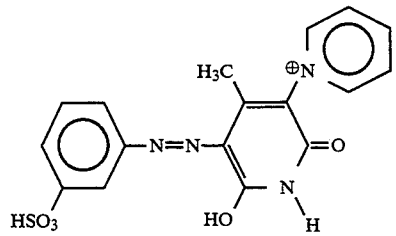
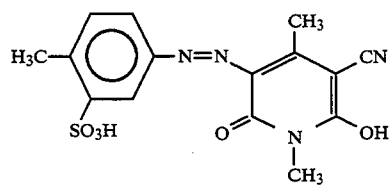

-continued
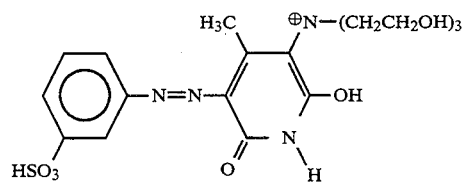
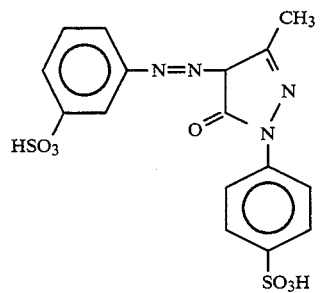
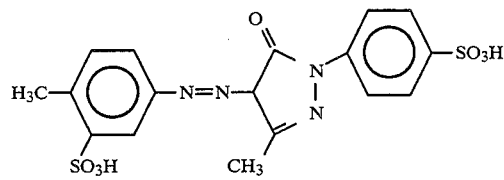
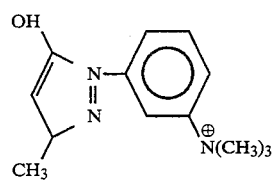
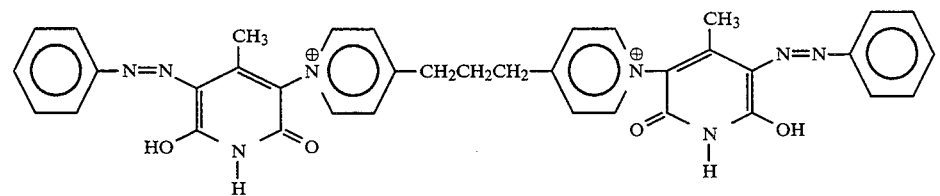
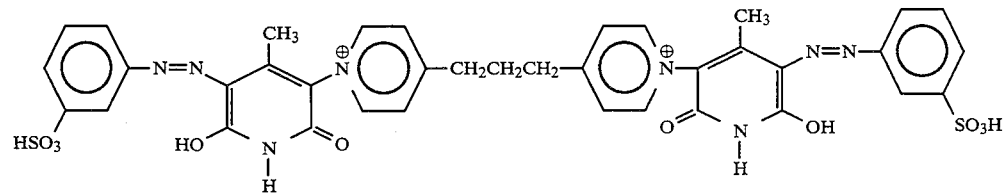
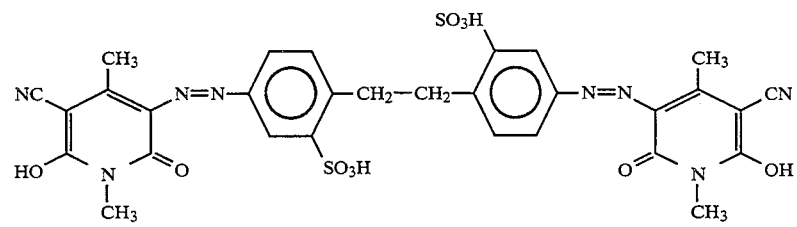

-continued
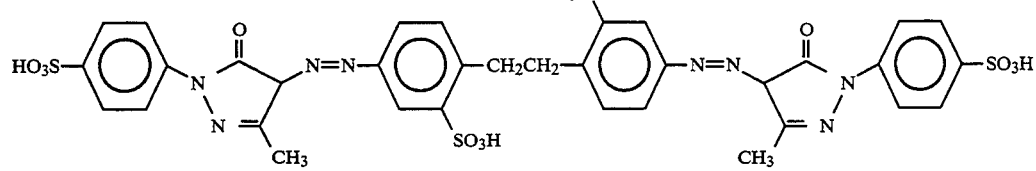
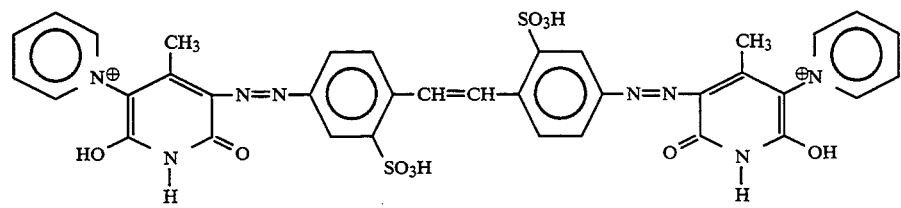
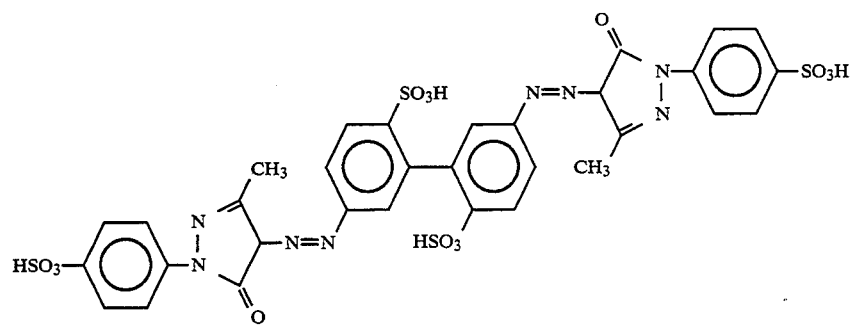
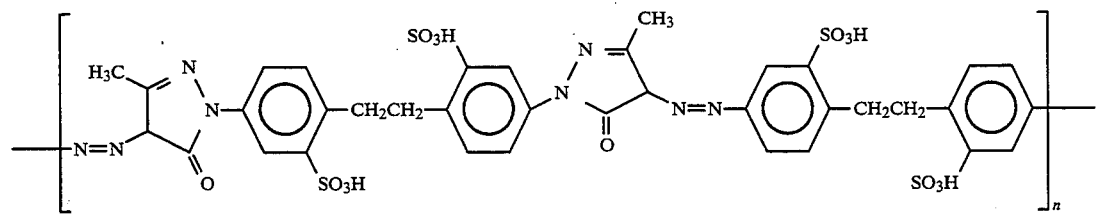
wherein n represents the number of repeating monomer units
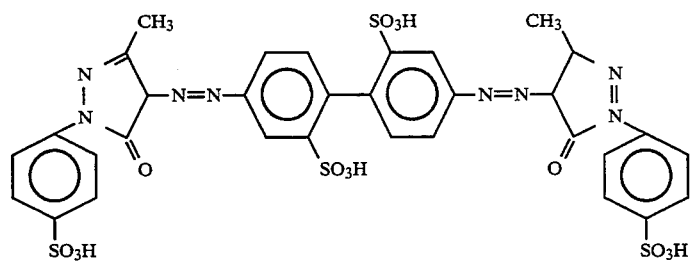
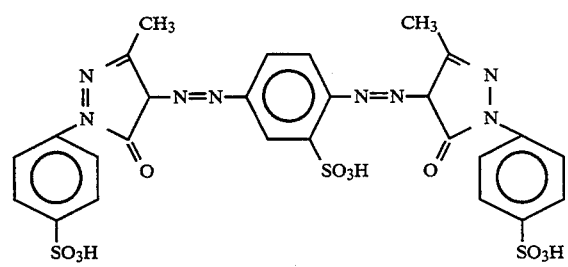

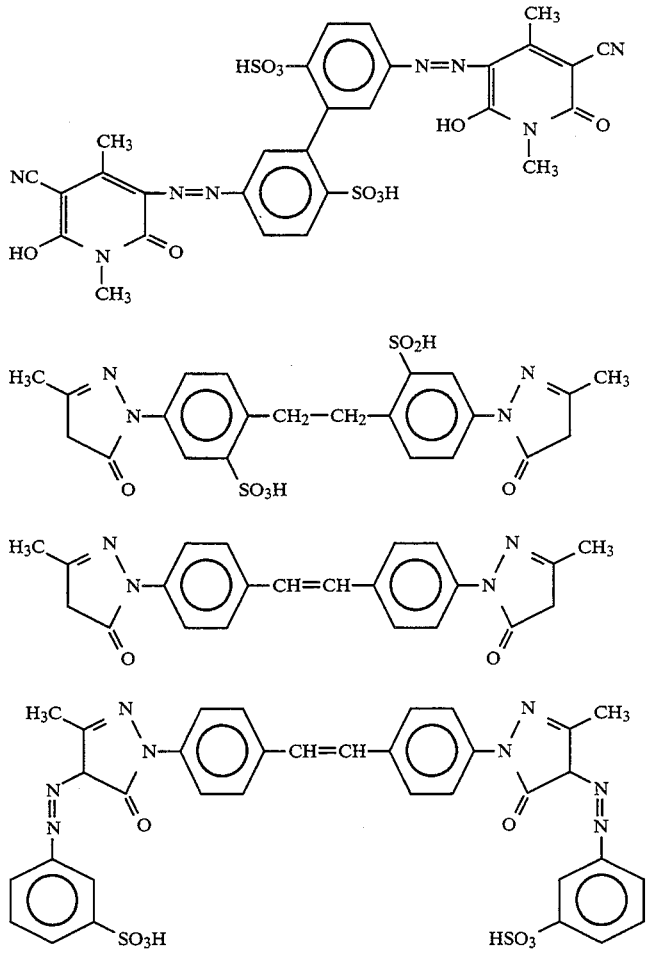

and mixtures thereof; and (b) causing droplets of the ink composition to be ejected in an imagewise pattern onto a substrate.

7. An aqueous ink composition for ink jet printing which comprises water, a humectant, and a colorant selected from the group consisting of: (a) the following formulae, wherein $R_1$ and $R'_1$ are each electron withdrawing groups, $R_2$ and $R'_2$ are each independently selected from the group consisting of hydrogen, alkyl, substituted alkyl, aryl, substituted aryl, arylalkyl, and substituted arylalkyl, $R_3$ and $R'_3$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl:

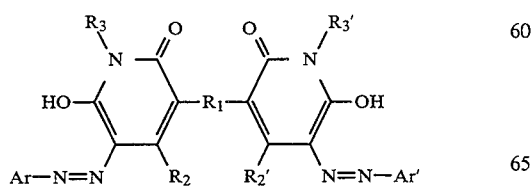

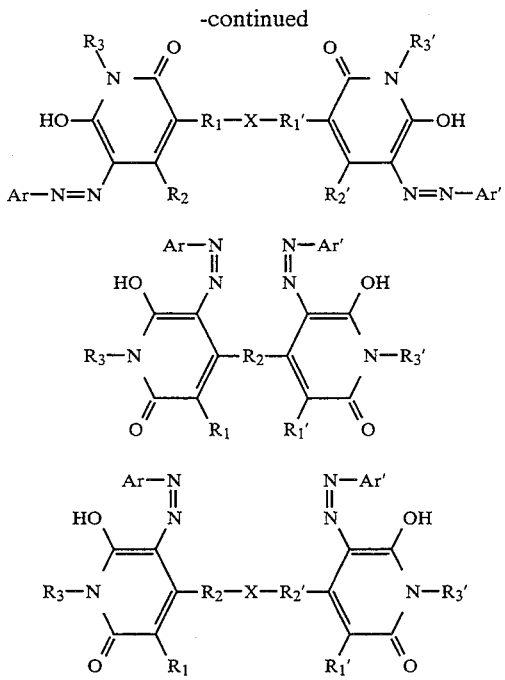

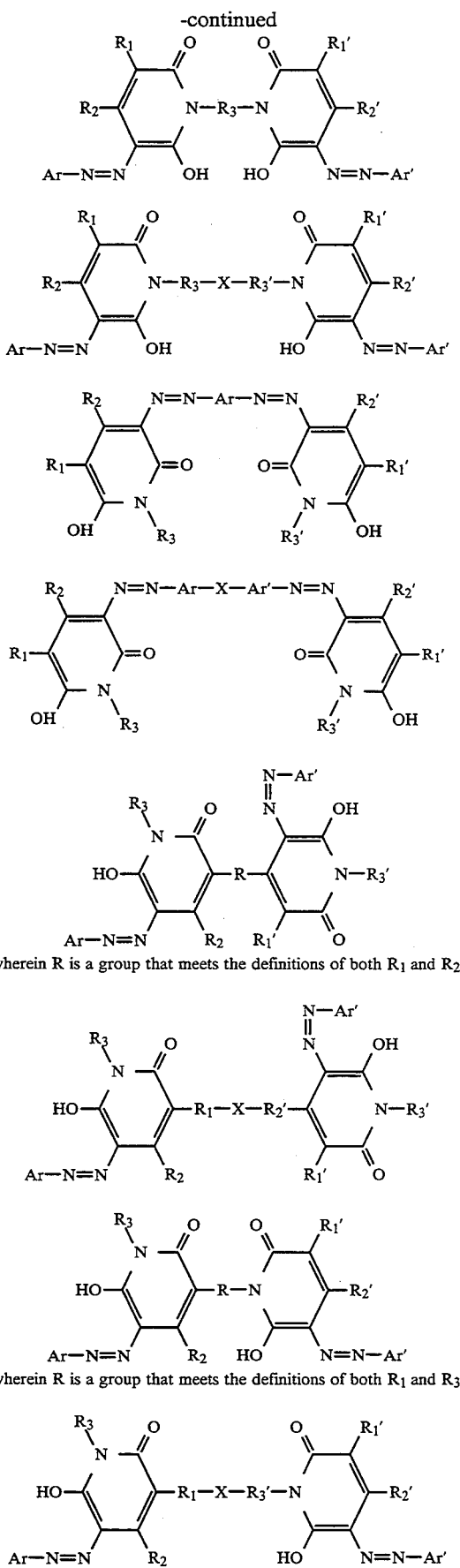
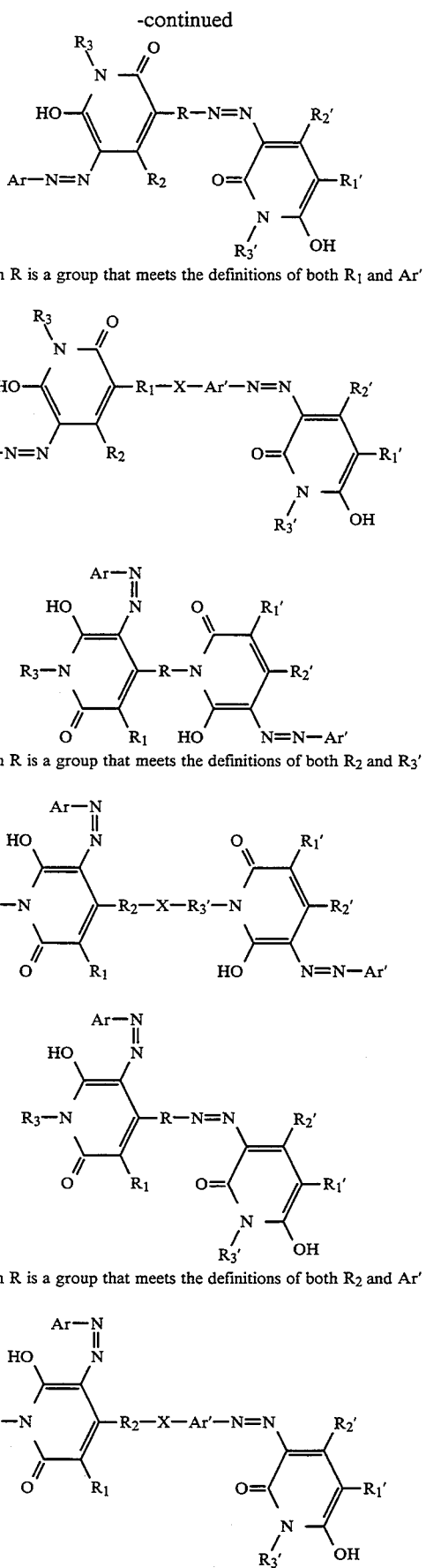
wherein R is a group that meets the definitions of both $R_1$ and $Ar'$
wherein R is a group that meets the definitions of both $R_2$ and $R_3'$
wherein R is a group that meets the definitions of both $R_1$ and $R_2'$
wherein R is a group that meets the definitions of both $R_1$ and $R_3'$
wherein R is a group that meets the definitions of both $R_2$ and $Ar'$ -continued

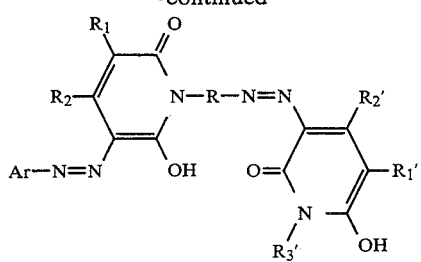

wherein R is a group that meets the definitions of both R₃ and Ar′

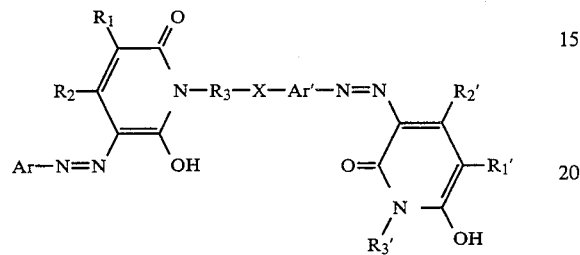

(b) those of the following formulae, wherein $R_1$ and $R'_1$ are each independently selected from the group consisting of hydrogen, alkyl, substituted alkyl, aryl, substituted aryl, arylalkyl, and substituted arylalkyl, $R_2$ and $R'_2$ are each independently selected from the group consisting of hydrogen, alkyl, substituted alkyl, aryl, substituted aryl, arylalkyl, and substituted arylalkyl, Ar and Ar′ are each independently selected from the group consisting of aryl, substituted aryl, arylalkyl, and substituted arylalkyl, and Y is selected from the group consisting of alkyl, substituted alkyl, aryl, substituted aryl, arylalkyl, and substituted arylalkyl:

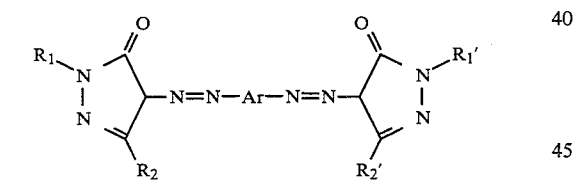

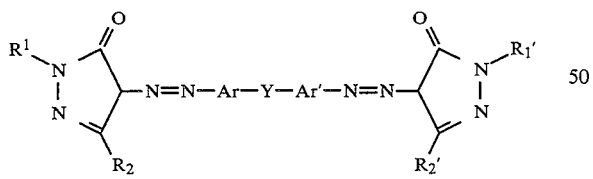

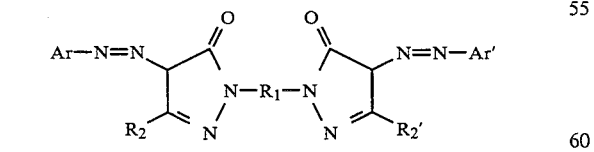

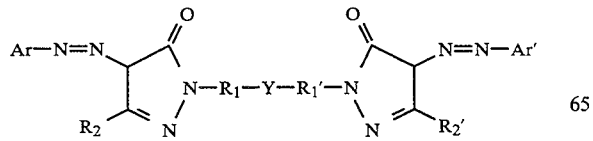

-continued

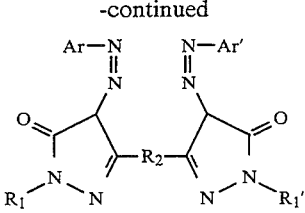

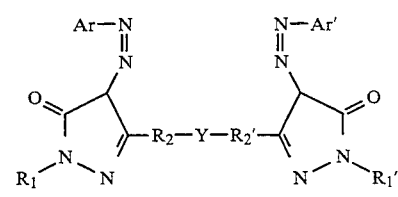

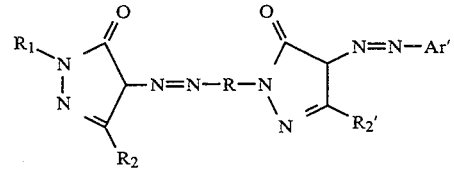

wherein R is a group that meets the definitions of both Ar and $R_1'$

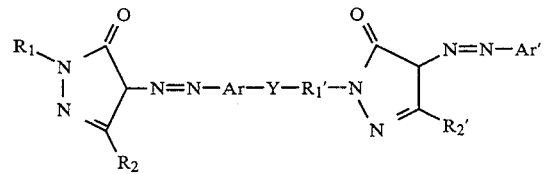

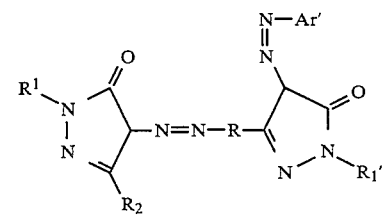

wherein R is a group that meets the definitions of both Ar and $R_2'$

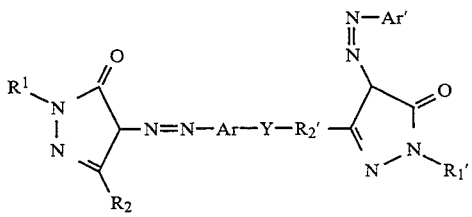

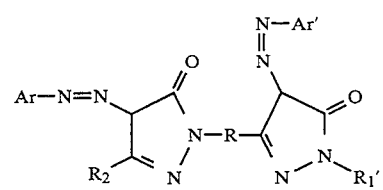

wherein R is a group that meets the definitions of both $R_1$ and $R_2'$

-continued

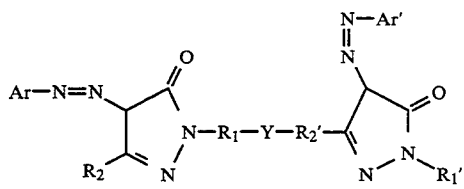

(c) those of the following formulae, wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, Ar is selected from the group consisting of aryl, substituted aryl, arylalkyl, and substituted arylalkyl, $R'_1$ is selected from the group consisting of hydrogen, alkyl, substituted alkyl, aryl, substituted aryl, arylalkyl, and substituted arylalkyl, $R'_2$ is selected from the group consisting of hydrogen, alkyl, substituted alkyl, aryl, substituted aryl, arylalkyl, and substituted arylalkyl, Ar' is selected from the group consisting of aryl, substituted aryl, arylalkyl, and substituted arylalkyl, and Z is selected from the group consisting of alkyl, substituted alkyl, aryl, substituted aryl, arylalkyl, and substituted arylalkyl:

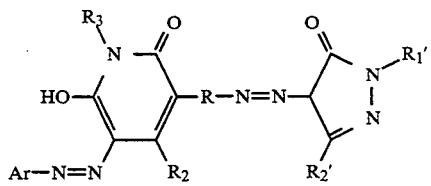

wherein R is a group that meets the definitions of both $R_1$ and Ar'

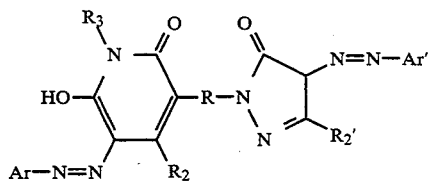

wherein R is a group that meets the defintions of both $R_1$ and $R_1'$

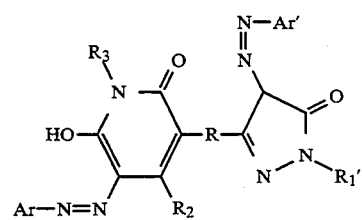

wherein R is a group that meets the definitions of both $R_1$ and $R_2'$

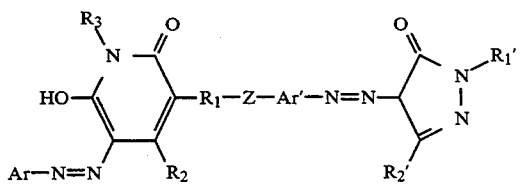

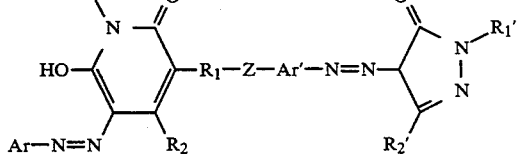

-continued

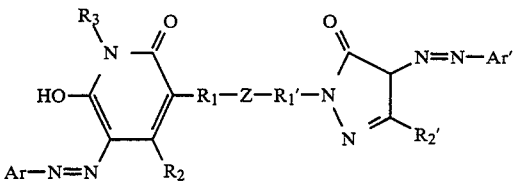

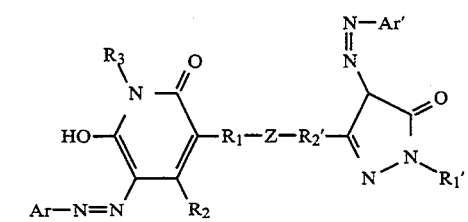

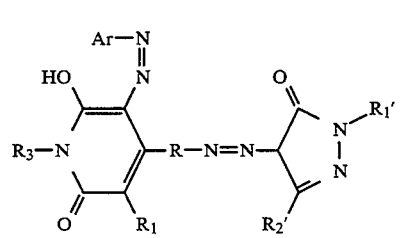

wherein R is a group that meets the definitions of both $R_2$ and Ar'

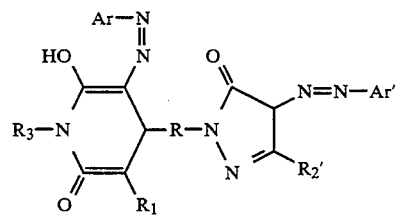

wherein R is a group that meets the definitions of both $R_2$ and $R_1'$

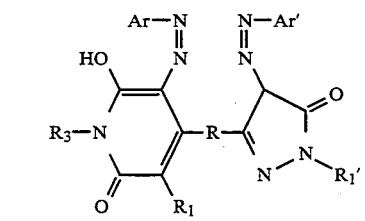

wherein R is a group that meets the definitions of both $R_2$ and $R_2'$

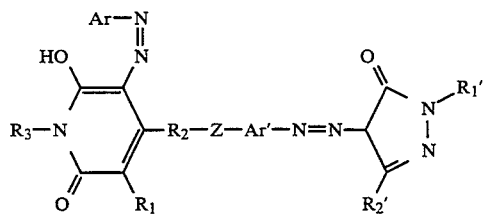

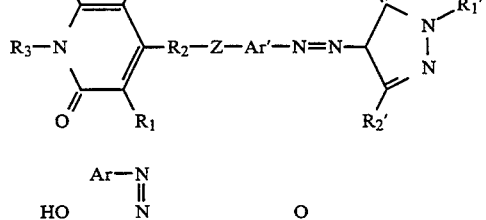

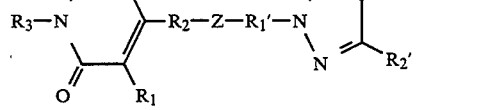

-continued

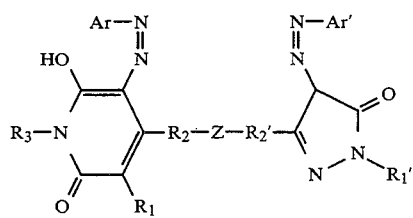

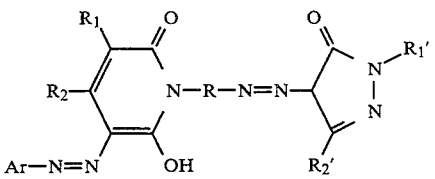

wherein R is a group that meets the definitions of R$_3$ and Ar'

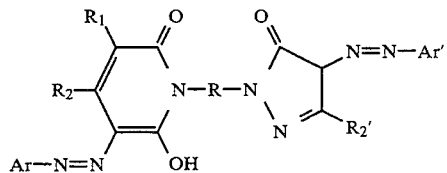

wherein R is a group that meets the definitions of R$_3$ and R$_1$'

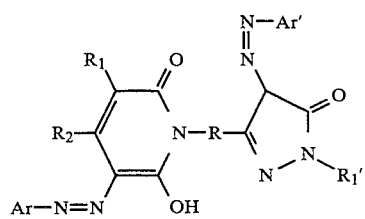

wherein R is a group that meets the definitions of R$_3$ and R$_2$'

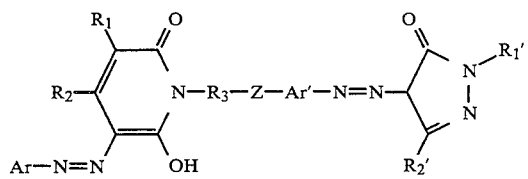

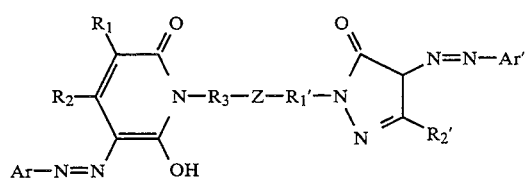

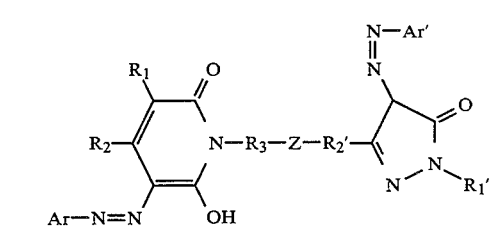

-continued

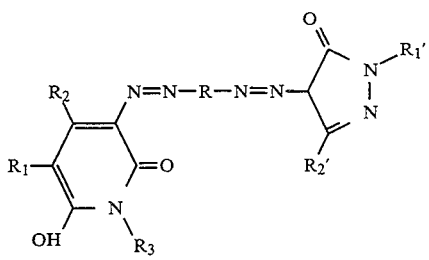

wherein R is a group that meets the definitions of both Ar and Ar'

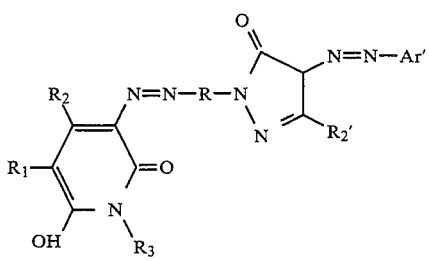

wherein R is a group that meets the defintions of both Ar and R$_1$'

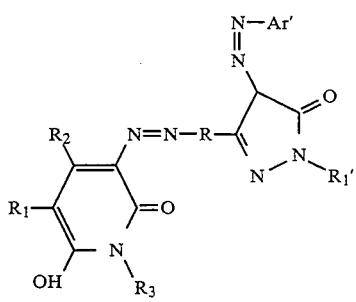

wherein R is a group that meets the definitions of both Ar and R$_2$'

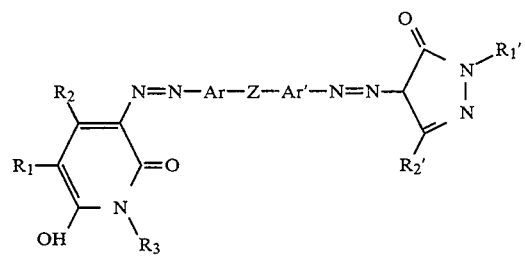

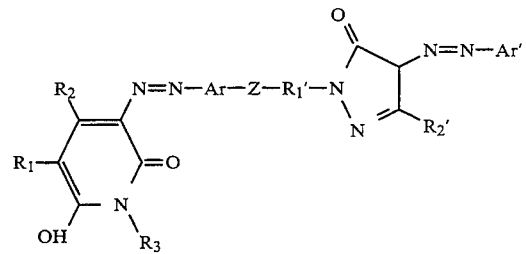

-continued

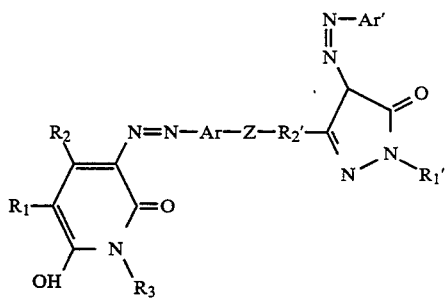

and (d) mixtures thereof.

8. A colorant selected from the group consisting of: (a) the following formulae, wherein $R_1$ and $R'_1$ are each electron withdrawing groups, $R_2$ and $R'_2$ are each independently selected from the group consisting of hydrogen, alkyl, substituted alkyl, aryl, substituted aryl, arylalkyl, and substituted arylalkyl, $R_3$ and $R'_3$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl:

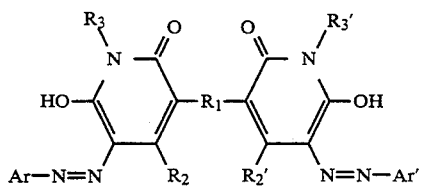

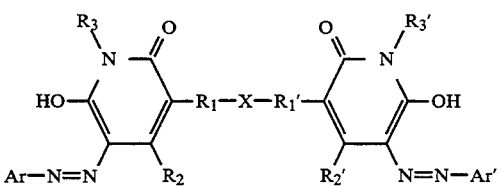

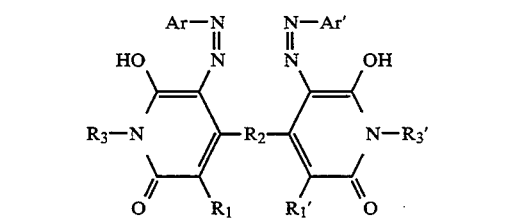

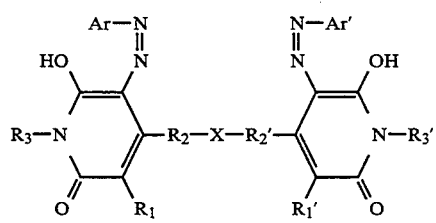

-continued

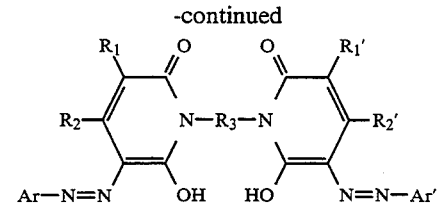

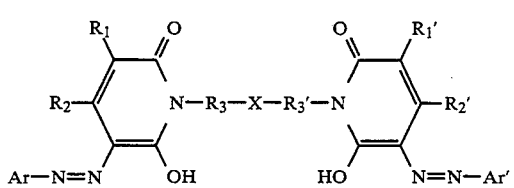

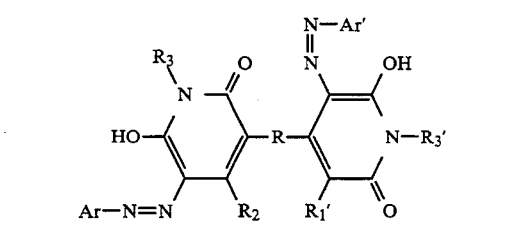

wherein R is a group that meets the definitions of both $R_1$ and $R'_2$

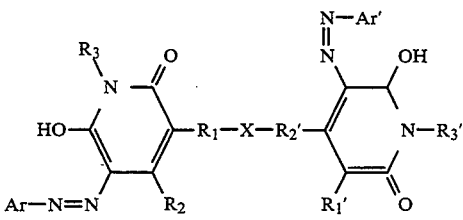

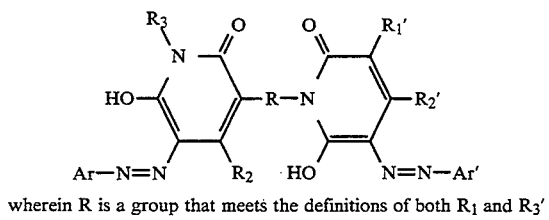

wherein R is a group that meets the definitions of both $R_1$ and $R'_3$

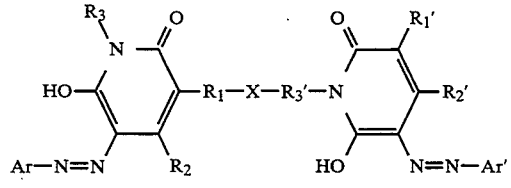

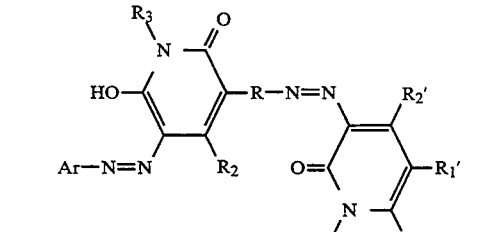

wherein R is a group that meets the definitions of both $R_1$ and Ar'

-continued

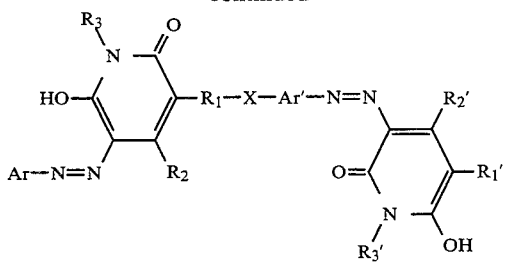

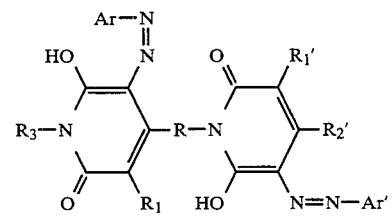

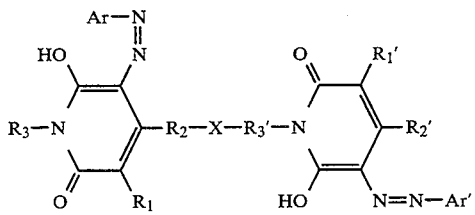

wherein R is a group that meets the definitions of both R₂ and R₃'

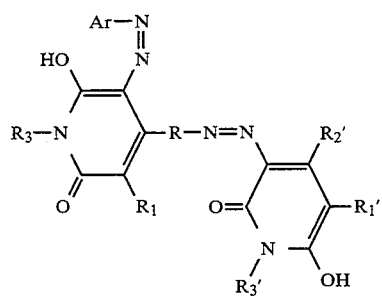

wherein R is a group that meets the definitions of both R₂ and Ar'

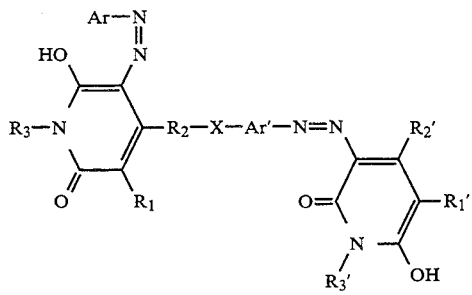

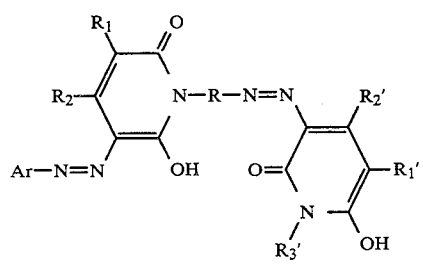

wherein R is a group that meets the definitions of both R₃ and Ar'

-continued

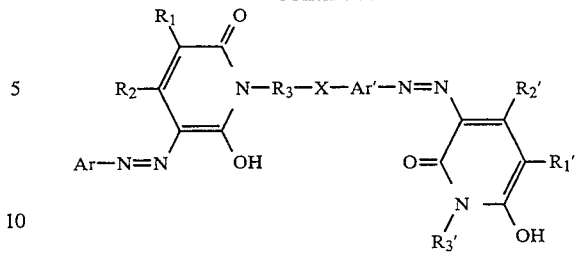

those of the following formulae, wherein $R_1$ and $R'_1$ are each selected from the group consisting of cyano groups, nitro-aromatic groups, acid groups, amide groups, aldehyde, groups, ketone groups, and —N+(CH₂CH₂OH)₃, $R_2$ and $R'_2$ are each independently selected from the group consisting of hydrogen, alkyl, substituted alkyl, aryl, substituted aryl, arylalkyl, and substituted arylalkyl, $R_3$ and $R'_3$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl:

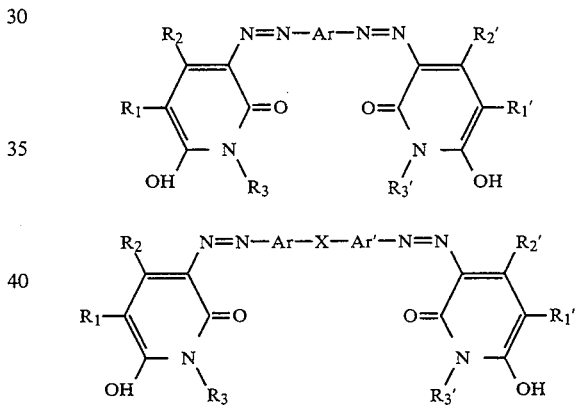

(c) those of the following formulae, wherein $R_1$ and $R'_1$ are each electron withdrawing groups, $R_2$ and $R'_2$ are each independently selected from the group consisting of hydrogen, substituted alkyl, aryl, substituted aryl, arylalkyl, and substituted arylalkyl, $R_3$ and $R'_3$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl:

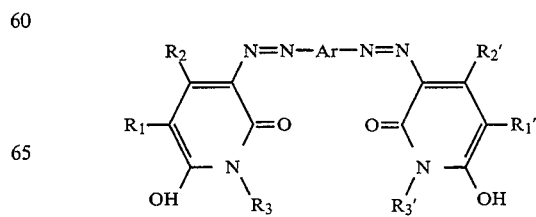

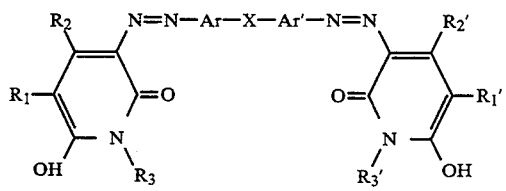

(d) those of the following formulae, wherein $R_1$ and $R'_1$ are each electron withdrawing groups, $R_2$ and $R'_2$ are each independently selected from the group consisting of hydrogen, alkyl, substituted alkyl, aryl, substituted aryl, arylalkyl, and substituted arylalkyl, $R_3$ and $R'_3$ are each independently selected from the group consisting of aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl:

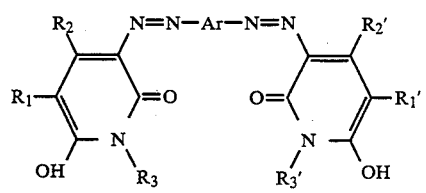

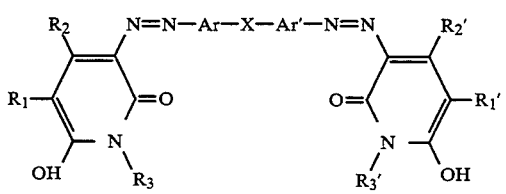

(e) those of the following formulae, wherein $R_1$ and $R'_1$ are each independently selected from the group consisting of hydrogen, alkyl, and substituted alkyl, $R_2$ and $R'_2$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and Y is selected from the group consisting of alkyl, substituted alkyl, aryl, substituted aryl, arylalkyl, and substituted arylalkyl:

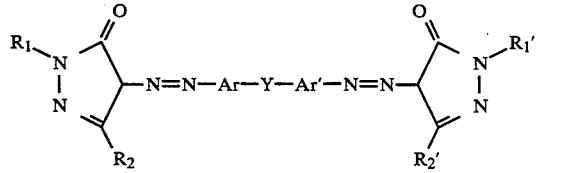

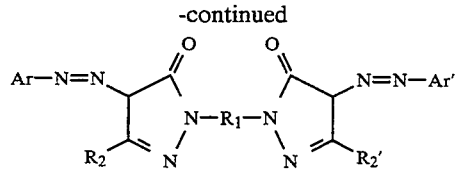

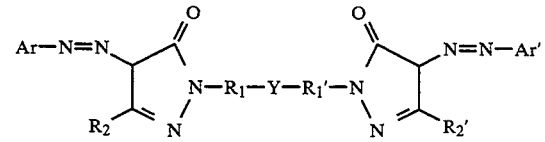

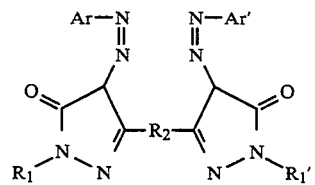

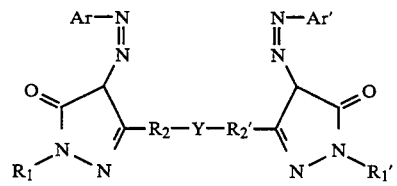

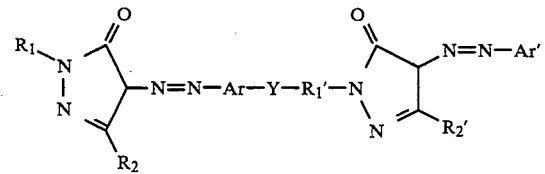

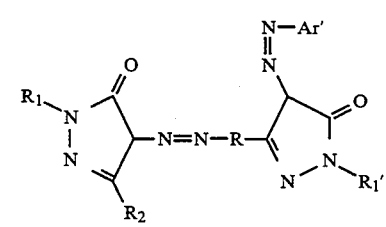

wherein R is a group that meets the defintions of both Ar and $R_2'$

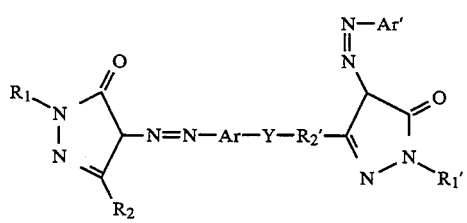

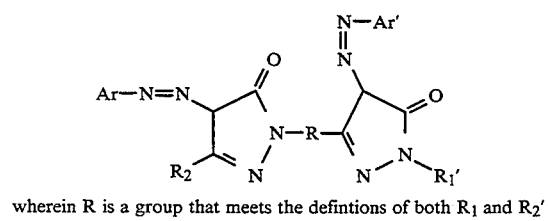

wherein R is a group that meets the defintions of both $R_1$ and $R_2'$

-continued

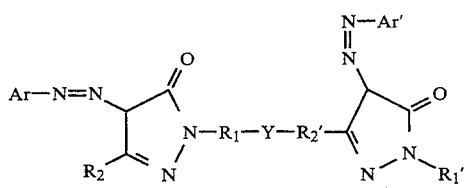

(f) those of the following formulae, wherein $R_1$ and $R'_1$ are each independently selected from the group consisting of hydrogen, alkyl, substituted alkyl, aryl, substituted aryl, arylalkyl, and substituted arylalkyl, $R_2$ and $R'_2$ are each independently selected from the group consisting of aryl, substituted aryl, arylalkyl, and substituted arylalkyl, Ar and Ar' are each independently selected from the group consisting of aryl, substituted aryl, arylalkyl, and substituted arylalkyl, and Y is selected from the group consisting of alkyl, substituted alkyl, aryl, substituted aryl, arylalkyl, and substituted arylalkyl:

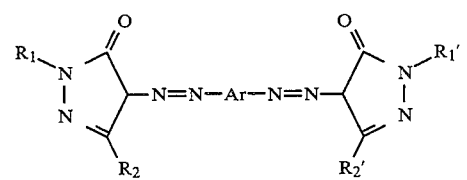

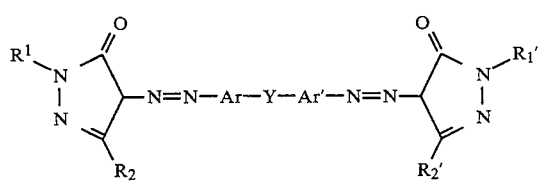

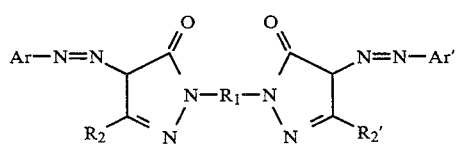

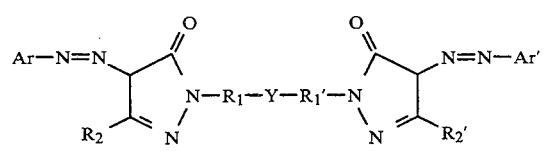

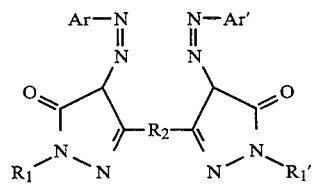

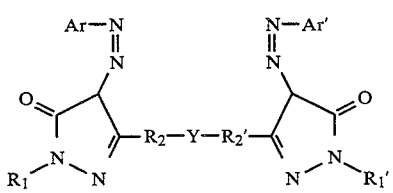

-continued

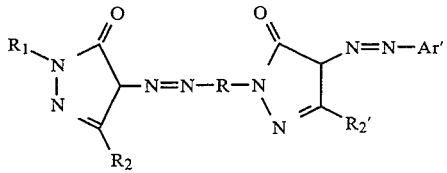

wherein R is a group that meets the definitions of both Ar and $R'_1$

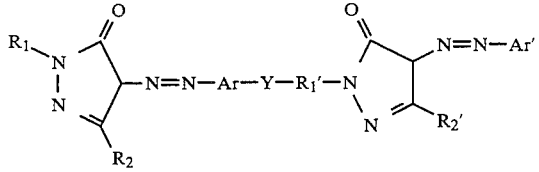

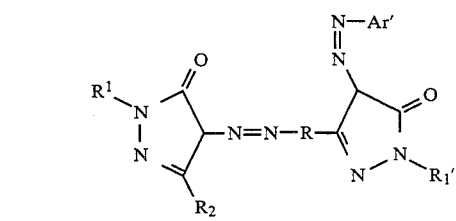

wherein R is a group that meets the definitions of both Ar and $R'_2$

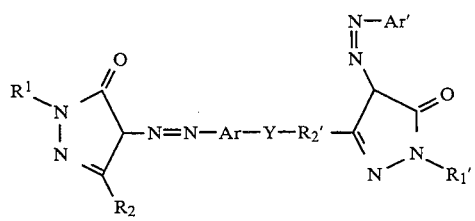

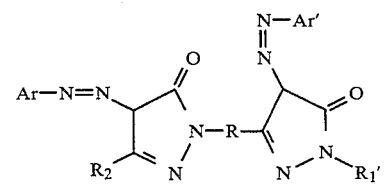

wherein R is a group that meets the definitions of both $R_1$ and $R'_2$

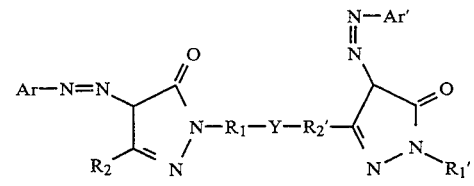

(g) those of the following formulae, wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, Ar is selected from the group consisting of aryl, substituted aryl, arylalkyl, and substituted arylalkyl, $R'_1$ is selected from the group consisting of hydrogen, alkyl, substituted alkyl, aryl, substituted aryl, arylalkyl, and substituted arylalkyl, $R'_2$ is selected from the group consisting of hydrogen, alkyl, substituted alkyl, aryl, substituted aryl, arylalkyl, and substituted arylalkyl, Ar' is selected from the group consisting of aryl, substituted aryl, arylalkyl, and substituted arylalkyl, and Z is selected from the group consisting of alkyl, substituted alkyl, aryl, substituted aryl, arylalkyl, and substituted arylalkyl:

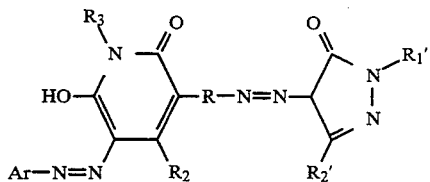

wherein R is a group that meets the definitions of both $R_1$ and Ar'

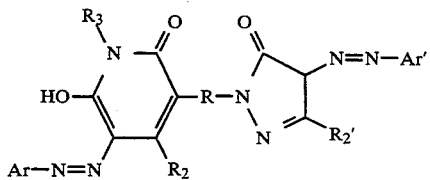

wherein R is a group that meets the defintions of both $R_1$ and $R_1'$

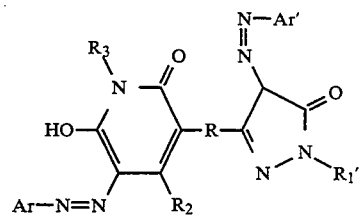

wherein R is a group that meets the definitions of both $R_1$ and $R_2'$

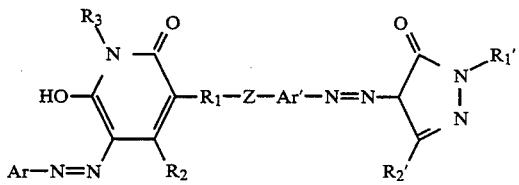

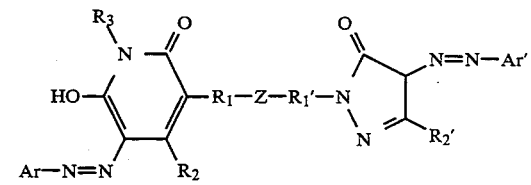

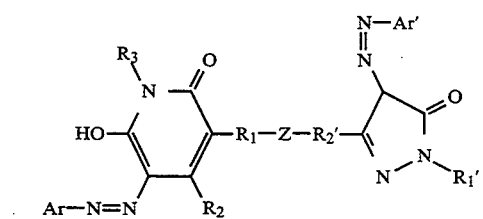

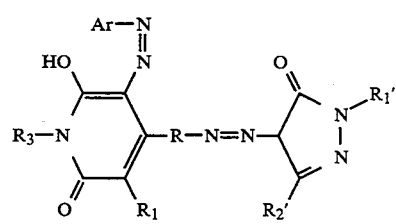

-continued

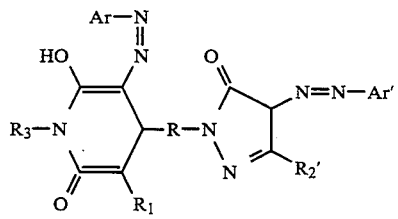

wherein R is a group that meets the definitions of both $R_2$ and Ar'

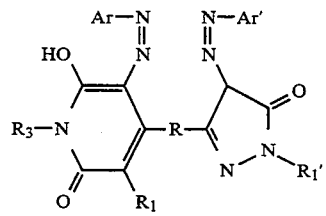

wherein R is a group that meets the definitions of both $R_2$ and $R_1'$

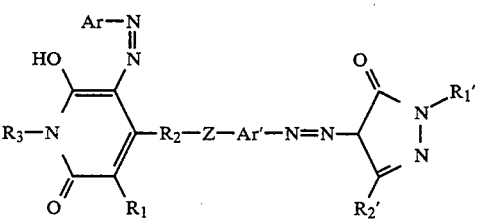

wherein R is a group that meets the definitions of both $R_2$ and $R_2'$

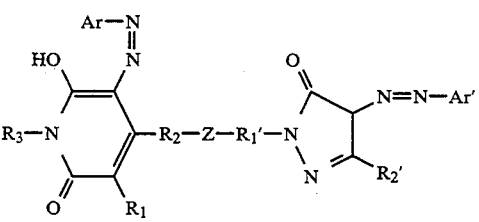

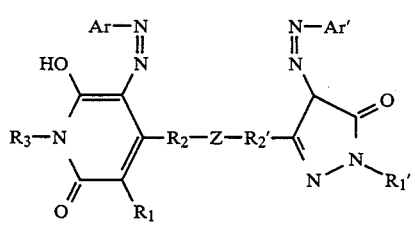

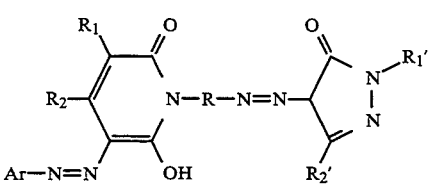

wherein R is a group that meets the definitions of both $R_3$ and Ar'

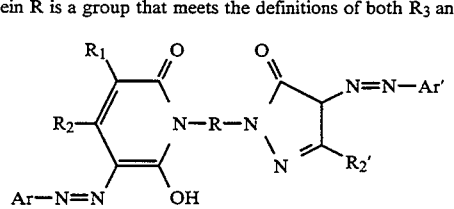

-continued wherein R is a group that meets the defintions of both R₃ and R₁'

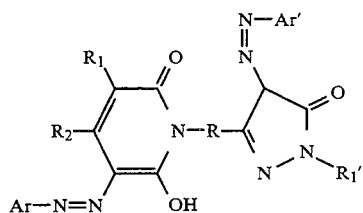

wherein R is a group that meets the definitions of both R₃ and R₂'

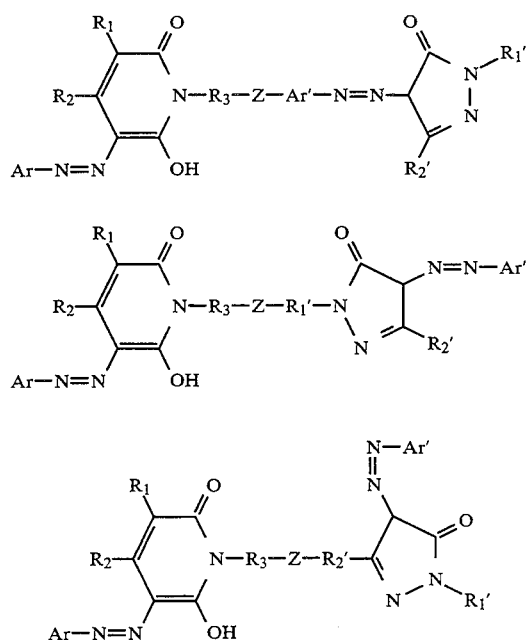

wherein R is a group that meets the definitions of both Ar and Ar'

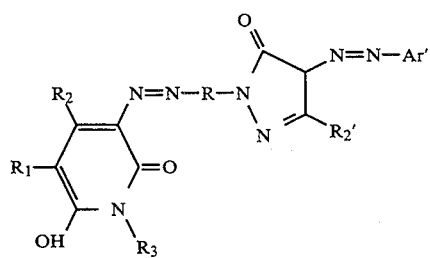

wherein R is a group that meets the defintions of both Ar and R₁'

-continued

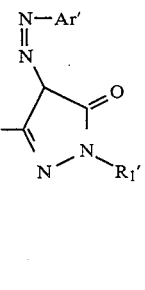

wherein R is a group that meets the definitions of both Ar and R₂'

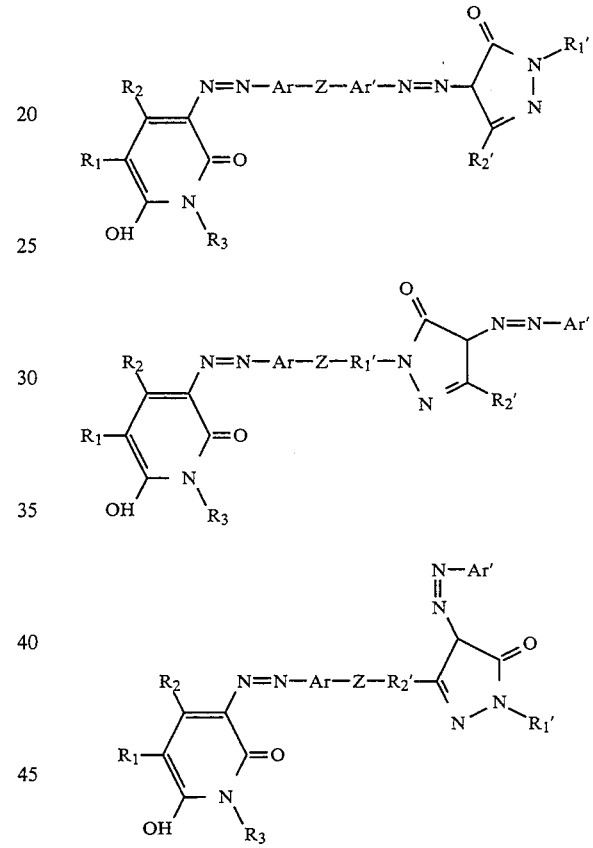

and (h) mixtures thereof.

9. A process according to claim 3 wherein the colorant is selected from the group consisting of: (a) the following formulae, wherein $R_1$ and $R'_1$ are each electron withdrawing groups, $R_2$ and $R'_2$ are each independently selected from the group consisting of hydrogen, alkyl, substituted alkyl, aryl, substituted aryl, arylalkyl, and substituted arylalkyl, $R_3$ and $R'_3$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and X is selected from the group consisting of alkyl, substituted alkyl, aryl, substituted aryl, arylalkyl, and substituted arylalkyl:

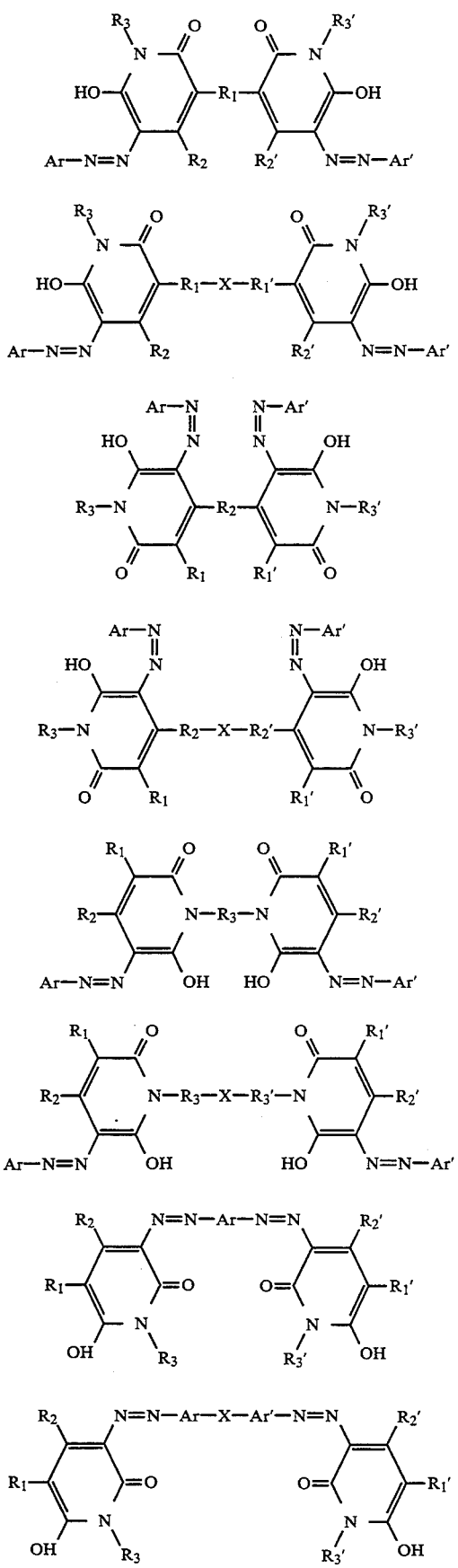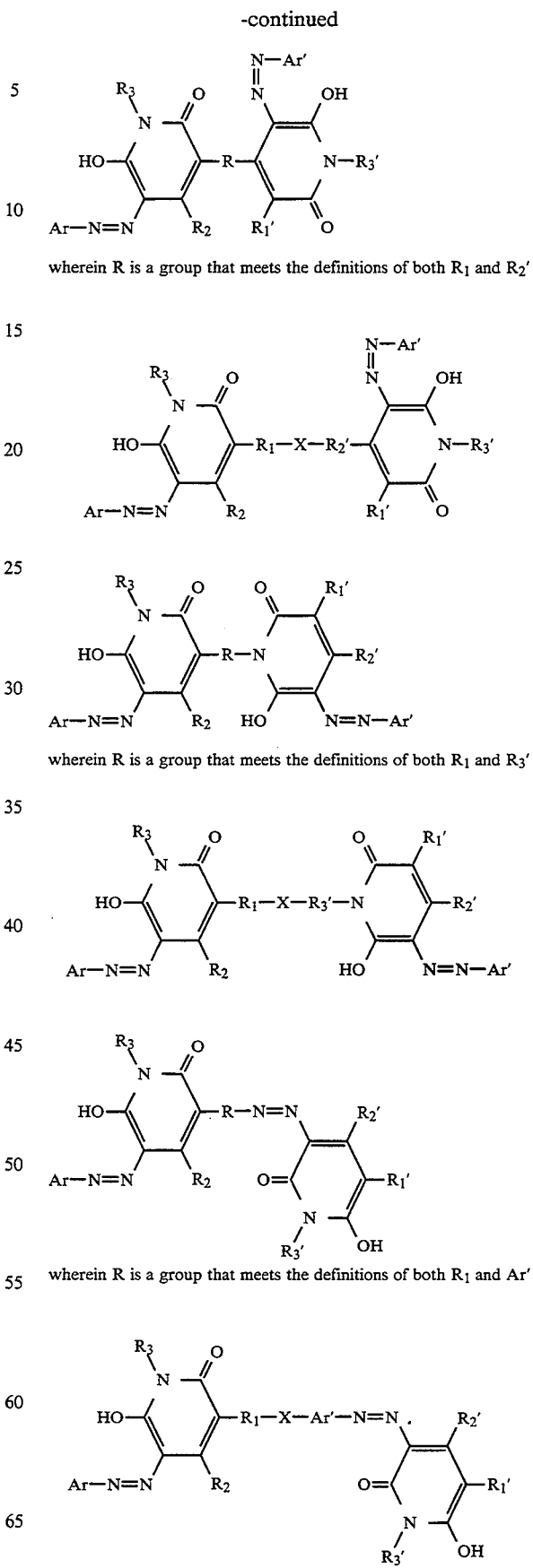
wherein R is a group that meets the definitions of both $R_1$ and $R_2'$
wherein R is a group that meets the definitions of both $R_1$ and $R_3'$
wherein R is a group that meets the definitions of both $R_1$ and Ar'

-continued

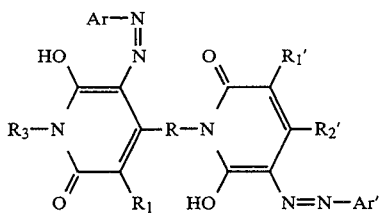

wherein R is a group that meets the definitions of both R₂ and R₃'

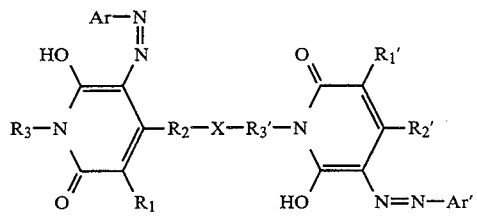

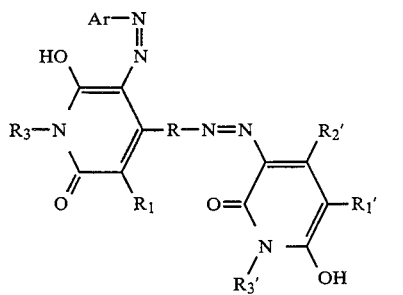

wherein R is a group that meets the definitions of both R₂ and Ar'

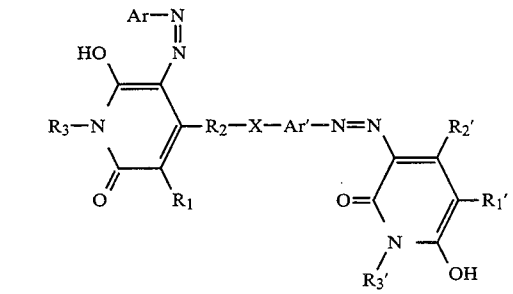

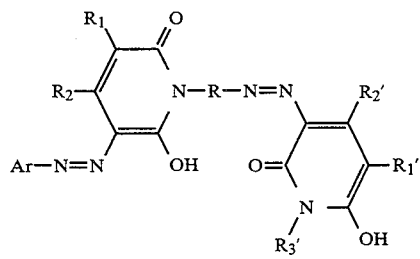

wherein R is a group that meets the definitions of both R₃ and Ar'

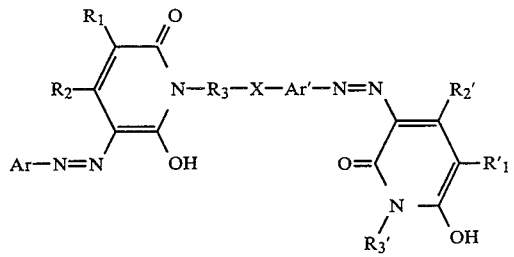

(b) those of the following formulae, wherein $R_1$ and $R'_1$ are each independently selected from the group consisting of hydrogen, alkyl, substituted alkyl, aryl, substituted aryl, arylalkyl, and substituted arylalkyl, $R_2$ and $R'_2$ are each independently selected from the group consisting of hydrogen, alkyl, substituted alkyl, aryl, substituted aryl, arylalkyl, and substituted arylalkyl, Ar and Ar' are each independently selected from the group consisting of aryl, substituted aryl, arylalkyl, and substituted arylalkyl, and Y is selected from the group consisting of alkyl, substituted alkyl, aryl, substituted aryl, arylalkyl, and substituted arylalkyl:

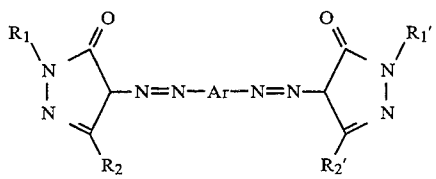

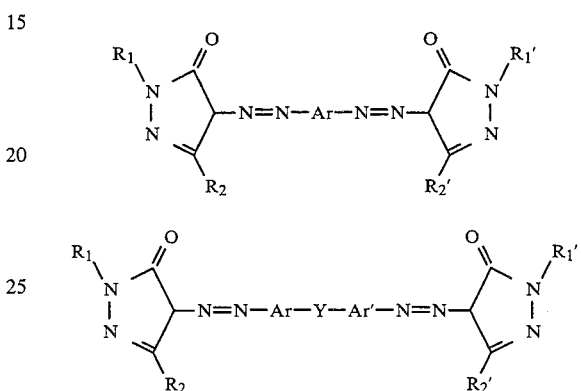

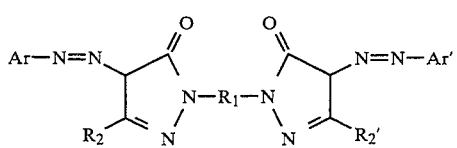

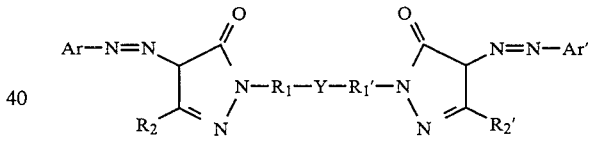

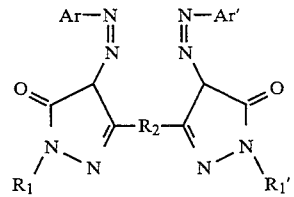

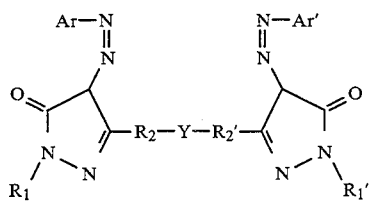

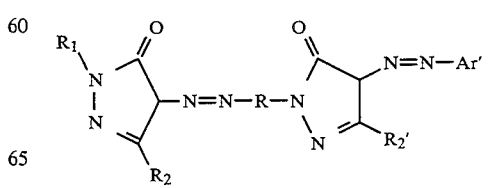

wherein R is a group that meets the definitions of both Ar and $R_1'$

-continued

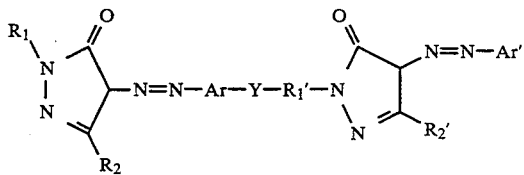

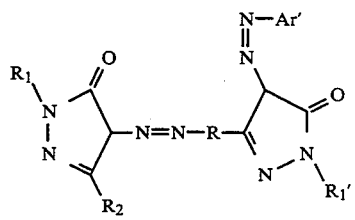

wherein R is a group that meets the definitions of both Ar and R$_2'$

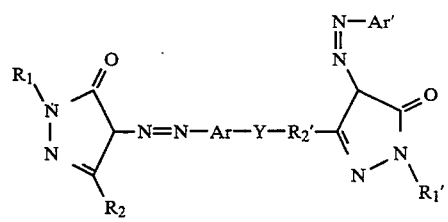

wherein R is a group that meets the definitions of both R$_1$ and R$_2'$

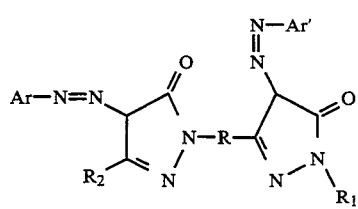

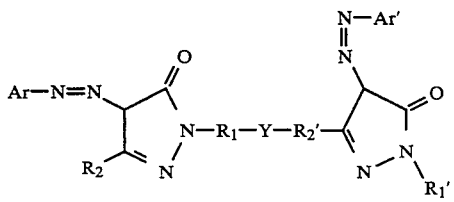

(c) those of the following formulae, wherein R$_1$ is an electron withdrawing group, R$_2$ is selected from the group consisting of hydrogen, alkyl, substituted alkyl, aryl, substituted aryl, arylalkyl, and substituted arylalkyl, R$_3$ is selected from the group consisting of hydrogen, alkyl, substituted alkyl, aryl, substituted aryl, arylalkyl, and substituted arylalkyl, Ar is selected from the group consisting of aryl, substituted aryl, arylalkyl, and substituted arylalkyl, R'$_1$ is selected from the group consisting of hydrogen, alkyl, substituted alkyl, aryl, substituted aryl, arylalkyl, and substituted arylalkyl, R'$_2$ is selected from the group consisting of hydrogen, alkyl, substituted alkyl, aryl, substituted aryl, arylalkyl, and substituted arylalkyl, Ar' is selected from the group consisting of aryl, substituted aryl, arylalkyl, and substituted arylalkyl, and Z is selected from the group consisting of alkyl, substituted alkyl, aryl, substituted aryl, arylalkyl, and substituted arylalkyl:

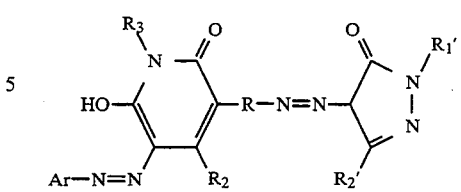

wherein R is a group that meets the definitions of both R$_1$ and Ar'

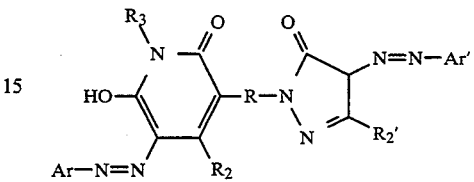

wherein R is a group that meets the definitions of both R$_1$ and R$_2'$

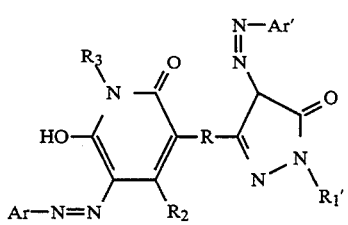

wherein R is a group that meets the definitions of both R$_1$ and R$_2'$

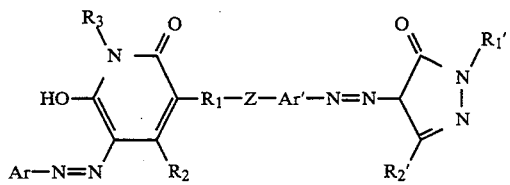

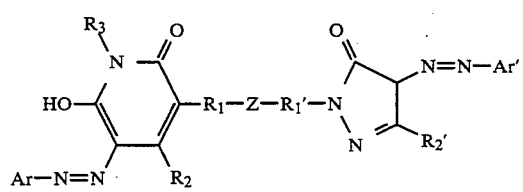

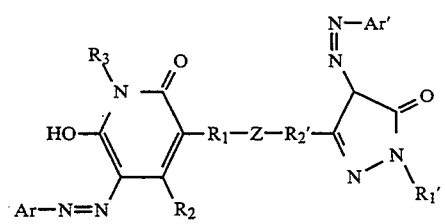

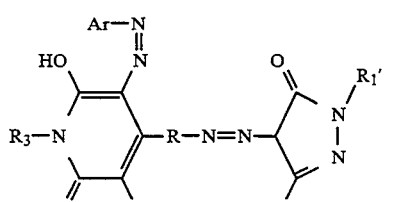

wherein R is a group that meets the definitions of both R$_2$ and Ar'

-continued

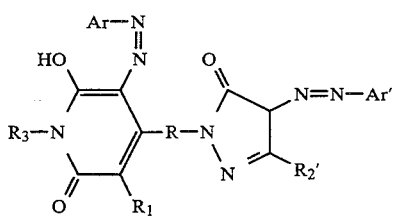

wherein R is a group that meets the definitions of both $R_2$ and $R_1'$

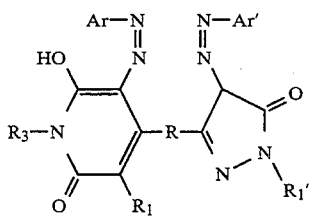

wherein R is a group that meets the definitions of both $R_2$ and $R_2'$

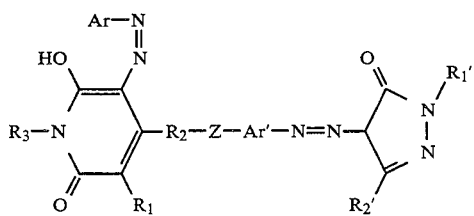

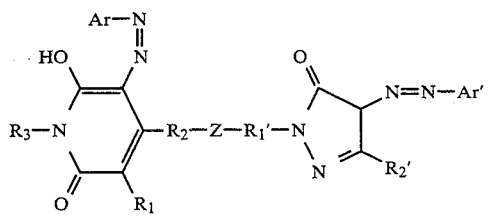

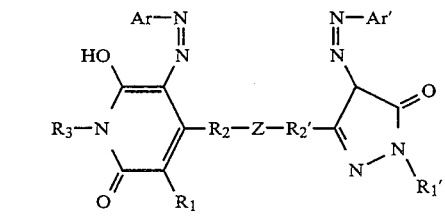

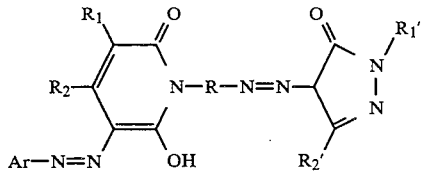

wherein R is a group that meets the definitions of both $R_3$ and $Ar'$

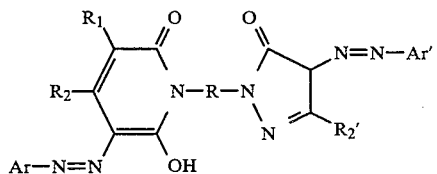

wherein R is a group that meets the definitions of both $R_3$ and $R_2'$

-continued

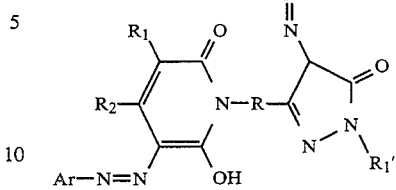

wherein R is a group that meets the definitions of both $R_3$ and $R_2'$

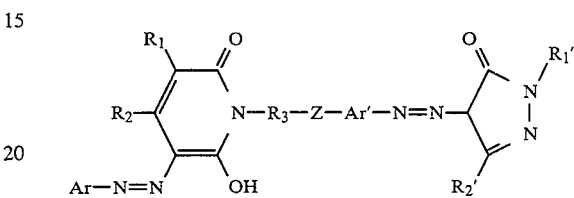

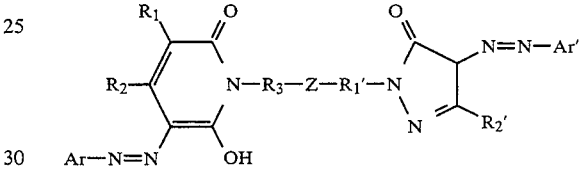

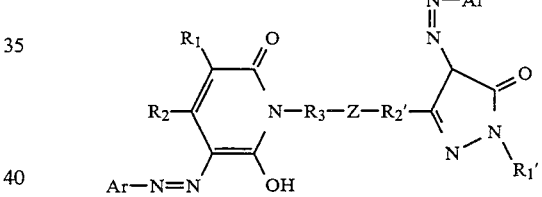

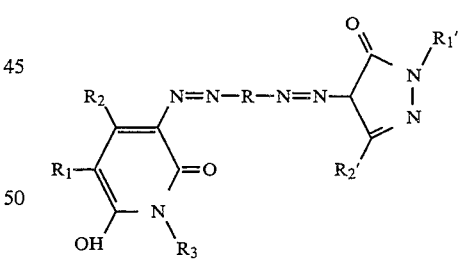

wherein R is a group that meets the definitions of both Ar and Ar'

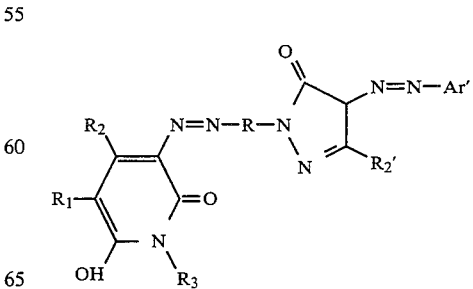

wherein R is a group that meets the definitions of both Ar and $R_1'$

-continued

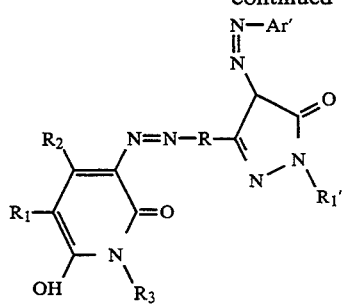

wherein R is a group that meets the definitions of both Ar and R₂'

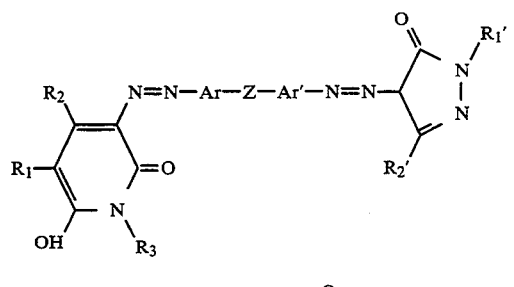

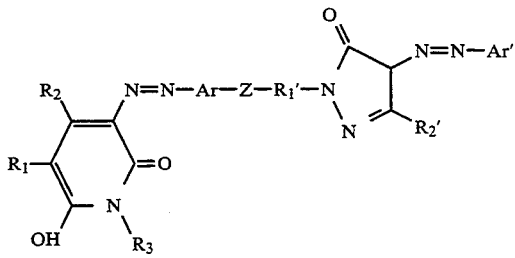

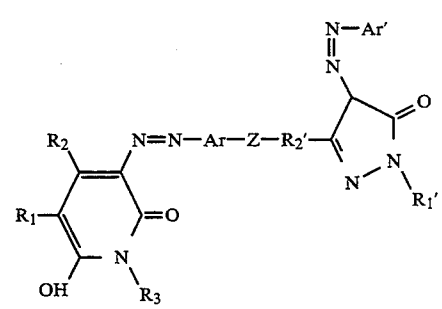

and (d) mixtures thereof.

10. An ink according to claim 1 wherein the colorant is present in an amount of from about 0.1 to about 15 percent by weight.

11. An ink according to claim 1 wherein the colorant is present in an amount of from about 0.5 to about 10 percent by weight.

12. An ink according to claim 1 wherein the colorant is present in an amount of from about 1 to about 5 percent by weight.

13. A process according to claim 3 wherein the colorant is present in the ink an amount of from about 0.1 to about 15 percent by weight.

14. A process according to claim 3 wherein the colorant is present in the ink an amount of from about 0.5 to about 10 percent by weight.

15. A process according to claim 3 wherein the colorant is present in the ink an amount of from about 1 to about 5 percent by weight.

16. A process according to claim 3 wherein the printing apparatus employs a thermal ink jet process wherein the ink in the nozzles is selectively heated in an imagewise pattern, thereby causing droplets of the ink to be ejected in imagewise pattern.

17. A process which comprises (a) providing a donor element comprising a substrate and a dye selected from the group consisting of: (a) those of Formula I

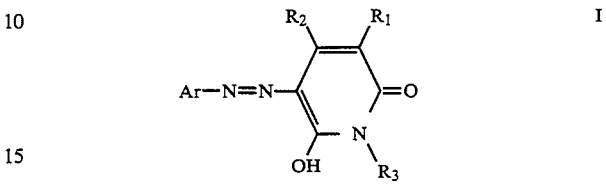

wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

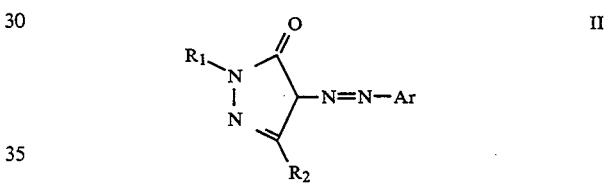

wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof; and (b) applying heat imagewise to the donor element, thereby causing dye to transfer in imagewise fashion from the donor element to a substrate.

18. A process which comprises (a) providing a donor element comprising a substrate and a dye selected from the group consisting of: (a) those of Formula I

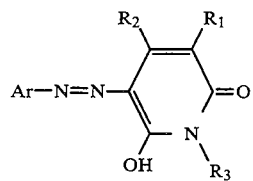

I wherein $R_1$ is an electron withdrawing group, $R_2$ is selected from the group consisting of hydrogen, alkyl, substituted alkyl, aryl, substituted aryl, arylalkyl, and substituted arylalkyl, $R_3$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (b) those of Formula II

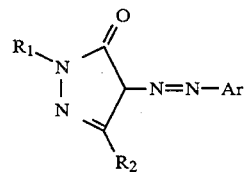

II wherein $R_1$ is selected from the group consisting of hydrogen, alkyl, substituted alkyl, aryl, substituted aryl, arylalkyl, and substituted arylalkyl, $R_2$ is selected from the group consisting of hydrogen, alkyl, substituted alkyl, aryl, substituted aryl, arylalkyl, and substituted arylalkyl, and Ar is selected from the group consisting of aryl, substituted aryl, arylalkyl, and substituted arylalkyl; (c) dimeric compounds containing two moieties of Formula I; (d) dimeric compounds containing two moieties of Formula II; (e) dimeric compounds containing one moiety of Formula I and one moiety of Formula II; (f) trimeric compounds containing three moieties of Formula I; (g) trimeric compounds containing three moieties of Formula II; (h) trimeric compounds containing two moieties of Formula I and one moiety of Formula II; (i) trimeric compounds containing one moiety of Formula I and two moieties of Formula II; (j) polymeric compounds containing at least four moieties selected from the group consisting of Formula I, Formula II, and mixtures thereof; and (k) mixtures thereof; and (b) applying heat imagewise to the donor element, thereby causing dye to transfer in imagewise fashion from the donor element to a substrate, wherein heat is applied to the donor element by a laser, wherein the donor element contains a material which absorbs strongly at the wavelength of the laser thereby converting light energy to thermal energy when irradiated with the laser, and wherein the dye is heated to a temperature at or above its vaporization temperature, thereby causing the dye to transfer from the donor element to the substrate in imagewise fashion.

* * * * *